(12) United States Patent
Xu et al.

(10) Patent No.: US 12,517,354 B2
(45) Date of Patent: Jan. 6, 2026

(54) HEAD-UP DISPLAY DEVICE, HEAD-UP DISPLAY SYSTEM AND TRANSPORT DEVICE

(71) Applicant: FUTURUS TECHNOLOGY CO., LTD., Beijing (CN)

(72) Inventors: Junfeng Xu, Beijing (CN); Huijun Wu, Beijing (CN); Tao Fang, Beijing (CN)

(73) Assignee: FUTURUS TECHNOLOGY CO., LTD., Beijing (CN)

( * ) Notice: Subject to any disclaimer, the term of this patent is extended or adjusted under 35 U.S.C. 154(b) by 436 days.

(21) Appl. No.: 18/019,499

(22) PCT Filed: Aug. 5, 2021

(86) PCT No.: PCT/CN2021/110730
§ 371 (c)(1),
(2) Date: Feb. 3, 2023

(87) PCT Pub. No.: WO2022/028504
PCT Pub. Date: Feb. 10, 2022

(65) Prior Publication Data
US 2023/0305299 A1  Sep. 28, 2023

(30) Foreign Application Priority Data
Aug. 5, 2020  (CN) .......................... 202010779617.3

(51) Int. Cl.
*G02B 27/01* (2006.01)
*B60K 35/23* (2024.01)
(Continued)

(52) U.S. Cl.
CPC .......... *G02B 27/0101* (2013.01); *B60K 35/23* (2024.01); *B60K 35/29* (2024.01);
(Continued)

(58) Field of Classification Search
CPC ........ G02B 27/0101; G02B 2027/0118; G02B 27/0149; B60K 35/23; B60K 35/00; B60K 35/29; B60K 2360/48
See application file for complete search history.

(56) References Cited

U.S. PATENT DOCUMENTS

2002/0036831 A1 * 3/2002 Inoguchi ............ G02B 27/0172
359/629
2006/0221638 A1 * 10/2006 Chew .................... F21V 29/745
362/616
(Continued)

FOREIGN PATENT DOCUMENTS

CN  110471181 A  11/2019
CN  110471182 A  11/2019
(Continued)

*Primary Examiner* — Jonathan Y Jung
(74) *Attorney, Agent, or Firm* — Dilworth & Barrese, LLP.; Michael J. Musella, Esq.

(57) ABSTRACT

A head-up display device includes a light source component, an image generating element and at least one sensor. The light source component includes at least one light source configured to emit light. The image generating element is configured to convert light emitted by the at least one light source into image light and output the same. The at least one sensor is located at a side of the image generating element close to the light source component. The sensor of the head-up display device has the potential to affect the image light. Also provided are a head-up display system including the head-up display device, and a transport device including the head-up display device or the head-up display system.

19 Claims, 19 Drawing Sheets

(51) Int. Cl.
*B60K 35/29* (2024.01)
*B60K 35/81* (2024.01)
*F21V 8/00* (2006.01)
*G02F 1/1335* (2006.01)
*B60K 35/60* (2024.01)

(52) U.S. Cl.
CPC ............ *B60K 35/81* (2024.01); *G02B 6/0031* (2013.01); *G02F 1/133536* (2013.01); *B60K 35/60* (2024.01); *G02B 2027/0118* (2013.01); *G02B 2027/0141* (2013.01); *G02B 27/0149* (2013.01); *G02B 2027/0163* (2013.01)

(56) References Cited

U.S. PATENT DOCUMENTS

| | | | |
|---|---|---|---|
| 2012/0224062 A1* | 9/2012 | Lacoste | G09G 5/14 |
| | | | 348/148 |
| 2019/0049729 A1* | 2/2019 | Honma | G02B 27/0149 |
| 2019/0129167 A1* | 5/2019 | Hayashi | G02B 27/0101 |
| 2019/0179141 A1* | 6/2019 | Delpierre | H05K 1/0274 |
| 2019/0346674 A1* | 11/2019 | Miyake | G02B 26/02 |
| 2021/0110749 A1* | 4/2021 | Hada | G09G 3/025 |

FOREIGN PATENT DOCUMENTS

| | | |
|---|---|---|
| CN | 210666204 U | 6/2020 |
| CN | 214122571 U | 9/2021 |
| JP | 2020052070 A | 4/2020 |
| WO | 2004087455 A1 | 10/2004 |

* cited by examiner

HEAD-UP DISPLAY DEVICE, HEAD-UP DISPLAY SYSTEM AND TRANSPORT DEVICE

CROSS-REFERENCE TO RELATED APPLICATION

The present application claims priority to Chinese patent application No. 202010779617.3, filed on Aug. 5, 2020, the entire disclosure of which is incorporated herein by reference as part of the present application.

TECHNICAL FIELD

Embodiments of the present disclosure relate to a head-up display device, a head-up display system and a transport device.

BACKGROUND

Head-up display (HUD) system projects light of a displayed image output by an image source onto an imaging window (e.g., an imaging panel, a windshield, etc.) through a reflective optical design, so as to display state information of a vehicle such as speed of the vehicle, fuel capacity, etc. and indicative information such as navigation, danger warning, etc. at an appropriate position in front of a driver, thereby enabling the driver to obtain relevant information such as the speed of the vehicle, fuel capacity, etc. under the condition that the line of sight of the driver does not deviate from the road ahead, and further improving driving safety factor and driving experience.

SUMMARY

At least one embodiment of the present disclosure provides a head-up display device, including a light source component, an image generating element, a reflective element and at least one sensor. The light source component includes at least one light source configured to emit light; the image generating element is configured to convert the light emitted by the at least one light source into image light and output the image light; the reflective element is configured to receive the image light, and reflect and converge the image light; the at least one sensor is located at a side of the image generating element close to the light source component; and the image generating element and the at least one sensor are jointly configured such that at least part of light from an outside of the head-up display device and passing through at least partial region of the image generating element is incident on the at least one sensor.

For example, in at least one example of the head-up display device, the light emitted by the at least one light source is incident into the image generating element from a first surface of the image generating element, and the image light exits the image generating element from a second surface of the image generating element opposite to the first surface; and an orthographic projection of the at least one sensor on a plane where the first surface of the image generating element is located partially overlaps with the image generating element.

For example, in at least one example of the head-up display device, the light source component further includes a light-emitting driving substrate.

The at least one light source is located at a side of the light-emitting driving substrate close to the image generating element; the light-emitting driving substrate is electrically connected with the at least one light source and configured to drive the at least one light source to emit light; and an orthographic projection of the at least one sensor on a plane where a first surface of the image generating element is located has no overlap with an orthographic projection of the at least one light source on the plane where the first surface of the image generating element is located.

For example, in at least one example of the head-up display device, the at least one light source includes a plurality of light sources; the at least one sensor includes a plurality of sensors; and an orthographic projection of each of at least some of the plurality of sensors on the plane where the first surface of the image generating element is located is in a gap of orthographic projections of adjacent light sources of the plurality of light sources on the plane where the first surface of the image generating element is located.

For example, in at least one example of the head-up display device, the at least one sensor is fixed on the light-emitting driving substrate.

For example, in at least one example of the head-up display device, the light-emitting driving substrate has a first opening; the at least one sensor is located at a side of the light-emitting driving substrate away from the image generating element, and a light collecting surface of the at least one sensor faces the light-emitting driving substrate; the orthographic projection of the at least one sensor on the plane where the first surface of the image generating element is located at least partially overlaps with an orthographic projection of the first opening on the plane where the first surface of the image generating element is located.

For example, in at least one example of the head-up display device, the head-up display device further includes an encapsulation housing with a second opening. The light source component, the image generating element, the reflective element and the at least one sensor are all located in the encapsulation housing; and the image light is configured to exit the head-up display device via the second opening.

For example, in at least one example of the head-up display device, the head-up display device further includes a diffusion element. The diffusion element is located between the image generating element and the at least one sensor, and is configured to diffuse light from the outside of the encapsulation housing, entering the encapsulation housing from the second opening and passing through the image generating element.

For example, in at least one example of the head-up display device, the head-up display device further includes a reflective light guide element. The reflective light guide element is configured to gather at least part of the light from the outside of the encapsulation housing, entering the encapsulation housing from the second opening and passing through the image generating element towards a center line of the reflective light guide element by reflection.

For example, in at least one example of the head-up display device, an orthographic projection of the reflective light guide element on a plane where a first surface of the image generating element is located at least partially overlaps with the image generating element, and the reflective light guide element is located at a side of the image generating element close to the light source component.

For example, in at least one example of the head-up display device, the reflective light guide element is a hollow housing; the hollow housing has a third opening and a fourth opening which are opposite to each other; the light from the outside of the encapsulation housing, entering the encapsulation housing from the second opening and passing through the image generating element enters the hollow housing from the fourth opening, and can be reflected by a reflective layer on an inner surface of the hollow housing to the at least one sensor; the first surface includes a first region; an orthographic projection of a boundary of the third opening on a plane where the first surface of the image generating element is located coincides with a boundary of the first region; and an orthographic projection of the at least one sensor on the plane where the first surface of the image generating element is located is in the first region.

For example, in at least one example of the head-up display device, an orthographic projection of the at least one light source on the plane where the first surface of the image generating element is located is in the first region; the first surface includes a second region; an orthographic projection of a boundary of the fourth opening on the plane where the first surface of the image generating element is located coincides with a boundary of the second region of the first surface; and the second region at least partially overlaps with the first region.

For example, in at least one example of the head-up display device, the head-up display device further includes a direction control element. The light emitted by the at least one light source sequentially passes through the reflective light guide element, the direction control element and the diffusion element; the direction control element is configured to converge light passing through the reflective light guide element and incident on the direction control element; and the diffusion element is further configured to diffuse light converged by the direction control element and incident on the diffusion element.

For example, in at least one example of the head-up display device, the head-up display device further includes an optical filtering element. The optical filtering element is disposed on an optical path from the second opening to the image generating element and configured to reduce an intensity of the light from the outside of the encapsulation housing and passing through the image generating element.

For example, in at least one example of the head-up display device, the optical filtering element is further configured such that at least part of light in a predetermined wavelength band among light from the outside of the encapsulation housing and incident on the optical filtering element is incident on the image generating element, and light outside the predetermined wavelength band among the light from the outside of the encapsulation housing and incident on the optical filtering element is filtered out.

For example, in at least one example of the head-up display device, the image light output by the image generating element includes any one or any combination selected from the group consisting of light of a first wavelength band, light of a second wavelength band and light of a third wavelength band; colors of the light of the first wavelength band, the light of the second wavelength band and the light of the third wavelength band are different from each other; any two wavelength bands selected from the group consisting of the first wavelength band, the second wavelength band and the third wavelength band are spaced from each other; and the predetermined wavelength band includes a combination of the first wavelength band, the second wavelength band and the third wavelength band.

For example, in at least one example of the head-up display device, the optical filtering element is further configured to filter out light outside a predetermined polarization state among the light from the outside of the encapsulation housing and incident on the optical filtering element.

For example, in at least one example of the head-up display device, the predetermined polarization state is the same as a polarization state of the image light output by the image generating element.

For example, in at least one example of the head-up display device, the optical filtering element is configured such that a first proportion of the light from the outside of the encapsulation housing and incident on the optical filtering element is incident on the image generating element; and a spectral distribution of the light from the outside of the encapsulation housing and incident on the optical filtering element is substantially the same as that of the first proportion of the light incident on the image generating element.

For example, in at least one example of the head-up display device, the optical filtering element is a reflective optical filtering element and is located on a light reflecting surface of the reflective element.

For example, in at least one example of the head-up display device, the optical filtering element is a transmissive optical filtering element and is located on an optical path from the image generating element to the second opening.

For example, in at least one example of the head-up display device, the at least one sensor is configured to communicate with the controller; and the controller is configured to issue an alarm instruction in response to an intensity of the light from the outside of the encapsulation housing, passing through the image generating element and incident on the at least one sensor being greater than or equal to a predetermined light intensity threshold.

For example, in at least one example of the head-up display device, the head-up display device further includes a light shielding element. The controller is further configured to drive the light shielding element to switch from a first state to a second state in response to the intensity of the light from the outside of the encapsulation housing, passing through the image generating element and incident on the at least one sensor being greater than or equal to the predetermined light intensity threshold; the light shielding element is configured to allow the light from the outside of the encapsulation housing to be incident on the image generating element, in the first state; and the light shielding element is configured to prevent the light from the outside of the encapsulation housing from being incident on the image generating element, in the second state.

For example, in at least one example of the head-up display device, the head-up display device further includes a feedback device. The controller is further configured to allow the light shielding element to switch from the second state to the first state in response to a recovery instruction output by the feedback device.

For example, in at least one example of the head-up display device, the feedback device is configured to output the recovery instruction in response to an orientation of the second opening of the encapsulation housing being not matched with a current position of the sun.

For example, in at least one example of the head-up display device, the head-up display device further includes a locator and an angular motion detector. The locator is configured to acquire a latitude and longitude of a current geographic position of the head-up display device; the angular motion detector is configured to collect a current angular motion parameter of the head-up display device; and the feedback device is further configured to determine whether the orientation of the second opening of the encapsulation housing is matched with the current position of the sun based on the latitude and longitude of the current geographical position of the head-up display device and the current position of the sun.

At least one embodiment of the present disclosure provides a head-up display system, including a partially reflective and partially transmissive element and any head-up display device provided by at least one embodiment of the present disclosure. The partially reflective and partially transmissive element is configured to image a first virtual image output by the head-up display device to form a second virtual image.

For example, in at least one example of the head-up display system, the first virtual image output by the head-up display device is located at a focal plane of the partially reflective and partially transmissive element.

For example, in at least one example of the head-up display system, the head-up display system further includes a first reflective film. The first reflective film is located on a surface of the partially reflective and partially transmissive element close to the head-up display device; the partially reflective and partially transmissive element has a first reflectivity to light with a polarization direction which is a first direction; the partially reflective and partially transmissive element has a second reflectivity to light with a polarization direction which is a second direction; the first reflective film has a third reflectivity to light with a polarization direction which is the second direction; the first direction is perpendicular to the second direction; and the first reflectivity and the third reflectivity are both greater than the second reflectivity.

For example, in at least one example of the head-up display system, a polarization direction of the image light output by the image generating element of the head-up display device is the second direction.

For example, in at least one example of the head-up display system, the head-up display system further includes a phase delay element. The phase delay element is located at a second opening of the encapsulation housing of the head-up display device, or on an optical path from the second opening to the partially reflective and partially transmissive element.

For example, in at least one example of the head-up display system, the head-up display system further includes a second reflective film. The second reflective film is located on a surface of the partially reflective and partially transmissive element close to the head-up display device; the second reflective film has a fourth reflectivity to light which is incident on the second reflective film and in a predetermined wavelength band; the second reflective film has a fifth reflectivity to visible light which is incident on the second reflective film and outside the predetermined wavelength band; the fourth reflectivity is greater than the fifth reflectivity; the image light output by the image generating element includes any one or any combination selected from the group consisting of light of a first wavelength band, light of a second wavelength band and light of a third wavelength band; colors of the light of the first wavelength band, the light of the second wavelength band and the light of the third wavelength band are different from each other; any two wavelength bands selected from the group consisting of the first wavelength band, the second wavelength band and the third wavelength band are spaced from each other; and the predetermined wavelength band includes a combination of the first wavelength band, the second wavelength band and the third wavelength band.

For example, in at least one example of the head-up display system, the head-up display system further includes a wedge-shaped film located in an interlayer of the partially reflective and partially transmissive element.

At least one embodiment of the present disclosure provides a transport device, including the head-up display system provided by at least one embodiment of the present disclosure. A front window of the transport device is reused as the partially reflective and partially transmissive element of the head-up display system.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The terms "on," "under," "right," "left" and the like are only used to indicate relative position relationship.

Eyebox of HUD system refers to a region where the driver's eyes are located, and the image output by the HUD system can be seen. The eyebox region has a certain size, and the driver's eyes deviate from the center of the eyebox by a certain distance, such as in the up-down and left-right directions. As long as the driver's eyes are still in the eyebox region, the driver's eyes can see the image output by the HUD system.

Figure 1:
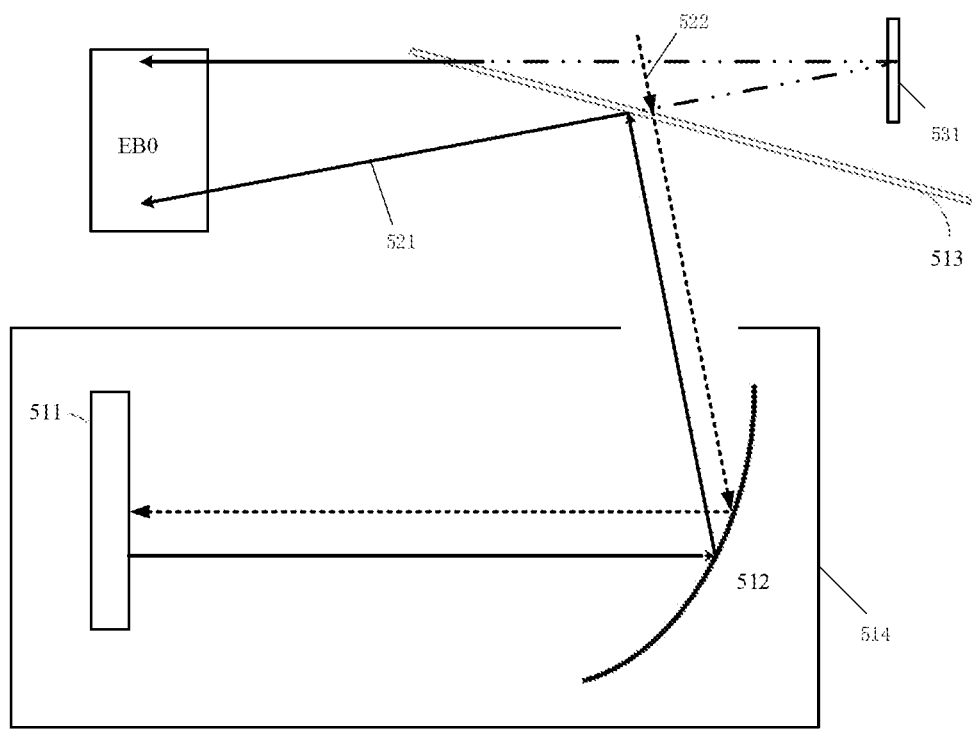
FIG. 1 is a schematic diagram of a head-up display system.

During research, an inventor of the present application has found that, the head-up display system 200 illustrated in FIG. 1 has the risk of being damaged by sunlight. The following is an exemplary description with reference to FIG. 1.

FIG. 1 is a schematic diagram of a head-up display system. As illustrated in FIG. 1, the head-up display system includes an image source 511, a reflective element 512, an encapsulation housing 514, and a partially reflective and partially transmissive element 513. For example, the image source 511 is located close to the focal plane of the reflective element 512. As illustrated in FIG. 1, the light emitted from the image source 511 is reflected by the reflective element 512 (for example, the light is reflected by a plane mirror and a curved mirror in sequence), and the light 521 emitted by the image source 511 and reflected by the reflective element 512 is incident on the partially reflective and partially transmissive element 513 (for example, the front window of the transport device) through the opening of the encapsulation housing 514 and is reflected by the partially reflective and partially transmissive element 513 to form a virtual image 531. The above virtual image 531 can be observed by the user's eyes in the eyebox region EBO. For example, as illustrated in FIG. 1, the virtual image 531 is located at the side of the partially reflective and partially transmissive element 513 away from the encapsulation housing 514, and the eyebox region EBO is located at the side of the partially reflective and partially transmissive element 513 close to the encapsulation housing 514.

During research, an inventor of the present application has found that, according to the reversibility of the optical path, external light (for example, sunlight 522) passing through the partially reflective and partially transmissive element 513 of the head-up display system through the front window will be converged by the reflective element 512, thereby increasing the intensity of sunlight incident on the image source 511; in the case where the intensity of sunlight 522 is very high, for example, only part of sunlight 522 is incident on the reflective element 512 of the head-up display system, and the intensity of sunlight 522 finally incident on the image source (for example, the light spot converged at a position close to the image source 511) may still be high due to the converging effect of the reflective element 512. In this case, the sunlight 522 finally incident on the image source may raise the temperature of the image source 511; when the temperature of the image source 511 is greater than the predetermined temperature, the image source 511 may be damaged by heat. For example, the image source 511 may be burned. For example, the inventor of the present disclosure also has found during research that in the case where the distance between the image source 511 and the focal plane of the reflective element 512 is reduced (for example, the image source 511 is located close to the focal plane of the reflective element 512), the intensity of the sunlight 522 incident on the image source 511 will be increased, and thus the temperature of the image source 511 may be further raised, which may increase the risk of the image source 511 being damaged by heat.

For example, the external light can be sunlight 522, or it can also be the light emitted by fluorescent lamps or other transport devices. The external light can be understood as the light in the outside environment relative to the transport device.

The inventor of the present disclosure has found that, although the image source 511 can be protected by adopting shading measures after the intensity of sunlight 522 sensed by the sensor 515 arranged on or close to the opening of the encapsulation housing 514 of the head-up display system or arranged on or close to the reflective element 512 of the head-up display system is greater than a predetermined threshold, in some cases the false alarm rate (false alarm ratio) or/and missed alarm rate of the above methods is/are relatively high and may affect the display effect. The following is an exemplary description with reference to FIG. 2.

Figure 2:
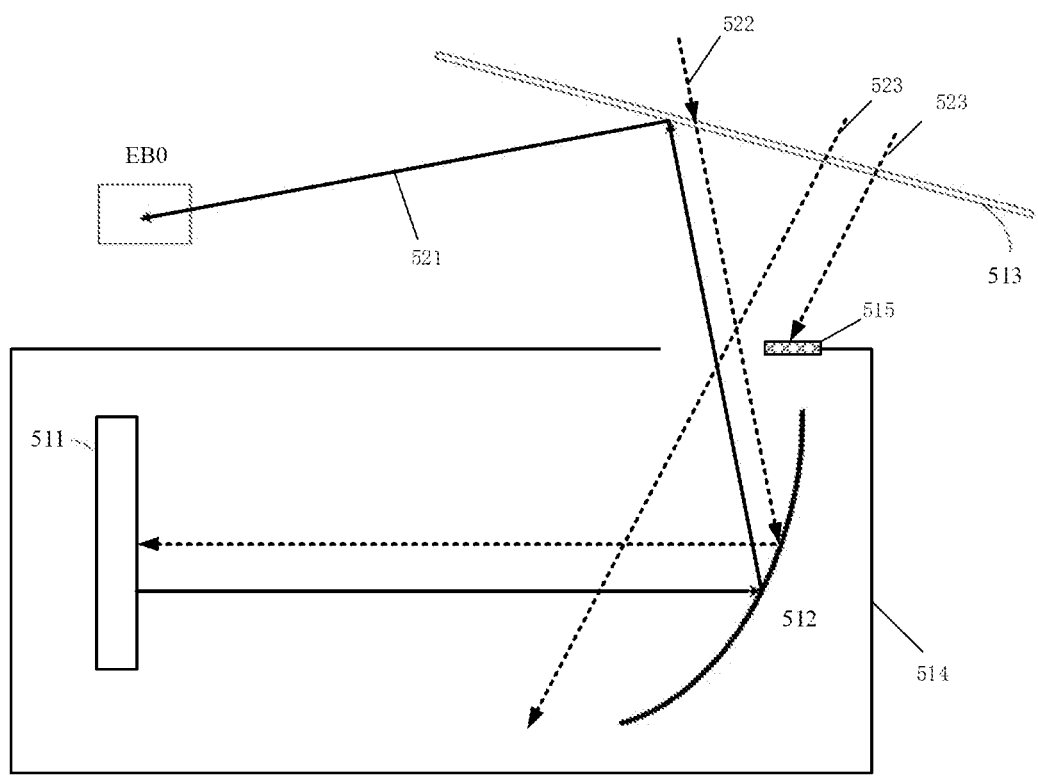
FIG. 2 is a schematic diagram of another head-up display system.

FIG. 2 is a schematic diagram of another head-up display system. As illustrated in FIGS. 1 and 2, compared with the head-up display system illustrated in FIG. 1, the head-up display system illustrated in FIG. 2 further includes a sensor 515, which is disposed at the opening of the head-up display system.

For example, because the sensor 515 is arranged at the opening of the head-up display system, the sensor 515 may block part of the light emitted by the image source 511 and reflected to the opening of the encapsulation housing 514 by the reflective element 512, and thus may affect the display effect of the head-up display system.

For example, as illustrated in FIG. 2, in the case where the transmission direction of most of the light rays in the sunlight 522 is the transmission direction of the light ray 523, for example, the sunlight 522 is incident into the head-up display system, the light rays incident into the head-up display system may not be converged on the image source 511 by the reflective element 512 either. However, the intensity of the sunlight 522 sensed by the sensor 515 may be higher than a predetermined threshold, and cause the head-up display system to give an alarm.

At least one embodiment of the present disclosure provides a head-up display device, which includes a light source component, an image generating element, and at least one sensor. The light source component includes at least one light source configured to emit light; the image generating element is configured to convert the light emitted by the at least one light source into image light and output the image light; the at least one sensor is located at a side of the image generating element close to the light source component.

For example, by arranging at least one sensor at a side of the image generating element close to the light source component, the head-up display device provided by at least one embodiment of the present disclosure can have an early warning function (e.g., an early warning function of screen burning prevention), and the sensor has the potential to avoid affecting image light.

In some examples, the reflective element is configured to receive the image light and reflect and converge the image light; the at least one sensor is located at the side of the image generating element close to the light source component.

In an embodiment of the present disclosure, the case that an element A is located at a side of an element B close to/away from an element C means that, the element B has a first side and a second side opposite to each other, the second side is closer to element C than the first side. At this time, the case that element A is located at the side of the element B close to the element C means that the element A is located at the second side of the element B, and the case that the element A is located at the side of the element B away from the element C means that the element A is located at the first side of the element B.

In some examples, the image generating element and the at least one sensor are jointly configured such that at least part of the light from the outside of the head-up display device and passing through at least partial region of the image generating element is incident on the at least one sensor. For example, the accuracy of early warning can be improved and the false alarm rate can be reduced by jointly configuring the image generating element and the at least one sensor such that at least part of the light from the outside of the head-up display device and passing through at least partial region of the image generating element is incident on the at least one sensor. The above-mentioned "jointly configured/configuring" means that the combination of the image generating element and the at least one sensor is configured such that the image generating element and the at least one sensor can jointly realize the effect of allowing at least part of the light from the outside of the head-up display device and passing through at least partial region of the image generating element to be incident on the at least one sensor.

The head-up display device provided according to at least one embodiment of the present disclosure will be explained in a non-limiting way through the following examples and embodiments. As described below, different features in these specific examples and embodiments can be combined with each other without conflicting with each other, and new examples and embodiments can be obtained, all of which are within the scope of protection of the present disclosure.

Figure 3A:
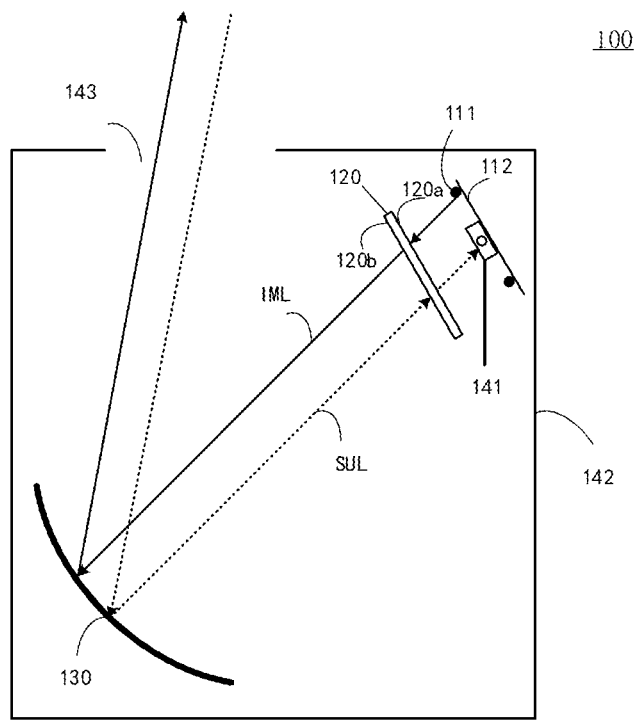
FIG. 3A is a schematic diagram of a head-up display device provided by at least one embodiment of the present disclosure.

FIG. 3A is a schematic diagram of a head-up display device 100 provided by at least one embodiment of the present disclosure. As illustrated in FIG. 3A, the head-up display device 100 includes a light source component, an image generating element 120, and at least one sensor 141.

For example, as illustrated in FIG. 3A, the light source component includes at least one light source 111 configured to emit light; the image generating element 120 is configured to convert the light emitted by the at least one light source 111 into image light IML and output the image light IML; the at least one sensor 141 is located at a side of the image generating element 120 close to the light source component.

For example, the sensor 141 can collect the optical signal incident thereon and output the intensity of the optical signal incident thereon. For example, in the case where the intensity of the optical signal is greater than or equal to the predetermined light intensity threshold, it indicates that sunlight has entered the head-up display device 100 at this time, and correspondingly, there is a risk that the temperature of the image generating element 120 is higher than the predetermined temperature threshold.

For example, by arranging the at least one sensor 141 at the side of the image generating element 120 close to the light source component, the head-up display device 100 provided by at least one embodiment of the present disclosure can have an early warning function (for example, an early warning function of screen burning prevention), and the sensor 141 has the potential to avoid affecting the image light IML. For example, because the sensor 141 is not disposed on the optical path of the image light IML, the sensor 141 may not affect the normal imaging of the head-up display device 100.

For example, as illustrated in FIG. 3A, the head-up display device 100 further includes an encapsulation housing 142 having a second opening 143; the light source component, the image generating element 120 and the at least one sensor 141 are all located in the encapsulation housing 142. For example, by arranging the light source component, the image generating element 120, the reflective element 130 and the at least one sensor 141 all in the encapsulation housing 142, the adverse influence of stray light on the display effect of the head-up display device 100 can be reduced.

For example, as illustrated in FIG. 3A, the head-up display device 100 further includes a reflective element 130. The reflective element 130 is configured to receive the image light IML, and reflect and converge the image light IML to image the image light IML. For example, the reflective element 130 is configured to form a virtual image (e.g., a first virtual image) based on the image light IML, for example, forming the first virtual image at the light emitting side of the head-up display device 100.

For example, as illustrated in FIG. 3A, the reflective element 130 includes (for example, only includes) a curved mirror. For example, the image generating element 120 may be located on or close to the focal plane of the curved mirror. For example, locating close to the focal plane of the curved mirror can be understood as the ratio of the distance between the image generating element 120 and the focal plane of the curved mirror to the focal length of the curved mirror is smaller than a predetermined ratio. For example, the predetermined ratio may be 1%, 5%, 10%, 20% or other predetermined values. For example, the image generating element 120 is located in the optical path from the focal plane of the curved mirror to the curved mirror. For example, the optical distance between the image generating element 120 and the curved mirror is smaller than the focal length of the curved mirror. For example, for the example illustrated in FIG. 3B, the optical distance between the image generating element 120 and the curved mirror is equal to the optical distance between the image generating element 120 and the plane mirror (for example, the optical distance travelled by the main transmission light between the image generating element 120 and the plane mirror) plus the optical distance between the plane mirror and the curved mirror (for example, the optical distance travelled by the main transmission light between the plane mirror and the curved mirror). For example, the curved mirror is a concave mirror; in this case, the surface of the concave mirror close to the image generating element 120 is a concave curved surface.

For example, in the case where the curved mirror is implemented as the concave mirror (for example, a mirror with a concave curved surface), if the optical distance between the image generating element 120 and the concave mirror is smaller than the focal length of the concave mirror, an upright enlarged virtual image can be formed by the concave mirror based on the image output by the image generating element 120. For example, according to the imaging properties of the concave mirror, in the case where the optical distance between the image generating element 120 and the concave mirror is smaller than the focal length of the concave mirror (for example, the image generating element 120 is located within one focal length of the concave mirror), the image distance of the concave mirror increases with the increase of the optical distance between the image generating element 120 and the concave mirror. For example, the greater the optical distance between the image generating element 120 and the concave mirror, the greater the distance between the user using the head-up display system 200 including the head-up display device 100 and an image viewed by the user.

For example, the reflecting surface of the curved mirror may be a free-form surface, for example, the reflecting surface of the curved mirror may not have rotational symmetry, so as to improve the imaging quality of the head-up display device 100.

For example, in the case where the reflective element 130 includes only a curved mirror, the image generating element 120 is located between the reflective element 130 and at least one sensor 141. For example, an orthographic projection of the curved mirror on the first surface of the image generating element 120 may at least partially overlap with an orthographic projection of the at least one sensor 141 on the first surface of the image generating element 120. For example, the orthographic projection of the curved mirror on the first surface of the image generating element 120 may also completely cover the orthographic projection of the at least one sensor 141 on the first surface of the image generating element 120. For example, an orthographic projection of the curved mirror on a plane where the second opening 143 is located may at least partially overlap with the second opening 143. For example, the orthographic projection of the curved mirror on the plane where the second opening 143 is located can completely cover the second opening 143.

For example, as illustrated in FIG. 3A, the light emitted by the at least one light source 111 (for example, at least part of light emitted by the at least one light source 111) is incident on the curved mirror after being converted into image light IML by the image generating element 120, is reflected by the curved mirror to the second opening 143, and exits the encapsulation housing 142 of the head-up display device 100 from the second opening 143. Light from the outside of the head-up display device 100 (for example, the outside of the encapsulation housing 142) enters the encapsulation housing 142 of the head-up display device 100 through the second opening 143; and light (at least part of the light) that is from the outside of the head-up display device 100 and enters the encapsulation housing 142 of the head-up display device 100 through the second opening 143 is incident on the curved mirror and reflected by the curved mirror onto the image generating element 120; and at least part of the light that is from the outside of the encapsulation housing 142 of the head-up display device 100 and incident on the image generating element 120 passes through the image generating element 120 (for example, pixel unit(s) of the liquid crystal display panel) and is incident on the at least one sensor 141.

It can be explained that the reflective element 130 of at least one embodiment of the present disclosure is not limited to only including curved mirror(s). In some examples, the reflective element 130 can also be implemented as a combination of a plane mirror and a curved mirror. The following is an exemplary explanation with reference to FIG. 3B.

Figure 3B:
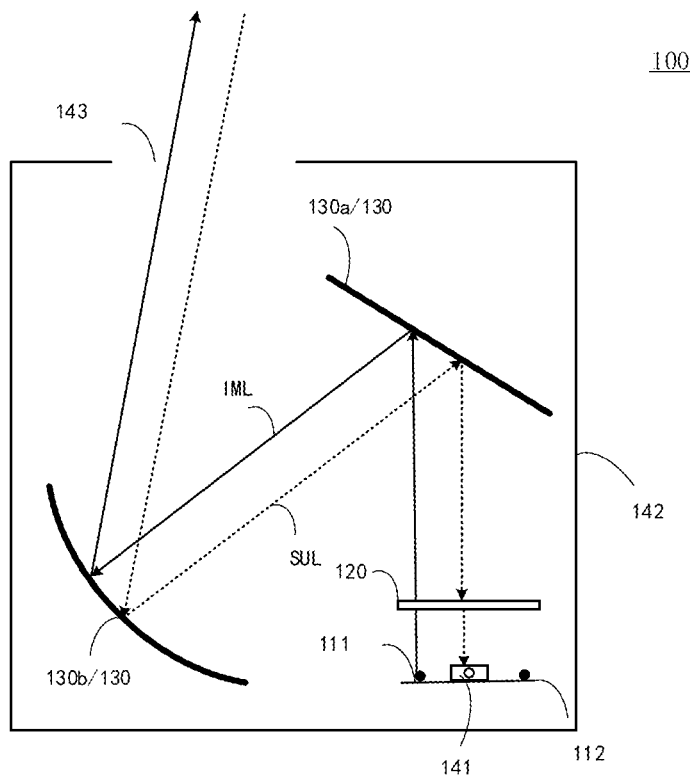
FIG. 3B is a schematic diagram of another head-up display device provided by at least one embodiment of the present disclosure.

FIG. 3B is a schematic diagram of another head-up display device 100 provided by at least one embodiment of the present disclosure. The difference between the head-up display device 100 illustrated in FIG. 3A and the head-up display device 100 illustrated in FIG. 3B is that the structure of the reflective element 130 is different; the improvement of the head-up display device 100 illustrated in FIG. 3A described later can also be applied to the head-up display device 100 illustrated in FIG. 3B, and will not be described again.

For example, as illustrated in FIG. 3B, the reflective element 130 includes (for example, only includes) a first mirror 130a and a second mirror 130b; the first mirror 130a is configured to receive the image light IML and reflect the image light IML to the second mirror 130b. For example, as illustrated in FIG. 3B, the image generating element 120 is located between the first mirror 130a and the light source component.

For example, as illustrated in FIG. 3B, the first mirror 130a is a plane mirror and the second mirror 130b is a concave mirror. For example, by allowing the reflective element 130 to include the first mirror 130a and the second mirror 130b, the optical path from the image generating element 120 to the second mirror 130b can be folded by using the first mirror 130a, whereby the size (e.g., volume) of the encapsulation housing 142 of the head-up display device 100 can be reduced, and the utilization efficiency of the internal space of the encapsulation housing 142 can be improved. For example, by allowing the reflective element 130 to include the first mirror 130a implemented as a plane mirror and the second mirror 130b implemented as a curved mirror, the design flexibility of the head-up display device 100 can also be improved, for example, the head-up display device 100 can have a longer imaging distance without increasing the size of the encapsulation housing 142.

For example, as illustrated in FIG. 3B, at least part of the light emitted by the at least one light source 111 is sequentially incident on a plane mirror and a curved mirror after being converted into image light IML by the image generating element 120, is reflected by the curved mirror to the second opening 143, and exits the encapsulation housing 142 of the head-up display device 100 from the second opening 143; light from the outside of the head-up display device 100 (for example, the outside of the encapsulation housing 142) enters the encapsulation housing 142 of the head-up display device 100 through the second opening 143; and the light (at least part of the light) that is from the outside of the head-up display device 100 and enters the encapsulation housing 142 of the head-up display device 100 through the second opening 143 is sequentially incident on the curved mirror and the planar mirror, and is reflected by the plane mirror onto the image generating element 120; and at least part of the light that is from the outside of the encapsulation housing 142 of the head-up display device 100 and incident on the image generating element 120 passes through the image generating element 120 (for example, pixel unit(s) of the liquid crystal display panel) and is incident on at least one sensor 141.

The implementation of the light source component will be explained as an example below.

For example, the at least one light source 111 includes a plurality of light sources 111 (e.g., light-emitting sources, light-emitting elements). For example, the plurality of light sources are arranged in an array. For example, each light source 111 includes a single light-emitting element (e.g., inorganic or organic light emitting diode). For example, each light source 111 of the at least one light source 111 is configured to emit polychromatic light (e.g., white light). For example, the at least one light source 111 can excite phosphor based on blue light/ultraviolet light to generate white light. For example, the at least one light source 111 includes a plurality of light sources 111, each of which is configured to emit monochromatic light (for example, red light, green light or blue light), and the mixed light of the light emitted by the plurality of light sources 111 is white light.

In at least one embodiment of the present disclosure, "at least one kind/one" can be understood as "one kind/one" or "multiple kinds/multiple", and "multiple kinds" or "multiple" can be understood as including "at least two kinds/two" or "more than at least two kinds/two".

For example, the at least one light source 111 includes, but is not limited to, electroluminescent elements, for example, elements that emit light excited by an electric field. For example, the at least one light source 111 may include any one or any combination of the following light sources: a light emitting diode (LED), an organic light-emitting diode (OLED), a Mini LED, a Micro LED, a cold cathode fluorescent lamp (CCFL), a cold LED light (CLL), an electroluminescence (EL) light source, a light source for electron emission or field emission display (FED) or a quantum dot light source (QD), etc.

For example, as illustrated in FIG. 3A, the light source component of the head-up display device 100 further includes a light-emitting driving substrate 112 (for example, a light source substrate). At least one light source 111 is located at the side of the light-emitting driving substrate 112 close to the image generating element 120; the light-emitting driving substrate 112 is electrically connected with the at least one light source 111, and is configured to drive the at least one light source 111 to emit light. For example, the at least one light source 111 is fixedly connected to the light-emitting driving substrate 112.

For example, the light source substrate is used for setting light-emitting sources, and one or more light-emitting sources are fixed on the light source substrate through electrical connection or non-electrical connection, so as to facilitate the entire disassembly and installation of the light-emitting sources. If one or more light-emitting sources are fixed on the light source substrate by electrical connection, electric energy can be transferred to the light-emitting sources through the light source substrate, thereby lighting the light-emitting sources. For example, the light source substrate can be made of some special materials, for example, the metal light source substrate can also play a good role in heat dissipation.

The implementation of the image generating element 120 will be explained as an example below.

For example, as illustrated in FIG. 3A, the image generating element 120 includes a first surface 120a and a second surface 120b opposite to the first surface 120a; the light emitted by the at least one light source 111 enters the image generating element 120 from the first surface 120a, and the image light IML exits the image generating element 120 from the second surface. The first surface 120a and the second surface 120b of the image generating element 120 are the main surfaces of the image generating element 120.

For example, the image generating element 120 includes a plurality of image generation pixels (for example, image generation pixels arranged in an array), and the plurality of image generation pixels are configured to independently adjust the transmittance of light incident on the plurality of image generation pixels, respectively. For example, each of the plurality of image generation pixels may be a light valve (e.g., a liquid crystal light valve).

Figure 4A:
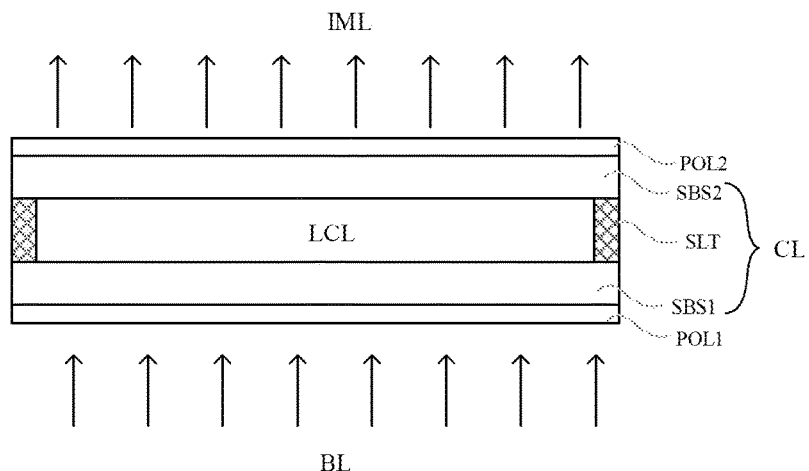
FIG. 4A is a liquid crystal display panel included in an image generating element of a head-up display device provided by at least one embodiment of the present disclosure.

For example, the image generating element 120 may include a liquid crystal display panel (a liquid crystal display panel not including a backlight source) as illustrated in FIG. 4A.

As illustrated in FIG. 4A, the liquid crystal display panel includes a liquid crystal cell CL, which includes a first substrate SBS1 (for example, an array substrate) and a second substrate SBS2 (for example, a color filter substrate). The first substrate SBS1 and the second substrate SBS2 are oppositely arranged, and the liquid crystal layer LCL is disposed between them. The liquid crystal layer LCL is sealed in the liquid crystal box CL by the sealant SLT.

As illustrated in FIG. 4A, the liquid crystal display panel further includes a first polarizer POL1 and a second polarizer POL2 respectively arranged on both sides of the liquid crystal cell CL, the first polarizer POL1 is located at the side of the liquid crystal cell CL close to the light source component, and the second polarizer is located at the side of the liquid crystal cell CL away from the light source component.

As illustrated in FIGS. 3A and 4A, the light source component is configured to provide backlight BL to the liquid crystal cell CL, and the backlight BL is converted into image light IML after passing through the liquid crystal display panel.

For example, the light transmission axis direction of the first polarizer and the light transmission axis direction of the second polarizer may be perpendicular to each other, but it is not limited thereto. For example, the first linearly polarized light can pass through the first polarizer and the second linearly polarized light can pass through the second polarizer, but it is not limited thereto. For example, the polarization direction of the first linearly polarized light is perpendicular to the polarization direction of the second linearly polarized light.

For example, in the case where the image generating element 120 includes a liquid crystal display panel, the image generation pixels of the image generating element 120 include pixel units of the liquid crystal display panel.

In some examples, the image light IML output by the image generating element 120 may include any one or any combination of light of a first wavelength band, light of a second wavelength band and light of a third wavelength band. For example, the colors of light of the first wavelength band, light of the second wavelength band and light of the third wavelength band are different from each other. For example, any two wavelength bands in the first wavelength band, the second wavelength band and the third wavelength band are spaced apart from each other.

For example, the center point of the first wavelength band (for example, the peak wavelength of light in the first wavelength band) may be located between 411 nm and 480 nm, the center point of the second wavelength band (for example, the peak wavelength of light in the second wavelength band) may be located between 500 nm and 565 nm, and the center point of the third wavelength band (for example, the peak wavelength of light in the third wavelength band) may be located between 590 nm and 690 nm. For example, the peak width (for example, full width at half maximum, FWHM) of at least one (for example, all) of the first wavelength band, the second wavelength band and the third wavelength band may be less than or equal to a predetermined peak width; for example, the predetermined peak width is 50 nm, 40 nm, 30 nm or other suitable values.

The implementation of the at least one sensor 141 will be explained below as an example.

In an example, the predetermined light intensity threshold may be a fixed value. For example, the head-up display device 100 may include a light sensing stage located between, for example, adjacent display frames, in the light sensing stage the transmittance of at least part (for example, all) of image generation pixels of the image generating element 120 (for example, pixel units of the liquid crystal display panel) is a predetermined transmittance (for example, 50%); in this case, the predetermined light intensity threshold can be calculated based on the above-mentioned predetermined transmittance and the light intensity threshold that affects the performance of the image generation pixels of the image generating element 120 (for example, damaging the image generation pixels).

In another example, the at least one sensor 141 can also sense the optical signal incident on the at least one sensor 141 in the display stage of the head-up display device; the predetermined light intensity threshold can be calculated based on the transmittance of at least part of image generation pixels of the image generating element 120 (for example, the image generation pixels corresponding to at least one sensor 141) and the light intensity threshold that affects the performance of the image generation pixels of the image generating element 120. In this case, the predetermined light intensity threshold may be changed with the change of the gray distribution of the image displayed by the head-up display device 100.

For example, the at least one sensor 141 may include any one or any combination of visible light sensors, infrared sensors and ultraviolet sensors. For example, the at least one sensor 141 can be implemented as an ultraviolet/infrared hybrid sensor. For example, the operating wavelength of the at least one sensor 141 can be determined based on the spectral distribution of the light incident on the at least one sensor 141. For clarity, the operating wavelength of the at least one sensor 141 will be described in detail in the example of the head-up display device 100 including an optical filtering element 193, which will not be repeated here.

For example, the at least one sensor 141 may be implemented as a sensor based on complementary metal oxide semiconductor (CMOS), a sensor based on a charge-coupled device (CCD), or a sensor based on a PIN junction photosensitive device. For example, the at least one sensor 141 (e.g., each sensor 141) may include a photosensitive detector (e.g., photodiode, photosensitive transistor, etc.) and a switching transistor (e.g., switching transistor). The photodiode can convert the optical signal irradiated thereon into an electrical signal, and the switching transistor can be electrically connected with the photodiode to control whether the photodiode is in the state of collecting the optical signal and the time of collecting the optical signal. For example, because light collecting surfaces (light sensing surfaces) of a sensor based on CMOS and a sensor based on CCD can be set relatively large, the sum of the areas of the light collecting surfaces of the sensors included in the display device is large in the case where the number of sensors included in the display device is fixed, so that the sensing effect can be improved; or, with the same sensing effect, the display device includes fewer sensors, which is convenient to implement.

For example, at least one sensor 141 is configured to communicate with the controller to provide the controller with the intensity data of the light incident on the at least one sensor 141 sensed by the at least one sensor 141; the controller is configured to give an alarm in response to the intensity of the light from the outside of the encapsulation housing 142, passing through the image generating element 120 and incident on the at least one sensor 141 being greater than or equal to the predetermined light intensity threshold.

For example, the controller is configured to receive the intensity data of light incident on the at least one sensor 141 sensed by the at least one sensor 141, and issue an alarm instruction in response to the intensity data provided by the at least one sensor 141 being greater than or equal to the predetermined light intensity threshold, so that the relevant components of the head-up display device 100 give an alarm based on the alarm instruction. For example, the stronger the intensity of light incident on the at least one sensor 141, the higher the value of the obtained intensity data.

For example, the at least one sensor 141 is connected with the controller by wired communication or wireless communication, so as to realize the communication between the at least one sensor 141 and the controller. In an example, the head-up display device 100 further includes a controller. In another example, the controller may be also used as a controller of a transport device driven by a user of the head-up display device 100 (for example, a control system of a car) or a controller using an electronic device (for example, a driver's mobile electronic device).

For example, the implementation of the controller can be set according to the actual application requirements, and the embodiment of the present disclosure is not specifically limited thereto. For example, the controller may include a processor, such as a central processing unit (CPU), a microprocessor, a PLC (programmable logic controller), etc., and a memory, such as various types of storage devices, e.g., magnetic storage devices or semiconductor storage devices, etc., in which executable instructions can be stored, and these executable instructions can realize corresponding functions when executed by the processor.

For example, the controller is further configured to control the image generating element 120 to display early warning characters, images, etc. in response to the intensity data provided by the at least one sensor 141 being greater than or equal to a predetermined light intensity threshold, so as to prompt the user (e.g., driver) to turn off the head-up display device 100.

For example, in some embodiments, the at least one sensor 141 may send out a light shielding signal, or the controller may send out a light shielding signal, or other elements may be used to send out a light shielding signal. For example, in some examples, the at least one sensor 141 is used to send out a light shielding signal, and the light shielding signal sent by the at least one sensor 141 can be fed back to the image generating element 120, so that the image generating element 120 displays early warning characters, images and the like to prompt the driver to turn off the head-up display device 100.

For example, the image generating element 120 and the at least one sensor 141 are jointly configured such that light (for example, at least part of light SUL from the outside of the encapsulation housing 142 and passing through at least part of the region of the image generating element 120 (for example, at least one image generation pixel in the display region)) from the outside of the head-up display device 100 and passing through the image generating element 120 is incident on the at least one sensor 141. For example, by allowing at least part of the light passing through the image generating element 120 be incident on the at least one sensor 141, the intensity of the light sensed by the sensor 141 can better reflect the intensity of external light (for example, sunlight or artificial glare) incident on the image generating element 120, thereby improving the accuracy of early warning and reducing the false alarm rate.

For example, the orthographic projection of the at least one sensor 141 on the plane where the first surface of the image generating element 120 is located at least partially overlaps with the image generating element 120 (for example, the image generation pixels in the display region of the image generating element 120); in this case, light from the outside of the head-up display device 100 and passing through the image generating element 120 (for example, at least part of light SUL from the outside of the encapsulation housing 142 and passing through the image generating element 120) may be incident on the at least one sensor 141.

For example, as illustrated in FIG. 3A, the at least one sensor 141 is located at the side of the light-emitting driving substrate 112 close to the image generating element 120, and the light collecting surface of the at least one sensor 141 faces the image generating element 120.

For example, as illustrated in FIG. 3A, the at least one sensor 141 may be disposed on the same layer as the at least one light source 111, for example, on the same plane. For example, the at least one sensor 141 and the at least one light source 111 are both in contact with the first surface of the light-emitting driving substrate 112 (for example, the surface of the light-emitting driving substrate 112 close to the image generating element 120). For example, as illustrated in FIG. 3A, the at least one sensor 141 and the at least one light source 111 may both be fixed on the light-emitting driving substrate 112, for example, fixedly connected with the light-emitting driving substrate 112.

For example, as illustrated in FIG. 3A, the orthographic projection of the at least one sensor 141 on the plane where the first surface of the image generating element 120 is located does not overlap with the orthographic projection of the at least one light source 111 on the plane where the first surface of the image generating element 120 is located, thereby preventing the at least one sensor 141 from shielding the light emitted by the at least one light source 111. In some examples, the distance between the light collecting surface of the at least one sensor 141 and the first surface of the light-emitting driving substrate 112 is less than, or equal to or slightly larger than the distance between the light-emitting surface of the at least one light source 111 and the first surface of the light-emitting driving substrate 112, so as to prevent the at least one sensor 141 from shielding the light emitted by the at least one light source 111.

In the research, the inventor of the present disclosure has also found that, for the head-up display device 100 illustrated in FIG. 3A, in the case where the incident angle and the incident position (for example, the incident angle and the incident position relative to the plane where the second opening 143 of the encapsulation housing 142 is located) of the light from the outside of the encapsulation housing 142 is changed, the position where the light from the outside of the encapsulation housing 142 is incident on the image generating element 120 may be changed; correspondingly, the position where the light SUL from the outside of the encapsulation housing 142 and passing through the image generating element 120 is irradiated on the light source substrate may be changed. In this case, if only a single sensor is set, there may be a missed alarm problem. In this regard, the inventor of the present disclosure has found in the research that a good early warning effect can be obtained by setting a plurality of sensors 141 (for example, the at least one sensor 141 includes a plurality of sensors 141), for example, the missed alarm rate can be reduced.

For example, the at least one sensor 141 includes a plurality of sensors 141; the orthographic projection of each of at least part (for example, all) of the plurality of sensors 141 on the plane where the first surface of the image generating element 120 is located is located in the gap of the orthographic projections of adjacent light sources 111 of the plurality of light sources 111 on the plane where the first surface of the image generating element 120 is located; in this case, the orthographic projection of the at least one sensor 141 on the plane where the first surface of the image generating element 120 is located does not overlap with the orthographic projection of the at least one light source 111 on the plane where the first surface of the image generating element 120 is located.

For example, a plurality of light sources 111 are arranged in an array, a plurality of sensors 141 are arranged in an array, and a plurality of light sources 111 and a plurality of sensors 141 are mixed arranged. For example, in some examples, a plurality of light sources 111 are arranged in a first array, and a plurality of sensors 141 are scattered in the first array and arranged in a second array. At this time, the regions where the first array and the second array are located overlap; or, in some examples, a plurality of sensors 141 are arranged in a first array, and a plurality of light sources 111 are scattered in the first array and arranged in a second array. At this time, the regions where the first array and the second array are located also overlap; or, in some other examples, a plurality of light sources 111 are arranged in a first array, a plurality of sensors 141 are arranged in a second array, and the first array and the second array are arranged side by side. At this time, there is no overlap between the regions where the first array and the second array are located.

The mixed arrangement of a plurality of light sources 111 and a plurality of sensors 141 will be explained below by way of example with reference to FIGS. 4B-4D.

Figure 4B:
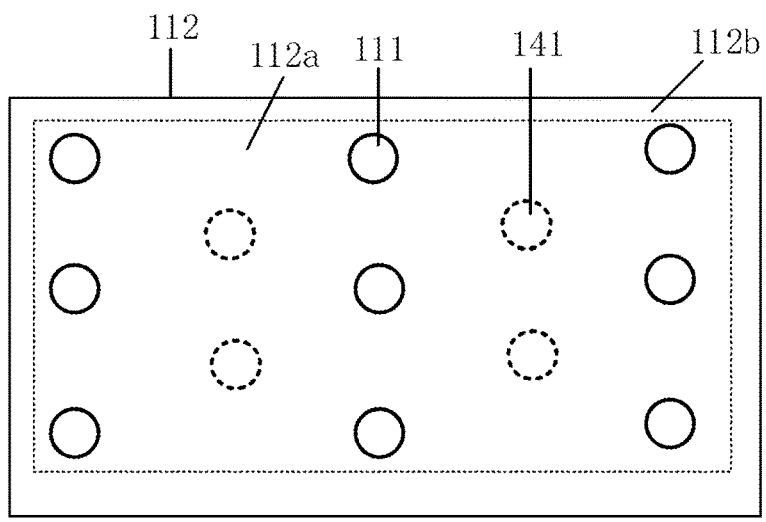
FIG. 4B is a schematic diagram of a first mixed arrangement of a plurality of light sources and a plurality of sensors provided by at least one embodiment of the present disclosure.

FIG. 4B is a schematic diagram of a first mixed arrangement of a plurality of light sources 111 and a plurality of sensors 141 provided by at least one embodiment of the present disclosure; FIG. 4C is a schematic diagram of a second mixed arrangement of a plurality of light sources 111 and a plurality of sensors 141 provided by at least one embodiment of the present disclosure; FIG. 4D is a schematic diagram of a third mixed arrangement of a plurality of light sources 111 and a plurality of sensors 141 provided by at least one embodiment of the present disclosure.

For example, as illustrated in FIG. 4B, the light-emitting driving substrate 112 includes a light-emitting region 112a and a peripheral region 112b surrounding the light-emitting region 112a. As illustrated in FIG. 4B, a plurality of sensors 141 are located in the light-emitting region 112a, whereby an area of the region occupied by the plurality of sensors 141 can be reduced. For example, as illustrated in FIG. 4B, each of the plurality of sensors 141 is located in a gap between adjacent light sources 111 of the plurality of light sources 111. For example, the gap between adjacent light sources 111 may be the gap between adjacent light sources 111 in the row direction or the column direction. For another example, the gap between adjacent light sources 111 may be the overlapping region of, the region between two adjacent rows of light sources 111, and, the region between two adjacent columns of light sources 111. In some examples, by allowing each of the plurality of sensors 141 to be located in the gap between adjacent light sources 111 of the plurality of light sources 111, it can prevent the plurality of sensors 141 from occupying additional space of the light-emitting driving substrate 112, thereby avoiding increasing the size of the light source substrate and the potential adverse influence on the display effect due to the increase of the distance between adjacent light sources 111. For example, by allowing each of the plurality of sensors 141 to be located in the gap between adjacent light sources 111 of the plurality of light sources 111, it is also possible to improve the efficiency and display effect of the head-up display device in the case where a reflective light guide element (FIG. 6A) is provided.

The inventor of the present disclosure has also found in the research that in some examples, the size (e.g., at least one of length, width or area) of the image generating element 120 may be larger than the size (e.g., at least one of length, width or area) of the light-emitting region 112a of the light-emitting driving substrate 112. In this case, for the head-up display device 100 illustrated in FIG. 3A, at least part of the light SUL from the outside of the encapsulation housing 142 and passing through the image generating element 120 may be irradiated onto the peripheral region 112b of the light-emitting driving substrate 112. If each of the plurality of sensors 141 is located in the light-emitting region 112a of the light source substrate, there may be a risk of missed alarm.

Figure 4C:
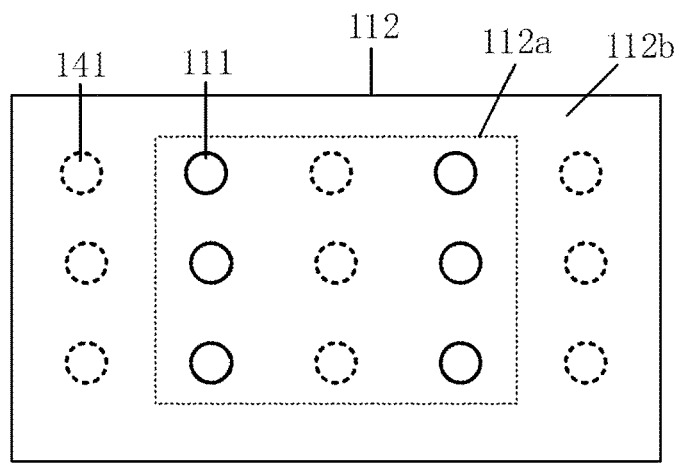
FIG. 4C is a schematic diagram of a second mixed arrangement of a plurality of light sources and a plurality of sensors provided by at least one embodiment of the present disclosure.
Figure 4D:
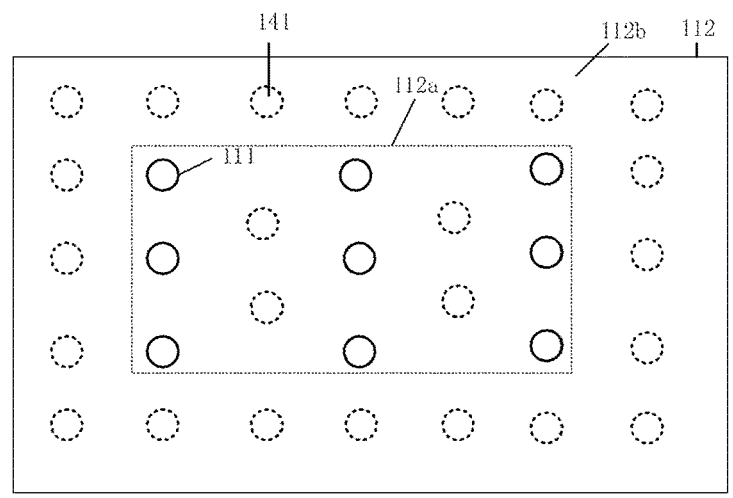
FIG. 4D is a schematic diagram of a third mixed arrangement of a plurality of light sources and a plurality of sensors provided by at least one embodiment of the present disclosure.

As illustrated in FIGS. 4B and 4C, a first part of the plurality of sensors 141 is located in the light-emitting region 112a, and is located in the gap between adjacent light sources 111 of the plurality of light sources 111; and a second part of the plurality of sensors 141 is located in the peripheral region 112b. In the embodiment of the present disclosure, the part of the plurality of sensors 141 located in the light-emitting region 112a is the above-mentioned first part, which includes at least one sensor 141, for example, at least two sensors 141; the part of the plurality of sensors 141 located in the peripheral region 112b is the second part, which includes at least one sensor 141, for example, at least two sensors 141. For example, by allowing the second part of the plurality of sensors 141 to be located in the peripheral region 112b, the early warning effect can be improved, for example, the missed alarm rate can be reduced.

For example, in the case where the at least one sensor 141 includes a plurality of sensors 141, it can be determined whether there is a risk that the performance of the image generation pixels of the image generating element 120 will be affected by external light entering the head-up display device 100 based on a predetermined rule and data of light intensity output by each of the plurality of sensors 141.

In an example, the predetermined rule may include: determining that there is a risk that the performance of the image generation pixels of the image generating element 120 will be affected by external light entering the head-up display device 100 in response to the light intensity data (for example, the intensity data of light incident on the sensors 141) output by a predetermined number of sensors 141 being greater than or equal to a predetermined light intensity threshold. For example, the predetermined number can be set according to the actual application requirements. For example, the predetermined number may be half the number of the one or more sensors 141.

In another example, the predetermined rule may alternatively include: determining that there is a risk that the performance of the image generation pixels of the image generating element 120 will be affected by external light entering the head-up display device 100 in response to the light intensity data (for example, the light intensity data incident on the sensor 141) output by a designated sensor 141 among the plurality of sensors 141 being greater than or equal to a predetermined light intensity threshold. For example, the designated sensor 141 may be a sensor 141 corresponding to an image generation pixel having a transmittance higher than a first predetermined transmittance. In this case, the signal-to-noise ratio of the signal output by the sensor 141 may be improved, thereby improving the accuracy of the data of light intensity output by the sensor 141.

It can be explained that, although various embodiments or examples of the present disclosure are illustrated with at least one sensor 141 located at the side of the light-emitting driving substrate 112 close to the image generating element 120, the at least one sensor 141 provided by at least one embodiment of the present disclosure is not limited to be located at the side of the light-emitting driving substrate 112 close to the image generating element 120, and the at least one sensor 141 may also be located at the side of the light-emitting driving substrate 112 away from the image generating element 120.

The inventor of the present disclosure has also found in the research that the at least one light source 111 generates heat in the process of emitting light, and causes the temperature of the light-emitting driving substrate 112 to rise. For example, the heat generated by at least one light source 111 in the process of emitting light may cause the temperature of the light-emitting driving substrate 112 to be higher than the temperature threshold that the sensor 141 can bear, thus affecting the performance and life of the sensor 141. In this regard, the inventor of the present disclosure has found in the research that by locating the at least one sensor 141 at the side of the light-emitting driving substrate 112 away from the image generating element 120, the problem of adverse influence on the performance and life of the sensor 141 due to the temperature rise of the light-emitting driving substrate 112 and the sensor 141 can be alleviated or eliminated.

Figure 5A:
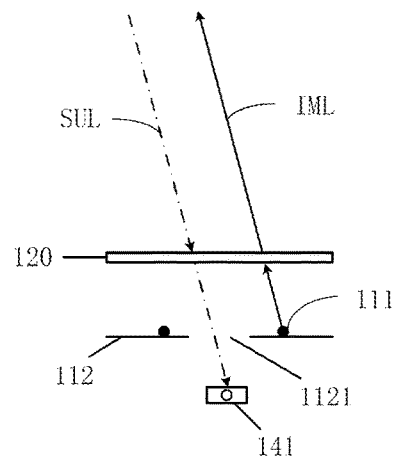
FIG. 5A is a schematic diagram of an example of an arrangement mode of a sensor provided by at least one embodiment of the present disclosure.

The following is an exemplary explanation with reference to FIG. 5A. FIG. 5A is a schematic diagram of an example of the arrangement mode of sensors 141 provided by at least one embodiment of the present disclosure.

For example, as illustrated in FIGS. 5A and 3A, at least one sensor 141 is located at the side of the light-emitting driving substrate 112 away from the image generating element 120, and the light collecting surface of the at least one sensor 141 faces the light-emitting driving substrate 112; the light-emitting driving substrate 112 has a first opening 1121; an orthographic projection of the at least one sensor 141 on a plane where the first surface of the image generating element 120 is located (or on a plane where a surface of the light-emitting driving substrate 112 is located) at least partially overlaps an orthographic projection of the first opening 1121 on the plane where the first surface of the image generating element 120 is located (or on the plane where the surface of the light-emitting driving substrate 112 is located).

It can be explained that in some examples, the orthographic projection of the opening (such as the first opening 1121) on the plane where the first surface of the image generating element 120 is located refers to the region surrounded by the orthographic projection of the boundary of the opening (such as the first opening 1121) on the plane where the first surface of the image generating element 120 is located.

For example, as illustrated in FIGS. 5A and 3A, by locating the at least one sensor 141 at the side of the light-emitting drive substrate 112 away from the image generating element 120, the heat generated by the at least one light source 111 arranged on the light-emitting drive substrate 112 in the process of emitting light can be relieved or avoided from being transferred to the at least one sensor 141 via the light-emitting drive substrate 112 through thermal conduction, thereby alleviating or eliminating the adverse influence on the performance and life of the sensor 141 due to the temperature rise of the light-emitting drive substrate 112 and the sensor 141. For example, the problem that the sensor 141 may overheat can be avoided. For example, by locating the at least one sensor 141 at the side of the light-emitting driving substrate 112 away from the image generating element 120, it can also prevent the sensor 141 from shielding the light emitted by the at least one light source 111.

For example, as illustrated in FIGS. 5A and 3A, because the light-emitting driving substrate 112 has the first opening 1121, and because the orthographic projection of the at least one sensor 141 on the plane where the surface of the light-emitting driving substrate 112 is located at least partially overlaps with the orthographic projection of the first opening 1121 on the plane where the surface of the light-emitting driving substrate 112 is located, at least part of the light SUL from the outside of the encapsulation housing 142 and passing through the image generating element 120 can be incident on the at least one sensor 141 through the first opening 1121, thereby alleviating or avoiding the problem that the light-emitting driving substrate 112 shields the light SUL from the outside of the encapsulation housing 142 and passing through the image generating element 120.

It can be explained that although the first opening 1121 illustrated in FIG. 5A is a hole (for example, a light hole), at least one embodiment of the present disclosure is not limited thereto. In some examples, the first opening 1121 may also be provided with a light-transmitting structure made of a material that transmits light of a predetermined wavelength. For example, other openings of the present disclosure have the same or similar definitions, so the description will not be repeated.

In the research, the inventor of the present disclosure has also found that for the head-up display device 100 including the structure illustrated in FIG. 5A, in the case where the spectrum of light incident on the at least one sensor 141 does not completely match the operating wavelength band of the sensor 141, the light outside the operating wavelength band of the sensor 141 that is among the light incident on the at least one sensor 141 may raise the temperature of the sensor 141, and may adversely affect the performance and life of the sensor 141.

In this regard, the inventor of the present disclosure has found in the research that, by providing a filter 191 for sensor, the problem of the temperature rise of the sensor 141, and the problem that the temperature rise of the sensor 141 may adversely affect the performance and life of the sensor 141, can be further alleviated or avoided.

Figure 5B:
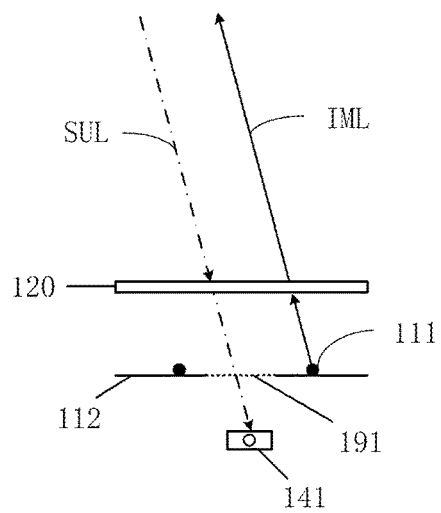
FIG. 5B is a schematic diagram of an example of an arrangement mode of a filter for a sensor provided by at least one embodiment of the present disclosure.
Figure 5C:
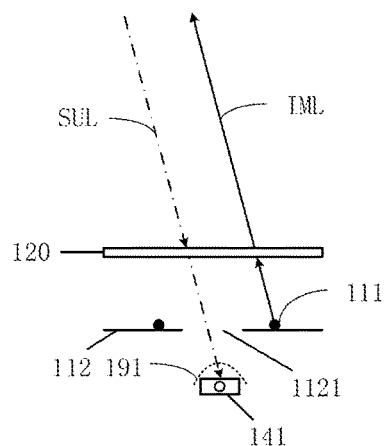
FIG. 5C is a schematic diagram of another example of an arrangement of a filter for a sensor provided by at least one embodiment of the present disclosure.

The following is an exemplary explanation with reference to FIGS. 5B and 5C. FIG. 5B is a schematic diagram of an example of the arrangement mode of a filter 191 for sensor provided by at least one embodiment of the present disclosure, and FIG. 5C is a schematic diagram of another example of the arrangement mode of the filter 191 for sensor provided by at least one embodiment of the present disclosure. Compared with the example illustrated in FIG. 5A (part of the head-up display device 100), the examples illustrated in FIGS. 5B and 5C (part of the head-up display device 100) further include a filter 191 for sensor.

As illustrated in FIG. 5B, the filter 191 for sensor is located at the first opening 1121 of the light-emitting driving substrate 112 (for example, in the first opening 1121); as illustrated in FIG. 5C, the orthographic projection of the filter 191 for sensor on the plane where the first surface of the image generating element 120 is located at least partially covers (for example, completely covers) the orthographic projection of the light collecting surface of the sensor 141 on the plane where the first surface of the image generating element 120 is located. For example, the filter 191 for sensor wraps (for example, covers) the surface of the sensor 141.

For example, the filter 191 for sensor is configured to filter out at least part of the wavelength band (for example, all the wavelength bands) of the light outside the operating wavelength band of the sensor 141; in this case, by providing the filter 191 for sensor, the intensity of the light incident on the sensor 141 can be reduced, so that the problem of the temperature rise of the sensor 141 and the problem that the temperature rise of the sensor 141 may adversely affect the performance and life of the sensor 141 can be alleviated or avoided. For example, by providing the filter 191 for sensor, the accuracy of the output signal of the sensor 141 can also be improved.

It can be explained that although only one first opening 1121 is illustrated in FIGS. 5A-5C, at least one embodiment of the present disclosure is not limited thereto. For example, in the case where the at least one sensor 141 includes a plurality of sensors 141, the light-emitting driving substrate 112 may include a plurality of first openings 1121. For example, the plurality of first openings 1121 may be in one-to-one correspondence with the plurality of sensors 141. For example, the specific correspondence between the plurality of first openings 1121 and the plurality of sensors 141 can be seen in FIGS. 5A-5C, which will not be repeated here.

In the research, the inventor of the present disclosure has also found that for the head-up display device 100 illustrated in FIG. 3A, the distribution range of the positions where the light rays from the outside of the encapsulation housing 142 are incident on the image generating element 120 is wide. Correspondingly, the light SUL from the outside of the encapsulation housing 142 and passing through the image generating element 120 has a wide range of incident positions on the image generating element 120. In this case, in order to obtain a good early warning effect (e.g., to avoid missed alarm), it is necessary to set more sensors 141, which may increase at least one of the weight, cost or calculation amount of the head-up display device 100.

For example, the head-up display device 100 further includes a reflective light guide element 150; the reflective light guide element 150 is configured to gather at least part of the light that is from the outside of the encapsulation housing 142 and passes through the image generating element 120 towards the center line 151 of the reflective light guide element 150 by a reflection of the reflective light guide element 150. For example, the center line 151 of the reflective light guide element 150 refers to a virtual connecting line between the center of the reflective light guide element 150 close to the light-emitting driving substrate 112 and the center of the reflective light guide element 150 close to the image generating element 120. It can be explained that "gathering the light towards the center line 151 of the reflective light guide element 150 by a reflection" means that the light just reflected by the reflective light guide element 150 is transmitted towards the center of the center line 151 of the reflective light guide element 150, without requiring that the intersection point of the light finally intersecting with the plane where the light collecting surface of the sensor 141 is located is at the center line of the reflective light guide element 150. For example, the intersection point of the light finally intersecting with the plane where the light collecting surface of the sensor 141 is located is in the region surrounded by the orthographic projection of the boundary of the third opening b0 of the reflective light guide element 150 on the plane where the light collecting surface of the sensor 141 is located. For example, in the case where the above-mentioned light is not reflected by the reflective light guide element 150 (in the case where the reflective light guide element 150 is not provided for reflection), the intersection point of the light intersecting with the plane where the light collecting surface of the sensor 141 is located is outside the region surrounded by the orthographic projection of the boundary of the third opening b0 of the reflective light guide element 150 on the plane where the light collecting surface of the sensor 141 is located.

For example, the reflective light guide element 150 can reduce the area of the cross section of the light beam from the outside of the encapsulation housing 142 and passing through the image generating element 120. For example, the cross section of the light beam from the outside of the encapsulation housing 142 and passing through the image generating element 120 refers to the cross section obtained by cutting the light beam passing through the image generating element 120 with a plane parallel to the image generating element 120. For example, by providing the reflective light guide element 150 to reduce the area of the cross section of the light beam from the outside of the encapsulation housing 142 and passing through the image generating element 120, it can reduce the area of the light-emitting driving substrate 112 irradiated by the light beam from the outside of the encapsulation housing 142 and passing through the image generating element 120. In this case, the number of the sensors 141 can be reduced under the condition of achieving a good early warning effect (for example, without increasing the missed alarm).

Figure 6A:
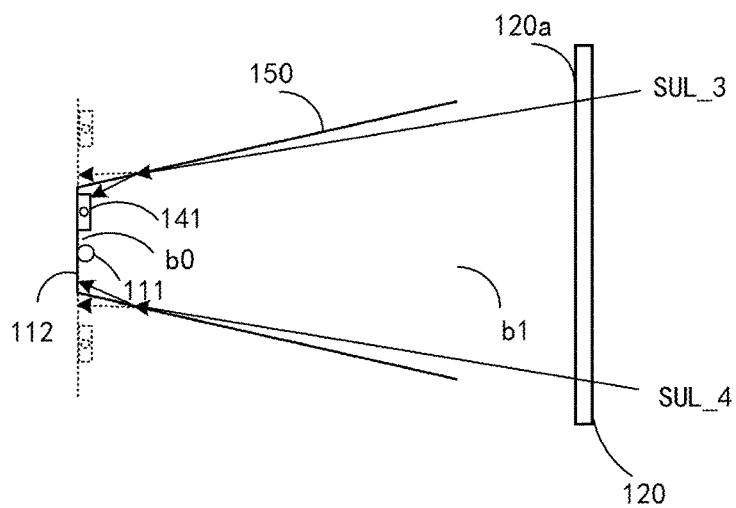
FIG. 6A is a schematic diagram of a partial region of a head-up display device including a reflective light guide element provided by at least one embodiment of the present disclosure.
Figure 6B:
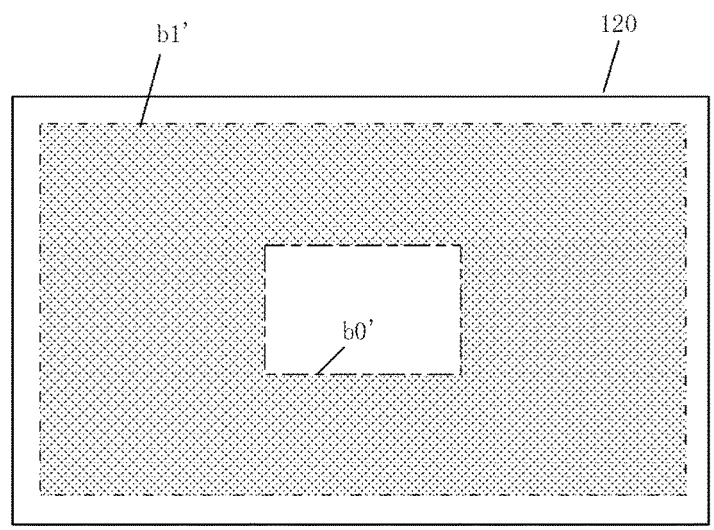
FIG. 6B is a schematic diagram of an orthographic projection of the reflective light guide element illustrated in FIG. 6A on an image generating element.

FIG. 6A is a schematic diagram of a partial region of the head-up display device 100 including the reflective light guide element 150 provided by at least one embodiment of the present disclosure. FIG. 6B is a schematic diagram of the orthographic projection of the reflective light guide element 150 illustrated in FIG. 6A on the image generating element 120.

The reflective light guide element 150 provided by at least one embodiment of the present disclosure is explained below by way of example with reference to FIG. 6A.

For example, as illustrated in FIG. 6A, the reflective light guide element 150 and the image generating element 120 are stacked in a direction crossing (e.g., perpendicular to) the first surface 120a of the image generating element, and the reflective light guide element 150 is located at the side of the image generating element 120 close to the light source component.

For example, as illustrated in FIG. 6B, the orthographic projection of the reflective light guide element 150 on the first surface of the image generating element 120 at least partially overlaps with the image generating element 120.

For example, as illustrated in FIG. 6A, the reflective light guide element 150 is a hollow housing; the hollow housing has a third opening b0 and a fourth opening B1 opposite to each other; the light SUL from the outside of the encapsulation housing 142 and passing through the image generating element 120 enters the hollow housing from the fourth opening b1, and can be reflected onto the at least one sensor 141 by the reflective layer on the inner surface of the hollow housing. For example, a part or all of light rays of the light SUL from the outside of the encapsulation housing 142 and passing through the image generating element 120 are reflected by the reflective layer on the inner surface of the hollow housing.

In an example, as illustrated in FIG. 6B, the orthographic projection of the reflective light guide element 150 on the first surface of the image generating element 120 is the region surrounded by the orthographic projection b0' of the boundary of the third opening b0 of the reflective light guide element 150 on the first surface of the image generating element 120 and surrounded by the orthographic projection b1' of the boundary of the fourth opening b1 of the reflective light guide element 150 on the first surface of the image generating element 120.

In an example, the at least one sensor 141 is located outside the region surrounded by the encapsulation housing 142, and the light SUL from the outside of the encapsulation housing 142 and passing through the image generating element 120 can be reflected to the third opening b0 by the reflective layer on the inner surface of the hollow housing and exit the hollow housing from the third opening b0.

In another example, the at least one sensor 141 may also be located in the region surrounded by the encapsulation housing 142, and the light SUL from the outside of the encapsulation housing 142 and passing through the image generating element 120 may be reflected to the at least one sensor 141 located in the encapsulation housing 142 by the reflective layer on the inner surface of the hollow housing.

For example, in the case where the reflective light guide element 150 is a hollow housing, the center line of the reflective light guide element 150 may refer to a virtual connecting line between the center of the third opening b0 and the center of the fourth opening b1.

For example, as illustrated in FIG. 6A, the light-emitting driving substrate 112 is disposed at the third opening b0, and the at least one sensor 141 and the at least one light source 111 are disposed in the hollow housing; the orthographic projection of the boundary of the third opening b0 on the plane where the first surface of the light-emitting driving substrate 112 is located (or the plane where the first surface of the image generating element 120 is located) surrounds the first region REG_1 of the first surface (see FIGS. 7E and 7G); the orthographic projection of the at least one sensor 141 on the plane where the first surface of the light-emitting driving substrate 112 is located (or the plane where the first surface of the image generating element 120 is located) is within the first region REG_1.

For example, as illustrated in FIG. 6A, in the case where the reflective light guide element 150 is not provided, a part of the light SUL (e.g., light SUL_3 and light SUL_4) from the outside of the encapsulation housing 142 and passing through the image generating element 120 may be incident on a region other than the region surrounded by the orthographic projection of the third opening b0 of the hollow housing on the light-emitting driving substrate 11. Correspondingly, in order to obtain a good early warning effect, it is also necessary to arrange the sensor 141 (for example, a sensor illustrated by a dotted line) in a region other than the region surrounded by the orthographic projection of the third opening b0 of the hollow housing on the light-emitting driving substrate 112.

For example, as illustrated in FIG. 6A, in the case where the reflective light guide element 150 is provided, the hollow housing can gather the light that is from the outside of the encapsulation housing 142 and passes through the image generating element 120 towards the center line 151 of the reflective light guide element 150 (see FIG. 7A), and correspondingly, the hollow housing can gather the positions where part of the light SUL (for example, light SUL_3 and light SUL_4) from the outside of the encapsulation housing 142 and passing through the image generating element 120 are irradiated on the light-emitting driving substrate 112 to the region surrounded by the orthographic projection of the third opening b0 of the hollow housing on the light-emitting driving substrate 112. In this case, the sensor 141 may not be provided in the region other than the region surrounded by the orthographic projection of the third opening b0 of the hollow housing on the light-emitting driving substrate 112.

Figure 6C:
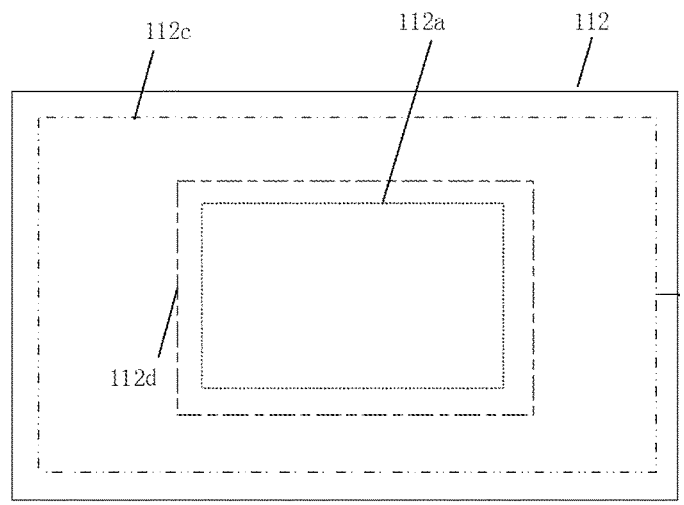
FIG. 6C illustrates an exemplary schematic diagram of a region of a light-emitting driving substrate provided by at least one embodiment of the present disclosure, which is irradiated by light from the outside of an encapsulation housing and passing through an image generating element.

FIG. 6C illustrates an exemplary schematic diagram of a region of the light-emitting driving substrate 112 irradiated by light from the outside of the encapsulation housing 142 and passing through the image generating element 120 provided by at least one embodiment of the present disclosure. As illustrated in FIG. 6C, in the case where the reflective light guide element 150 is not provided, the region of the light-emitting driving substrate 112 irradiated by the light (for example, the light including the light SUL_3 and SUL_4 and all the light between the light SUL_3 and SUL_4) from the outside of the encapsulation housing 142 and passing through the image generating element 120 is the region 112c. Because the reflective light guide element 150 can gather the light (e.g., the light away from the center line 151 of the reflective light guide element 150) from the outside of the encapsulation housing 142 and passing through the image generating element 120 towards the center line 151 of the reflective light guide element 150 by reflection (see FIG. 7A), and can reduce the area of the cross section of the light beam from the outside of the encapsulation housing 142 and passing through the image generating element 120, thus in the case where the reflective light guide element 150 is provided, the region of the light-emitting driving substrate 112 irradiated by the light beam from the outside of the encapsulation housing 142 and passing through the image generating element 120 is a region 112d having a size (e.g., area) smaller than a size (e.g., area) of the region 112c; correspondingly, the sensors 141 can only be arranged in the region 112d without being arranged in the region outside the region 112d in the region 112c, so that the number of the sensors 141 can be reduced under the condition of achieving a better early warning effect (for example, without increasing the missed alarm).

For example, the region 112d illustrated in FIG. 6C represents all possible positions of the light-emitting driving substrate 112 irradiated by the light SUL from the outside of the encapsulation housing 142 and passing through the image generating element 120 (in the case where the reflective light guide element 150 is provided). In the case where the area of the cross section of the light SUL (light beam) from the outside of the encapsulation housing 142 and passing through the image generating element 120 is small, the light SUL from the outside of the encapsulation housing 142 and passing through the image generating element 120 can only irradiate some sub-regions (e.g., the sub-region RE_1 or the sub-region RE_2) of the region 112d. The following is an exemplary description with reference to FIGS. 7A and 7B.

Figure 7A:
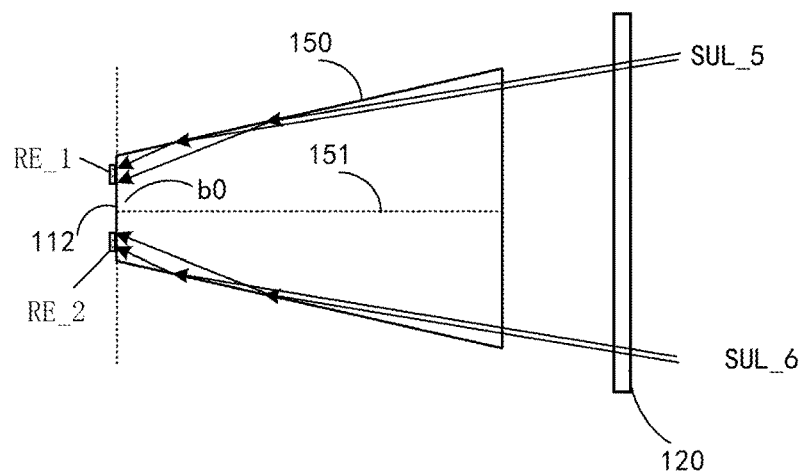
FIG. 7A illustrates another exemplary schematic diagram of a region of a light-emitting driving substrate provided by at least one embodiment of the present disclosure, which is irradiated by light from the outside of an encapsulation housing and passing through an image generating element.
Figure 7B:
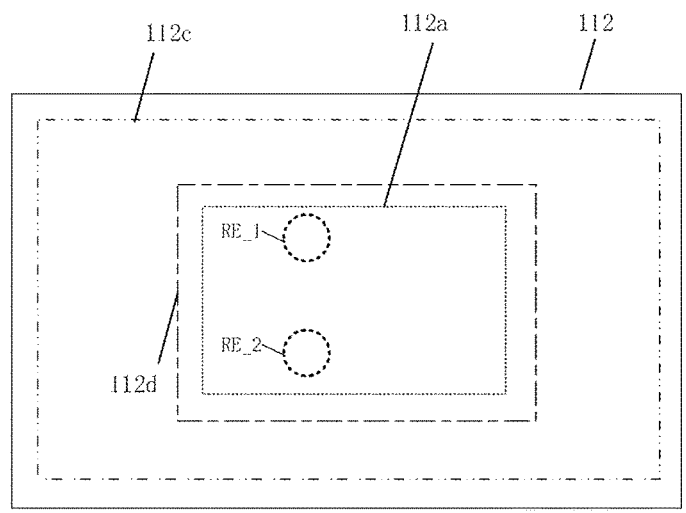
FIG. 7B illustrates a schematic plan view of a light-emitting driving substrate illustrated in FIG. 7A.

FIG. 7A illustrates another exemplary schematic diagram of a region of the light-emitting driving substrate 112 provided by at least one embodiment of the present disclosure that is irradiated by a light beam from the outside of the encapsulation housing 142 and passing through the image generating element 120, and FIG. 7B illustrates a schematic plan view of the light-emitting driving substrate 112 illustrated in FIG. 7A.

For example, as illustrated in FIGS. 7A and 7B, the region of the light-emitting driving substrate 112 irradiated by the light SUL5 from the outside of the encapsulation housing 142 and passing through the image generating element 120 is the sub-region RE_1; the region of the light-emitting driving substrate 112 irradiated by the light SUL6 from the outside of the encapsulation housing 142 and passing through the image generating element 120 is the sub-region RE_2.

Figure 7C:
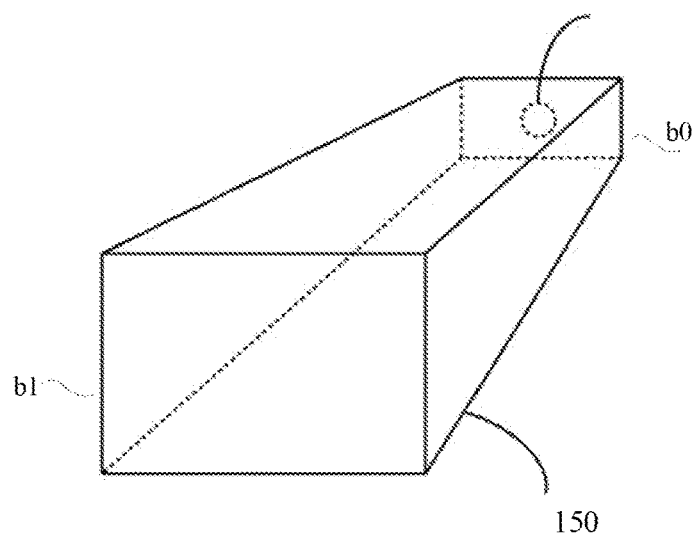
FIG. 7C is a first perspective view of a reflective light guide element and a sensor provided by at least one embodiment of the present disclosure.
Figure 7D:
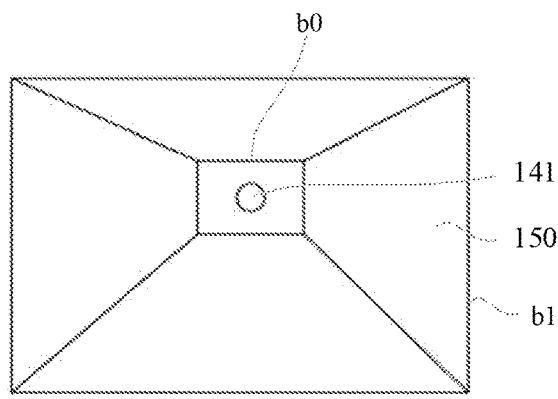
FIG. 7D is a top view of the reflective light guide element and the sensor illustrated in FIG. 7C.

FIG. 7C is a first perspective view of a reflective light guide element 150 and a sensor 141 provided by at least one embodiment of the present disclosure; FIG. 7D is a top view of the reflective light guide element 150 and the sensor 141 illustrated in FIG. 7C. For example, as illustrated in FIGS. 7C and 7D, the reflective light guide element 150 may be a hollow housing with a rectangular cross section and a quadrangular pyramid shape, and the cross section of the reflective light guide element 150 gradually becomes larger from one end (the third opening b0) to the other end (the fourth opening b1).

It can be explained that the reflective light guide element 150 provided by at least one embodiment of the present disclosure is not limited to being implemented as a hollow housing with a rectangular cross section and a quadrangular pyramid shape, and the reflective light guide element 150 can also be implemented as a triangular pyramid shape, a quadrangular pyramid shape or a paraboloid shape according to actual application requirements.

For example, as illustrated in FIGS. 7C and 7D, the light-emitting driving substrate 112 is disposed at the third opening b0, and at least one sensor 141 and at least one light source 111 are disposed in a hollow housing. It can be explained that the at least one sensor 141 and at least one light source 111 provided by at least one embodiment of the present disclosure are not limited to being arranged in a hollow housing. According to the actual application requirements, the at least one sensor 141 and at least one light source 111 provided by at least one embodiment of the present disclosure can also be arranged at the side of the reflective light guide element 150 away from the image generating element 120. In this case, the reflective light guide element 150 is arranged between the at least one sensor 141 and the image generating element 120.

For example, as illustrated in FIGS. 7C and 7D, the head-up display device 100 includes only one sensor 141; for example, the center of the sensor 141 coincides with the center of the third opening b0 to improve the early warning effect.

It can be explained that the center of the sensor 141 provided by at least one embodiment of the present disclosure is not limited to being coincident with the center of the third opening b0. In the case where the reflective light guide element 150 is also configured to gather the light with a large angle emitted by at least one light source 111 by reflection (for example, the angle with respect to the main transmission axis of the light emitted by at least one light source 111 is large), in order to better improve the efficiency of the head-up display device 100, it's also possible that the center of the third opening b0 coincides with the center of the light source 111, and the center of the sensor 141 is close to the center of the third opening b0.

Figure 7E:
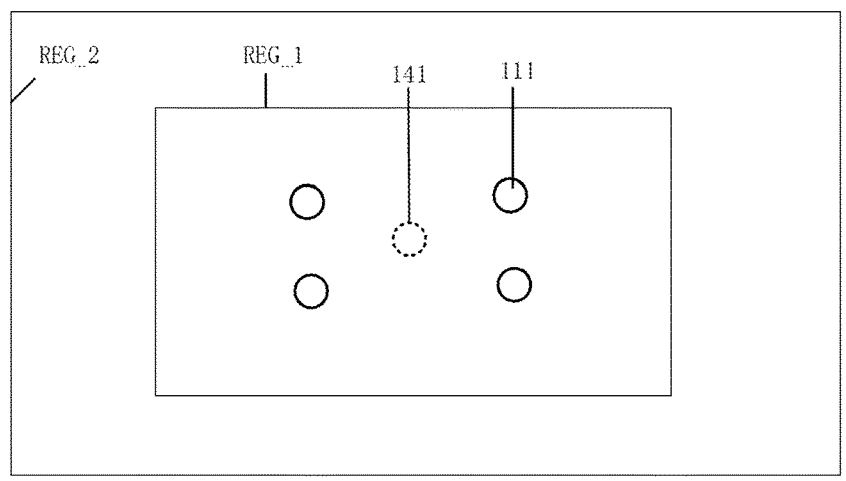
FIG. 7E is a first schematic diagram of an orthographic projection of a reflective light guide element, a light source and a sensor on a plane where a first surface of a light-emitting driving substrate is located, provided by at least one embodiment of the present disclosure.

FIG. 7E is a first schematic diagram of the orthographic projection of the reflective light guide element 150, the light source 111 and the sensor 141 on the plane where the first surface of the light-emitting driving substrate 112 is located (or the plane where the first surface of the image generating element 120 is located) provided by at least one embodiment of the present disclosure. For example, as illustrated in FIG. 7E, the first surface includes a first region REG_1 and a second region REG_2.

For example, as illustrated in FIG. 7E, the orthographic projection of the boundary of the third opening b0 on the plane where the first surface of the light-emitting driving substrate 112 is located (or the plane where the first surface of the image generating element 120 is located) surrounds the first region REG_1 of the first surface; the orthographic projection of at least one sensor 141 on the plane where the first surface of the light-emitting driving substrate 112 is located (or the plane where the first surface of the image generating element 120 is located) is within the first region REG_1.

For example, as illustrated in FIG. 7E, the orthographic projection of the boundary of the fourth opening b1 on the plane where the first surface of the light-emitting driving substrate 112 is located (or the plane where the first surface of the image generating element 120 is located) surrounds the second region REG_2 of the first surface; the second region REG_2 and the first region REG_1 at least partially overlap. For example, the second region REG_2 completely surrounds the first region REG_1.

For example, as illustrated in FIG. 7E, the orthographic projection of the boundary of the third opening b0 on the plane where the first surface of the light-emitting driving substrate 112 is located (or the plane where the first surface of the image generating element 120 is located) coincides (for example, completely coincides) with the boundary of the first region REG_1 of the first surface. For example, as illustrated in FIG. 7E, the orthographic projection of the boundary of the fourth opening b1 on the plane where the first surface of the light-emitting driving substrate 112 is located (or the plane where the first surface of the image generating element 120 is located) coincides (for example, completely coincides) with the boundary of the second region REG_2 of the first surface.

For example, the shape of the first region REG_1 and the shape of the second region REG_2 are both rectangular, but at least one embodiment of the present disclosure is not limited thereto. For example, the shape of the first region REG_1 and the shape of the second region REG_2 may both be selected from square, trapezoid and parallelogram. For another example, in the case where the side surface of the reflective light guide element 150 is a paraboloid, the shape of the first region REG_1 and the shape of the second region REG_2 are both circular. It can be explained that the shape of the first region REG_1 and the shape of the second region REG_2 may be the same or different.

For example, as illustrated in FIG. 7E, the orthographic projection of the at least one light source 111 on the plane where the first surface of the light-emitting driving substrate 112 is located (or the plane where the first surface of the image generating element 120 is located) is in the first region REG_1; in this case, the reflective light guide element 150 can reduce the divergence angle of the light emitted by the at least one light source 111. For example, the large-angle light emitted by the at least one light source 111 (for example, the angle with respect to the main transmission axis of the light emitted by the at least one light source 111 is relatively large) is reflected by the reflective light guide element 150 and then is gathered, so that the utilization rate of the light emitted by the at least one light source 111 can be improved. For the sake of clarity, the content of reducing the divergence angle of the light emitted by the at least one light source 111 by the reflective light guide element 150 will be explained in detail in explaining the example illustrated in FIG. 18, and will not be repeated here.

For example, the divergence angle of the large-angle light emitted by the light source 111 is greater than 15 degrees, 30 degrees, 45 degrees or 60 degrees. It can be explained that the divergence angle refers to two times of the angle between a certain light emitting direction and an axial direction of the light source 111, in which the intensity value of light in this light emitting direction is half of the intensity value of light in the axial direction (for example, the central light); alternatively, it can be considered as the angle between the divergent light and the central light, or it can be two times of the angle between the divergent light and the central light.

For example, as illustrated in FIG. 7E, the plurality of light sources 111 are arranged in a light source array, and sensors 141 may be disposed in gaps between adjacent light sources 111 among the plurality of light sources 111. For example, the sensor 141 can be arranged in the center of the light source array. For example, in this case, the efficiency and display effect of the head-up display device can be improved.

Figure 7F:
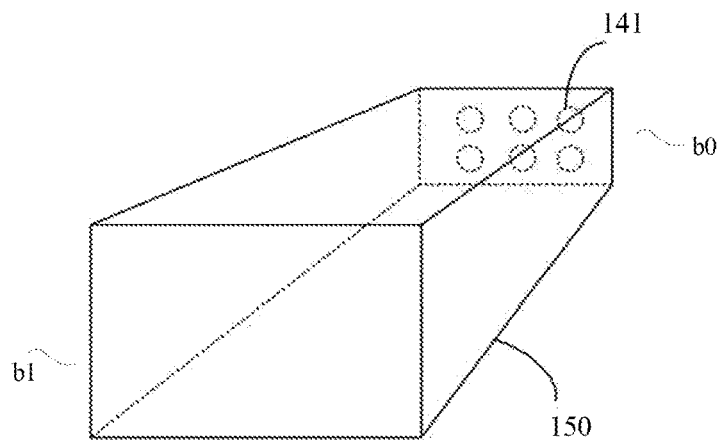
FIG. 7F is a second perspective view of a reflective light guide element and a sensor provided by at least one embodiment of the present disclosure.
Figure 7G:
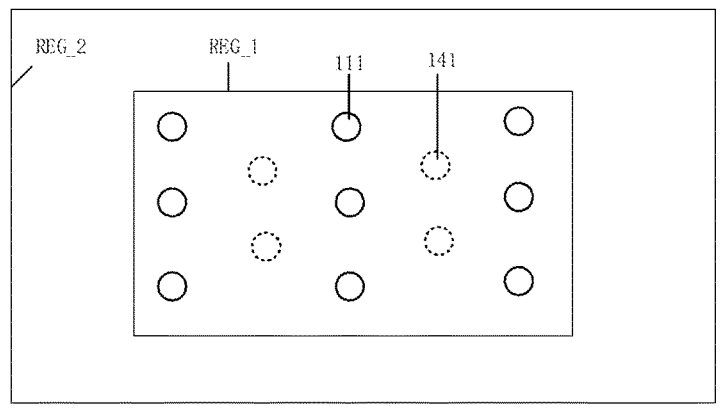
FIG. 7G is a second schematic diagram of an orthographic projection of a reflective light guide element, a light source and a sensor on a plane where a first surface of a light-emitting driving substrate is located, provided by at least one embodiment of the present disclosure.

FIG. 7F is a second perspective view of the reflective light guide element 150 and the sensor 141 provided by at least one embodiment of the present disclosure; FIG. 7G is a second schematic diagram of the orthographic projection of the reflective light guide element 150, the light source 111 and the sensor 141 on the plane where the first surface of the light-emitting driving substrate 112 is located (or the plane where the first surface of the image generating element 120 is located) provided by at least one embodiment of the present disclosure. For example, as illustrated in FIGS. 7F and 7G, the at least one sensor 141 includes a plurality of sensors 141, and each of the plurality of sensors 141 may be disposed in a gap between adjacent light sources 111 among the plurality of light sources 111.

In the research, the inventor of the present disclosure has also found that, for the head-up display device 100 illustrated in FIG. 3A, in the case where the incident angle or the incident position of light from the outside of the encapsulation housing 142 is changed, the position where the light from the outside of the encapsulation housing 142 is incident on the image generating element 120 may be changed; correspondingly, the position where the light SUL from the outside of the encapsulation housing 142 and passing through the image generating element 120 is irradiated on the light-emitting driving substrate 112 may be changed; for this reason, in order to obtain a good early warning effect (for example, to avoid missed alarm), it is necessary to set more sensors 141, which may increase at least one of the weight, cost or calculation amount of the head-up display device 100.

Figure 8A:
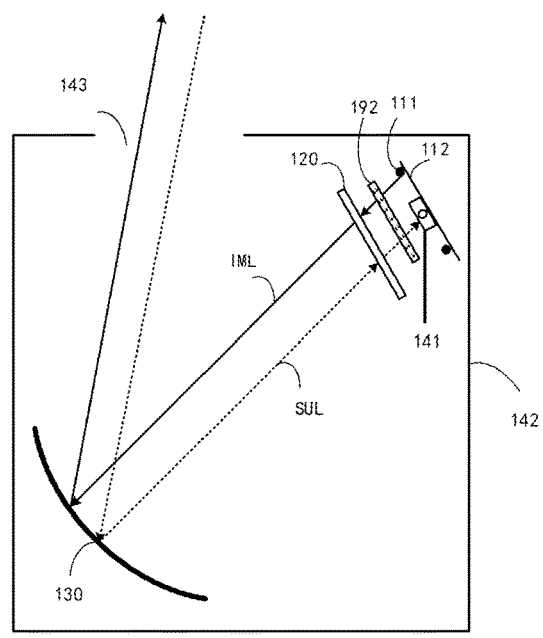
FIG. 8A is a schematic diagram of another head-up display device provided by at least one embodiment of the present disclosure.

FIG. 8A is a schematic diagram of another head-up display device 100 provided by at least one embodiment of the present disclosure. For example, compared with the head-up display device 100 illustrated in FIG. 3A, the head-up display device 100 illustrated in FIG. 8A further includes a diffusion element 192; the diffusion element 192 is located between the image generating element 120 and the at least one sensor 141, and is configured to diffuse the light SUL_1 that is from the outside of the encapsulation housing 142 and passes through the image generating element 120, so as to increase the area of the light-emitting driving substrate 112 irradiated by the light SUL_1 from the outside of the encapsulation housing 142 and passing through the image generating element 120. For example, by disposing the diffusion element 192, the light SUL_1 from the outside of the encapsulation housing 142 and passing through the image generating element 120 can be irradiated onto the non-irradiated region of the light-emitting driving substrate 112 (it's not irradiated in the case where the diffusion element 192 is not provided). In this case, the number of the sensors 141 can be reduced, and a better early warning effect can be achieved by using a smaller number of sensors 141. The following is an exemplary explanation with reference to FIGS. 8B and 8C.

Figure 8B:
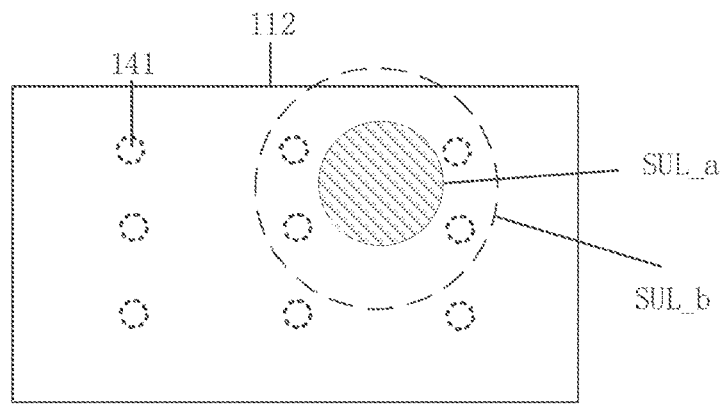
FIG. 8B is a schematic diagram of an arrangement mode of a sensor of a head-up display device including a diffusion element provided by at least one embodiment of the present disclosure.
Figure 8C:
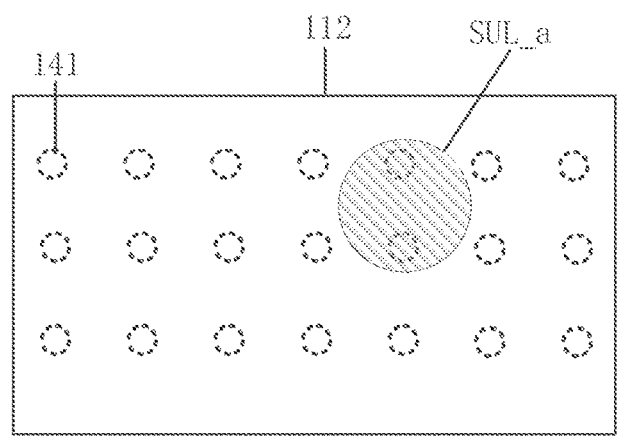
FIG. 8C is a schematic diagram of an arrangement mode of a sensor of a head-up display device that does not include a diffusion element provided by at least one embodiment of the present disclosure.

FIG. 8B is a schematic diagram of the arrangement mode of the sensor 141 of the head-up display device 100 including the diffusion element 192 provided by at least one embodiment of the present disclosure. FIG. 8C is a schematic diagram of the arrangement mode of the sensor 141 of the head-up display device 100 without the diffusion element 192 provided by at least one embodiment of the present disclosure.

For example, as illustrated in FIGS. 8B and 8C, in the case where the head-up display device 100 does not include the diffusion element 192, the light SUL_1 (light at a certain time) from the outside of the encapsulation housing 142 and passing through the image generating element 120 irradiates the region SUL_a of the first surface of the light-emitting driving substrate 112. In the case where the head-up display device 100 includes the diffusion element 192, the light SUL_1 (light at a certain time) from the outside of the encapsulation housing 142 and passing through the image generating element 120 irradiates the region SUL_b of the first surface of the light-emitting driving substrate 112; the area of the region SUL_b is larger than that of the SUL_a. Therefore, by providing the diffusion element 192, the distance between adjacent sensors 141 can be increased under the condition of achieving a good early warning effect (for example, without increasing the missed alarm), and thus the number of the sensors 141 can be reduced. For example, as illustrated in FIG. 8B, in the case where the head-up display device 100 does not include the diffusion element 192, and the sensor 141 arrangement mode illustrated in FIG. 8B is adopted (for example, the distance between adjacent sensors 141 is large), sunlight with certain transmission characteristics (for example, transmission angle) will be irradiated into the gaps between adjacent sensors 141, which may cause missed alarm. Because the diffusion element 192 can diffuse the area of the region irradiated by the light that is from the outside of the encapsulation housing 142, passes through the image generating element 120 and irradiates the light-emitting driving substrate 112 at the same time, the distance between adjacent sensors 141 can be increased while achieving a better early warning effect.

It should be noted that the arrangement mode of the sensors 141 illustrated in FIG. 8B, FIG. 8C and other figures are only examples, and those skilled in the art can adopt an appropriate arrangement mode based on the arrangement mode of the sensors 141 illustrated in at least one embodiment of the present disclosure, which will not be repeated here.

Figure 9:
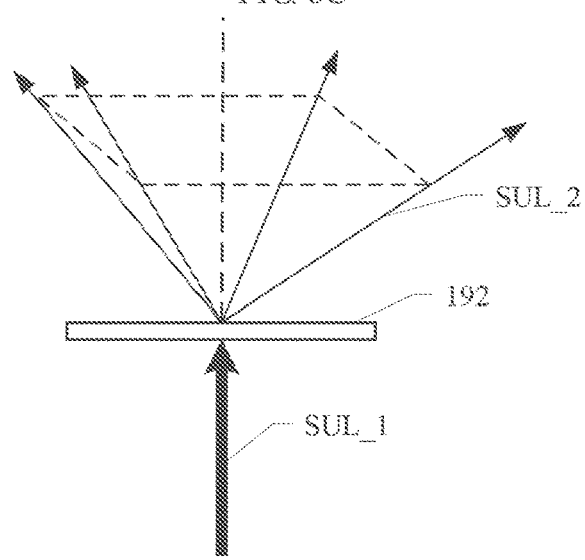
FIG. 9 is a schematic diagram of a diffusion element in a head-up display device provided by at least one embodiment of the present disclosure that diffuses light having the same transmission direction.
Figure 10:
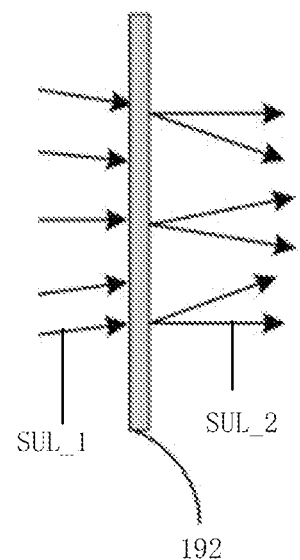
FIG. 10 is a schematic diagram of a diffusion element in a head-up display device provided by at least one embodiment of the present disclosure that diffuses light having multiple transmission directions.

The diffusion element 192 provided by at least one embodiment of the present disclosure is explained below by way of example with reference to FIGS. 9 and 10. FIG. 9 is a schematic diagram of the diffusion element 192 in the head-up display device 100 provided by at least one embodiment of the present disclosure which diffuses light having the same transmission direction; FIG. 10 is a schematic diagram of the diffusion element 192 in the head-up display device 100 provided by at least one embodiment of the present disclosure which diffuses light with multiple transmission directions.

For example, as illustrated in FIGS. 9 and 10, the diffusion element 192 is configured to diffuse the light SUL_1 incident on the diffusion element 192 (for example, the light SUL_1 from the outside of the encapsulation housing 142 and passing through the image generating element 120) to form a light beam SUL_2 with a predetermined cross-sectional shape, which may be but not limited to linear, circular, elliptical, square or rectangular shapes. For example, the cross-sectional shape of the light beam refers to the shape of the cross section obtained by cutting the light beam exiting the diffusion element 192 by using a plane parallel to the diffusion element 192, for example, the cross section of the light beam is parallel to the diffusion element 192. For another example, the cross-sectional shape of the light beam refers to the shape of the cross section obtained by cutting the light beam exiting the diffusion element 192 by using a plane perpendicular to the center line or main transmission axis of the light beam (for example, the dotted line illustrated in FIG. 9), for example, the cross section of the light beam is perpendicular to the center line of the light beam. For example, as illustrated in FIG. 9, the main transmission axis of the light beam diffused by the diffusion element 192 is the same as the transmission direction of the light beam before diffusion.

For example, the larger the diffusion angle of the diffusion element 192 (e.g., the larger the distribution angle of the diffused light beam), the larger the area of the region of the light-emitting driving substrate 112 irradiated by the light beam diffused by the diffusion element 192, but the smaller the brightness (e.g., intensity per unit area) of the light beam diffused by the diffusion element 192.

It can be explained that the diffusion angle can refer to two times of the angle between a certain light emitting direction and an axial direction of the light source 111, in which the intensity value of light in this light emitting direction is half of the intensity value of light in the axial direction (for example, the central light), or it can also refer to the angle between the two maximum diffusion axes.

For example, the diffusion element 192 has a plate-like appearance. For example, the diffusion element 192 includes at least one of a diffractive optical element or a scattering optical element.

For example, the diffusion element 192 can be a low-cost scattering optical element, such as a light homogenizer, a diffusion sheet, and the like. When a light beam passes through a scattering optical element such as a light homogenizer, it can be scattered, and a small amount of diffraction can also occur, during which scattering can play a major role, and a larger light spot will be formed after the light beam passes through the scattering optical element.

For example, the diffusion element 192 can also be a diffractive optical element (DOE) that controls the diffusion effect more accurately, such as a beam shaper. For example, by designing microstructures on the surface, the diffractive optical element can diffuse the light beam through diffraction, the light spot is small and the size and shape of the light spot can be controlled. After passing through the beam shaping element, the light rays will spread out and form a light beam with a predetermined cross-sectional shape, including but not limited to linear, circular, elliptical, square or rectangular shapes. For example, by controlling the microstructure of the diffractive optical element, the diffusion angle and the cross-sectional shape of light can be accurately controlled, and the diffusion effect can be accurately controlled.

For example, because at least one light source 111 and at least one sensor 141 are both arranged on the light-emitting driving substrate 112, by arranging the diffusion element 192 between the image generating element 120 and the at least one sensor 141, the diffusion element 192 can be further configured to allow the light emitted by the at least one light source 111 to be more uniform, thereby enabling the image light IML output by the image generating element 120 to be more uniform, and further improving the display effect of the head-up display device 100. For example, the diffusion element 192 can uniformly diffuse the light emitted by the at least one light source 111, so that the image light IML emitted by the image generating element 120 is more uniform.

In some examples (for example, the example illustrated in FIG. 18), the head-up display device 100 may be provided with a reflective light guide element 150 and a diffusion element 192. For example, the diffusion element 192 is located between the image generating element 120 and the reflective light guide element 150. In this case, the diffusion element 192 and the reflective light guide element 150 are jointly configured to allow the light SUL that is from the outside of the encapsulation housing 142 and passes through the image generating element 120 to be irradiated into a larger region (compared with the example where the reflective light guide element 150 is provided but the diffusion element 192 is not provided) in the first region REG_1 of the light-emitting driving substrate 112 at a specific time (for example, the time when the light from the outside of the encapsulation housing 142 is irradiated on the light-emitting driving substrate), thus the number of the sensors 141 can be further reduced. For example, the head-up display device 100 is provided with the reflective light guide element 150 and the diffusion element 192, so that it is not only unnecessary to provide the sensor 141 in the second region REG_2 outside the first region REG_1, but also possible to increase the spacing between adjacent sensors 141 provided in the first region REG_1.

For example, the head-up display device 100 further includes a light shielding element. The controller is further configured to drive the light shielding element to switch from a first state to a second state in response to the intensity of light from the outside of the encapsulation housing 142, passing through the image generating element 120 and incident on the at least one sensor 141 being greater than or equal to a predetermined light intensity threshold; in the first state, the light shielding element allows the light from the outside of the encapsulation housing 142 to be incident on the image generating element 120; in the second state, the light shielding element prevents the light from the outside of the encapsulation housing 142 from being incident on the image generating element 120.

For example, by including a light shielding element in the head-up display device 100, the automatic shading function of the head-up display device 100 can be realized. The following is an exemplary description with reference to FIGS. 11-13A.

Figure 11:
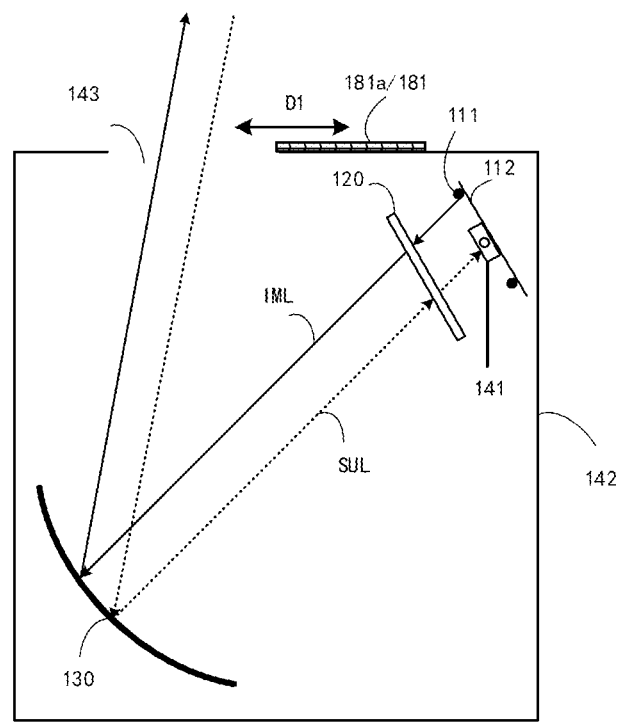
FIG. 11 illustrates a schematic diagram of a first state of a first example of a light shielding element provided by at least one embodiment of the present disclosure.
Figure 12:
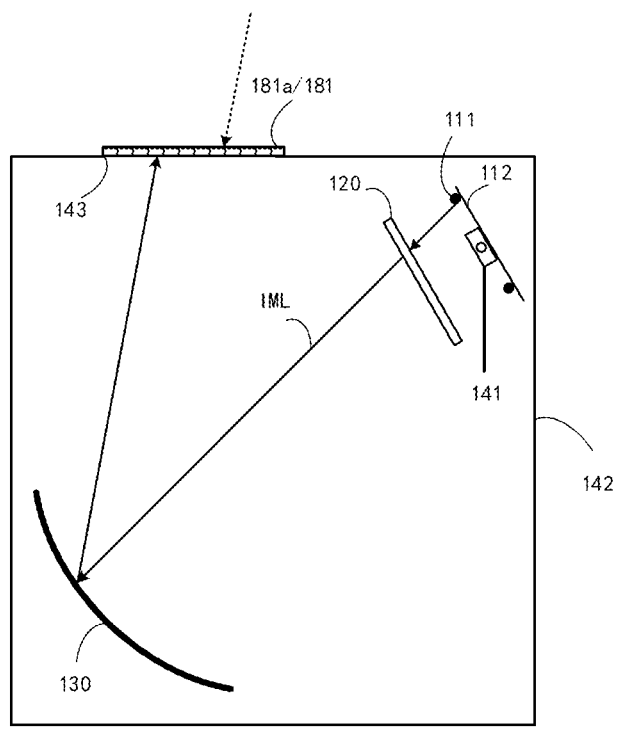
FIG. 12 illustrates a schematic diagram of a second state of a first example of a light shielding element provided by at least one embodiment of the present disclosure.

FIG. 11 illustrates a schematic diagram of a first state of a first example of a light shielding element (light-shielding coverable element 181) provided by at least one embodiment of the present disclosure, and FIG. 12 illustrates a schematic diagram of a second state of the first example of a light shielding element (the light-shielding coverable element 181) provided by at least one embodiment of the present disclosure.

In the first example, as illustrated in FIGS. 11 and 12, the light shielding element may include a light-shielding coverable element 181, and the light shielding element may include a light shielding plate 181a which may be disposed close to the second opening 143 (for example, the light outlet of the head-up display device 100) of the encapsulation housing 142.

For example, in the case where the intensity of light from the outside of the encapsulation housing 142, passing through the image generating element 120 and incident on the at least one sensor 141 is less than a predetermined light intensity threshold, the light shielding element is in the first state. For example, as illustrated in FIG. 11, in the first state, at least part of the orthographic projection of the light shielding element on the plane where the second opening 143 is located does not overlap with the second opening 143 (for example, having no overlap at all), so that the light shielding element in the first state allows the light from the outside of the encapsulation housing 142 to be incident on the image generating element 120.

For example, in the case where the intensity of light from the outside of the encapsulation housing 142, passing through the image generating element 120 and incident on the at least one sensor 141 is greater than or equal to the predetermined light intensity threshold, the controller is further configured to drive the light shielding element to switch from the first state to the second state in response to the intensity of light from the outside of the encapsulation housing 142, passing through the image generating element 120 and incident on the at least one sensor 141 being greater than or equal to the predetermined light intensity threshold. For example, as illustrated in FIG. 12, in the second state, the orthographic projection of the light shielding element on the plane where the second opening 143 is located at least partially overlaps (for example, completely overlaps) with the second opening 143, so that the light shielding element in the first state prevents the light from the outside of the encapsulation housing 142 from being incident on the image generating element 120.

For example, after receiving a light shielding signal, the light shielding plate 181a may slide in the direction D1 illustrated in FIG. 11 to cover (e.g., completely cover) the second opening 143 of the encapsulation housing 142. In some examples, after receiving the light shielding signal, the light shielding plate 181a may also cover (e.g., completely cover) the second opening 143 of the encapsulation housing 142 by turning over.

It should be noted that, the light shielding element 181 is not limited to be arranged at the light outlet (for example, the second opening 143) of the head-up display device 100, but can also be arranged close to the curved mirror, close to the plane mirror or close to the image generating element 120. After receiving the light shielding signal, the light shielding element 181 can be translated or turned over to cover the light outlet, the curved mirror, the plane mirror or the image generating element 120, and the light shielding plate 181a can be used to shield the sunlight from propagating to the image generating element 120.

For example, besides the light shielding plate 181a, the light shielding element 181 also includes a transmission gear (not illustrated in the figure) and a power device (not illustrated in the figure); the output shaft of the power device is fixedly connected with the center of the transmission gear, and the light shielding plate 181a includes a shading arm and a transmission arm, the outer end of the transmission arm is provided with a transmission rack which can be connected with the transmission gear in a transmission way, and the transmission gear can drive the rack to translate when rotating. Upon receiving the light shielding signal, the power device drives the transmission gear to rotate, and the transmission gear drives the transmission arm of the light shielding plate 181a to move, so that the shading arm moves to the surface of the light outlet, the image generating element 120 or the reflective element 130 to shade the sunlight.

Figure 13A:
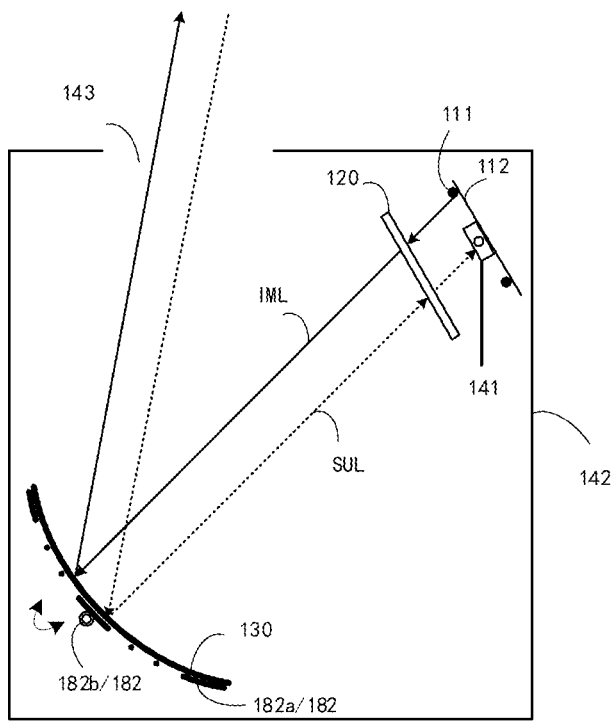
FIG. 13A is a schematic diagram of a second example of a light shielding element provided by at least one embodiment of the present disclosure.
Figure 13B:
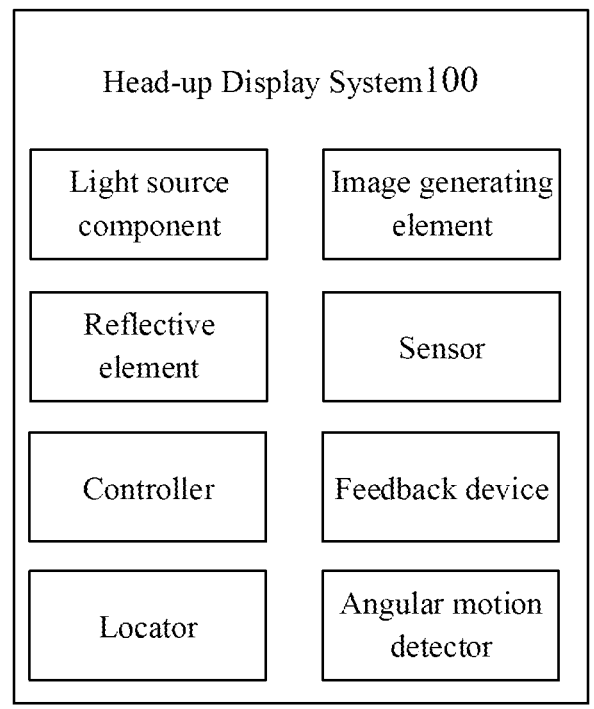
FIG. 13B is a schematic block diagram of another head-up display device provided by at least one embodiment of the present disclosure.

FIG. 13A is a schematic diagram of a second example of a light shielding element (the light-shielding reversible element 182) provided by at least one embodiment of the present disclosure.

In the second example, as illustrated in FIG. 13A, the light shielding element may include a light-shielding reversible element 182. For example, as illustrated in FIG. 13A, the light-shielding reversible element 182 can include a bottom plate 182a with a rotating shaft 182b, a transmission gear and a power device, in which the bottom plate 182a is fixed on the back surface of the curved mirror, the output shaft of the power device is fixedly connected with the center of the transmission gear, and one end of the rotating shaft is provided with a gear in transmission connection with the transmission gear, and the transmission gear can drive the rotating shaft to rotate upon rotating. Upon receiving the light shielding signal, the bottom plate 182a rotates along the rotation axis to drive the image generating element 120 or the reflective element 130 to rotate, so as to turn the sunlight towards the direction that the sunlight cannot be irradiated on the image generating element 120. In some examples, the bottom plate 182a may also be fixed on the side surface of the curved mirror, or fixed on the back surface or side surface of the image generating element 120 and the plane mirror.

In some examples, the light shielding element provided by at least one embodiment of the present disclosure may further include a light-shielding coverable element 181 and a light-shielding reversible element 182.

For example, the head-up display device 100 includes a feedback device. The controller is also configured to allow the light-shielding element to switch from the second state to the first state in response to a recovery instruction output by the feedback device, so that when the external light cannot damage the image generating element 120, the light from the outside of the encapsulation housing 142 can be incident on the image generating element 120 and the image light IML output by the image generating element 120 can exit from the second opening 143, so that the head-up display device 100 can display an image. For example, the head-up display device 100 further includes a feedback device, so that the head-up display device 100 can be automatically turned on when external light cannot damage the image generating element 120, thereby improving the user experience. For example, in the case where the feedback device does not output the recovery instruction, the controller is further configured to keep the light shielding element in the current state (e.g., the second state).

In the first example, the feedback device is configured to output a recovery instruction in response to the orientation of the second opening 143 of the encapsulation housing 142 not matching the current position of the sun. For example, the mismatch between the orientation of the second opening 143 of the encapsulation housing 142 and the current position of the sun includes that the orientation of the second opening 143 and the current position of the sun together prevent sunlight from being incident on the reflective element 130, or the orientation of the second opening 143 and the current position of the sun together prevent sunlight incident on the reflective element 130 from being reflected onto the image generating element 120.

For example, in the first example described above, as illustrated in FIG. 13B, the head-up display device 100 further includes a locator and an angular motion detector. The locator is used for acquiring the latitude and longitude of the current geographical position of the head-up display device 100; the angular motion detector is used to collect the current angular motion parameters of the head-up display device 100; the feedback device is further configured to determine whether the orientation of the second opening 143 of the encapsulation housing 142 matches the position of the sun based on the latitude and longitude of the current geographical position of the head-up display device 100 and the current position of the sun. For example, the angular motion parameters of the head-up display device 100 include a pitch angle, a roll angle and a yaw angle of the head-up display device 100. For example, the specific implementation of the locator and the angular motion detector can be set according to the actual application requirements. For example, the angular motion detector may include an inertial measurement unit; the locator includes a chip based on GPS (Global Positioning System).

For example, in the first example, the feedback device includes a processor and a memory on which executable instructions can be stored; when executed by the processor, the executable instructions can realize corresponding functions (for example, whether the orientation of the second opening 143 of the encapsulation housing 142 matches the position of the sun is determined based on the latitude and longitude of the current geographical position of the head-up display device 100 and the current position of the sun). For example, the processor and memory included in the feedback device can reuse the processor and memory included in the controller, which will not be repeated here.

In the second example, the feedback device is configured to output a recovery instruction in the case where the time length of the light shielding element being in the second state is greater than a predetermined time length threshold. Correspondingly, the controller allows the light shielding element to switch from the second state to the first state. If the intensity of the light from the outside of the encapsulation housing 142, passing through the image generating element 120 and incident on the at least one sensor 141 is still greater than or equal to the predetermined light intensity threshold, the controller drives the light shielding element to switch from the first state to the second state again, until the intensity of the light from the outside of the encapsulation housing 142, passing through the image generating element 120 and incident on the at least one sensor 141 is less than the predetermined light intensity threshold. For example, the predetermined time length threshold may be 5 seconds, 10 seconds, 15 seconds, 20 seconds or other suitable values.

For example, in the second example, the feedback device includes a processor and a memory on which executable instructions can be stored; when executed by the processor, the executable instructions can realize corresponding functions (for example, determining whether the time length of the light shielding element being in the second state is greater than a predetermined time length threshold). For example, the processor and memory included in the feedback device can reuse the processor and memory included in the controller, which will not be repeated here.

In the third example, the head-up display device 100 further includes a sensor 145 for feedback, and the feedback device is configured to output a recovery instruction in response to the light intensity data output by the sensor 145 for feedback when the light shielding element is in the second state being smaller than the second light intensity threshold. The following is an exemplary description with reference to FIGS. 14 and 15.

Figure 14:
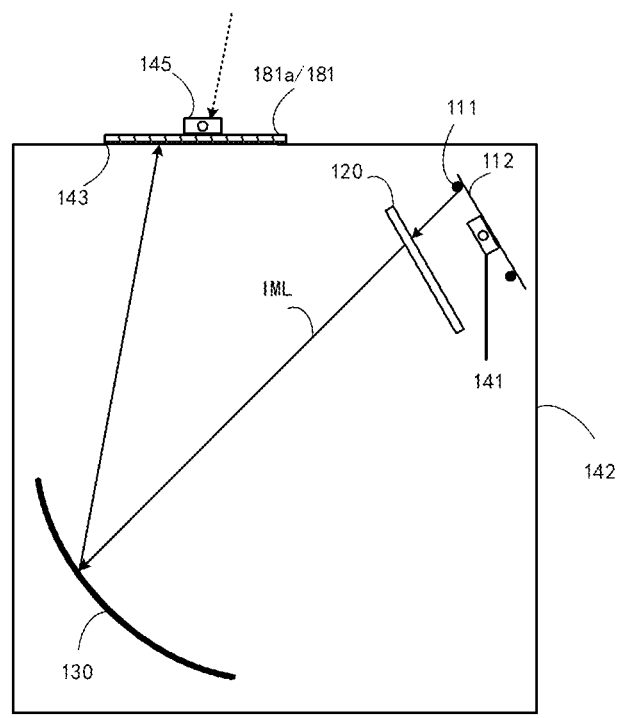
FIG. 14 is a schematic diagram of another head-up display device provided by at least one embodiment of the present disclosure.

FIG. 14 is a schematic diagram of another head-up display device 100 provided by at least one embodiment of the present disclosure. As illustrated in FIG. 14, the head-up display device 100 includes a light-shielding coverable element 181 and a sensor 145 for feedback. The sensor 145 for feedback is located at the side of the light-shielding coverable element 181 away from the reflective element 130, and the sensor 145 for feedback faces away from the reflective element 130. With the head-up display device 100 illustrated in FIG. 14, the feedback device is configured to receive the light intensity data output by the sensor 145 for feedback when the light-shielding coverable element 181 covers the light outlet, and to output a recovery instruction when the light intensity data is less than the second light intensity threshold.

For the example in which the light-shielding coverable element 181 is between the curved mirror and the image generating element 120, a sensor 145 for feedback may be provided at the side of the light shielding element 181 close to the curved mirror. For example, in the example that the light-shielding coverable element 181 is between the curved mirror and the plane mirror, the feedback device can be arranged around or behind the curved mirror, but not around or behind the plane mirror.

Figure 15:
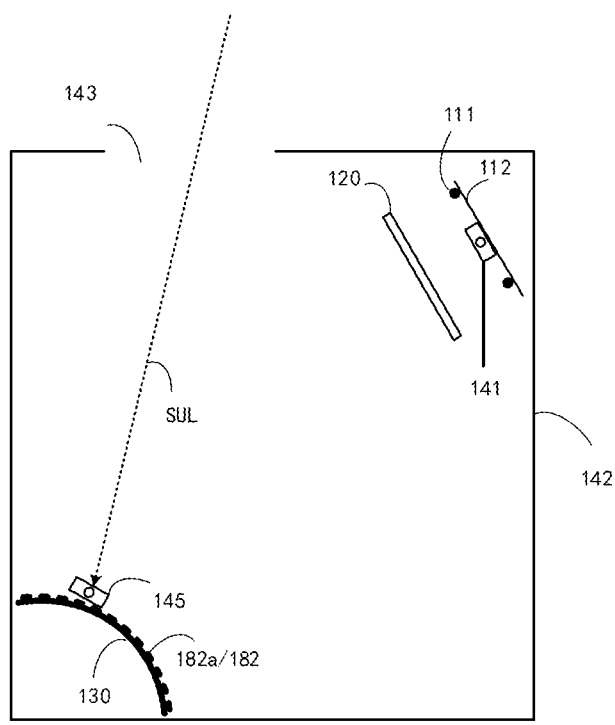
FIG. 15 is a schematic diagram of a second state of another head-up display device provided by at least one embodiment of the present disclosure.

FIG. 15 is a schematic diagram of a second state of another head-up display device 100 provided by at least one embodiment of the present disclosure. As illustrated in FIG. 15, the head-up display device 100 includes a light-shielding reversible element 182 and a sensor 145 for feedback, and the sensor 145 for feedback is located at the side of the reflective element 130 where a reflecting surface is not provided. For example, the sensor 145 for feedback is located behind the reflective element 130.

For example, for the head-up display device 100 illustrated in FIG. 15, the feedback device is configured to receive the light intensity data output by the sensor 145 for feedback when the light-shielding reversible element 182 is in the second state (for example upon the light-shielding reversible element 182 turning the reflective element 130), and to output a recovery instruction upon the light intensity data being less than the second light intensity threshold, so that the light-shielding reversible element 182 is switched from the second state to the first state to turn the reflective element 130 back to its original position.

For example, in the third example, the feedback device includes a processor and a memory on which executable instructions can be stored; when executed by the processor, the executable instructions can realize corresponding functions (for example, determining whether the light intensity data output by the sensor 145 for feedback when the light shielding element is in the second state is smaller than the second light intensity threshold).

The inventor of the present disclosure has also found in the research that: it is possible to reduce the risk that the image generating element 120 is damaged by light (e.g., sunlight) from the outside of the encapsulation housing 142 by issuing an alarm in response to the intensity of light from the outside of the encapsulation housing 142, passing through the image generating element 120 and incident on the at least one sensor 141 being greater than or equal to a predetermined light intensity threshold; however, at the same time when the head-up display device 100 issues an alarm, the light from the outside of the encapsulation housing 142 has been focused at a position close to the image generating element 120. In this case, before the head-up display device 100 is turned off or the light shielding element is used for shielding, the light from the outside of the encapsulation housing 142 may have already adversely affected the image generating element 120, for example, having damaged the image generating element 120.

In this regard, the inventor of the present disclosure has found in the research that the reliability of the head-up display device 100 provided by at least one embodiment of the present disclosure can be improved by allowing the head-up display device 100 to further include an optical filtering element 193 arranged on the light propagation path from the second opening 143 of the encapsulation housing 142 to the image generating element 120, and by using the optical filtering element 193 to reduce the intensity of light SUL from the outside of the encapsulation housing 142 and passing through the image generating element 120. For example, the head-up display device 100 further includes the optical filtering element 193, so that the early warning accuracy and reliability of the head-up display device 100 provided by at least one embodiment of the present disclosure can be improved.

Figure 16:
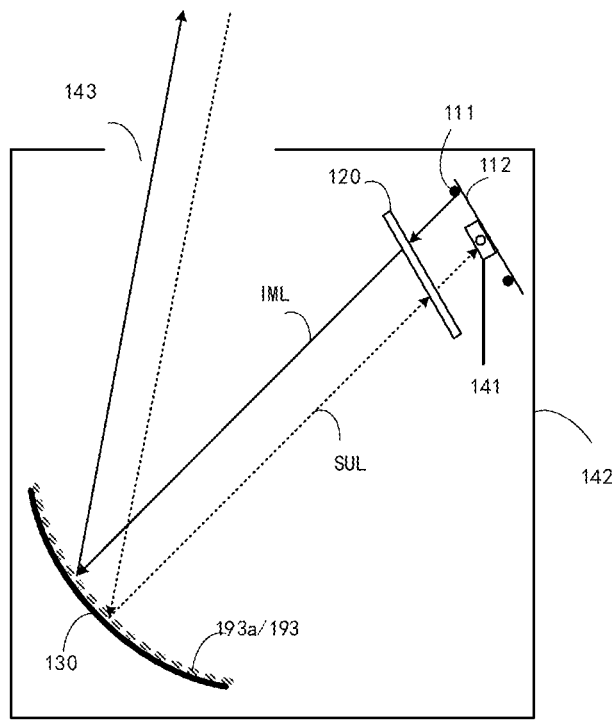
FIG. 16 is a schematic diagram of a first example of an optical filtering element provided by at least one embodiment of the present disclosure.
Figure 17:
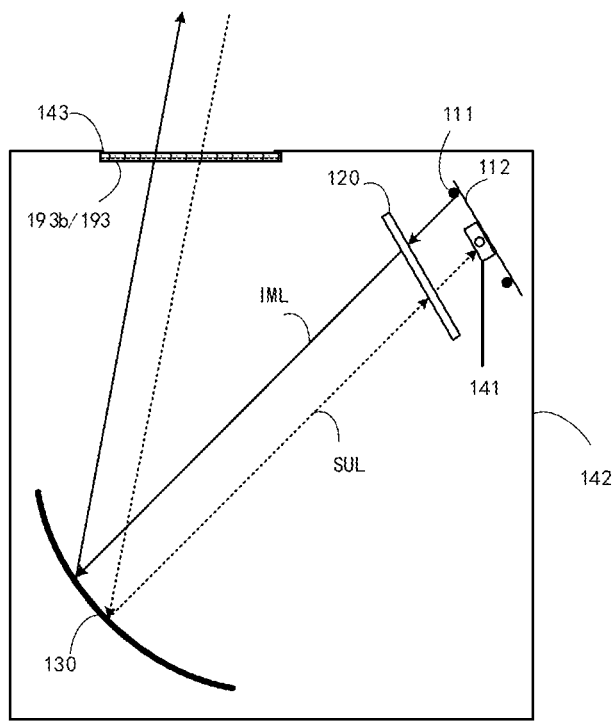
FIG. 17 is a schematic diagram of a second example of an optical filtering element provided by at least one embodiment of the present disclosure.

The implementation of the optical filtering element 193 provided by at least one embodiment of the present disclosure will be explained below by way of example with reference to FIG. 16 and FIG. 17. FIG. 16 is a schematic diagram of a first example of an optical filtering element 193 provided by at least one embodiment of the present disclosure, and FIG. 17 is a schematic diagram of a second example of an optical filtering element 193 provided by at least one embodiment of the present disclosure.

In some examples, the optical filtering element 193 is a reflective optical filtering element 193*a* and is located on the light reflecting surface of the reflective element 130. For example, as illustrated in FIG. 16, in the case where the reflective element 130 only includes a curved mirror, the reflective optical filtering element 193*a* is disposed on the light reflecting surface of the curved mirror. For example, in the case where the reflective element 130 includes a curved mirror and a plane mirror, the reflective optical filtering element 193*a* is provided on at least one of the light reflecting surfaces of the curved mirror and the plane mirror.

In some other examples, the optical filtering element 193 is a reflective optical filtering element 193*a*, and the reflective optical filtering element 193*a* is an element integrated with a reflective element (for example, a curved mirror or a plane mirror of the reflective element). For example, the reflective optical filtering element 193*a* can realize the reflection function of the curved mirror and the function of the optical filtering element 193. For another example, the reflective element is also configured to realize the function of the optical filtering element 193.

In some other examples, the optical filtering element 193 is implemented as a transmissive optical filtering element 193*b*, and is located on the optical path from the image generating element 120 to the second opening 143. For example, the transmissive optical filtering element 193*b* may be disposed at the side of the image generating element 120 close to the reflective element 130 (for example, the curved mirror of the reflective element 130). For example, as illustrated in FIG. 17, the transmissive optical filtering element 193*b* can be arranged close to the second opening 143, so that the adverse effect on the display effect resulted by the light reflected or absorbed by the transmissive optical filtering element 193*b* can be minimized. For another example, as illustrated in FIG. 17, the transmissive optical filtering element 193*b* may be disposed at the side of the plane where the second opening 143 is located (the surface of the encapsulation housing 142 including the second opening 143) close to the reflective element 130, but at least one embodiment of the present disclosure is not limited thereto. For example, the transmissive optical filtering element 193*b* may also be disposed in the second opening 143 or at the side of the surface of the encapsulation housing 142 including the second opening 143 away from the reflective element 130.

In an example, the optical filtering element 193 is configured such that a first proportion of light from the outside of the encapsulation housing 142 and incident on the optical filtering element 193 is incident on the image generating element 120, and the spectral distribution of the light from the outside of the encapsulation housing 142 and incident on the optical filtering element 193 is substantially the same (for example, completely the same) as that of the first proportion of light incident on the image generating element 120. For example, because the first proportion is greater than zero but less than one, the intensity of the light from the outside of the encapsulation housing 142 and incident on the image generating element 120 can be reduced, and thus the early warning accuracy and reliability of the head-up display device 100 provided by at least one embodiment of the present disclosure can be improved. For example, "two spectral distributions are substantially the same" means that the center wavelengths of the corresponding peaks of the two spectra are substantially the same and the full width at half maximum of the corresponding peaks of the two spectra are substantially the same.

In the above example, the optical filtering element 193 has no wavelength selectivity for light of a specific wavelength band, for example, the optical filtering element 193 has substantially the same or similar reflectivity or transmissivity for light of different wavelengths, so that the spectral distribution of light from the outside of the encapsulation housing 142 and incident on the optical filtering element 193 is substantially the same as that of the first proportion of light incident on the image generating element 120. For example, the optical filtering element 193 has no wavelength selectivity for the reflectivity or transmittance of light in the near-infrared band, visible light band and ultraviolet band.

For example, in the above example, in the case where the optical filtering element 193 is implemented as a transmissive optical filtering element 193b, the transmittance of the transmissive optical filtering element 193b to the light incident thereon may be T1 (for example, the above-mentioned first proportion), and correspondingly, the reflectivity or absorptivity of the transmissive optical filtering element 193b to the light incident thereon may be 1−T1. For example, T1 can be equal to 30%, 40%, 50%, 60%, 70% or other suitable values; correspondingly, the reflectivity or absorptivity of the transmissive optical filtering element 193b to the light incident thereon can be 70%, 60%, 50%, 40%, 30% or other suitable values.

For example, in the above example, in the case where the optical filtering element 193 is implemented as a reflective optical filtering element 193a, the reflectivity of the reflective optical filtering element 193a to the light incident thereon may be R1 (for example, the above-mentioned first proportion), and correspondingly, the absorptivity or transmissivity of the reflective optical filtering element 193a to the light incident thereon may be 1−R1. For example, R1 may be equal to 30%, 40%, 50%, 60%, 70% or other suitable values; correspondingly, the absorption or transmissivity of the reflective optical filtering element 193a to the light incident thereon can be 70%, 60%, 50%, 40%, 30% or other suitable values.

In the research, the inventor of the present disclosure has also found that in the case of using the above optical filtering element without wavelength selectivity, the optical filtering element 193 also reduces the intensity of light emitted by the image generating element 120, thereby reducing the brightness of the picture displayed by the head-up display device 100 (for example, reducing the imaging brightness) and the efficiency of the head-up display device 100.

Through a spectral analysis of sunlight, the inventor of the present disclosure has found that the energy of solar radiation is mainly distributed in visible light band, infrared band and ultraviolet band. The ratio of the energy of the light in the visible light band among the sunlight to the energy of the sunlight is about 50%. The ratio of the energy of the light in the infrared band among the sunlight to the energy of the sunlight is about 47%. The ratio of the energy of the light in the ultraviolet band among the sunlight to the energy of sunlight is about 7%. That is, the energy of the light in the ultraviolet band among the sunlight is relatively small. For example, through a spectral analysis of other types of light entering the encapsulation housing 142 from the outside of the encapsulation housing 142, the inventor of the present disclosure has also found that the energy of other types of light entering the encapsulation housing 142 from the outside of the encapsulation housing 142 is also mainly distributed in the visible light band, the infrared band and the ultraviolet band (especially in the visible light band). It can be explained that, for the convenience of description, the light entering the encapsulation housing 142 from the outside of the encapsulation housing 142 is taken as an example below for an exemplary explanation, but at least one embodiment of the present disclosure is not limited thereto.

Based on the above spectral analysis results and combined with experimental research, the inventor of the present disclosure has found that the optical filtering element 193 can be implemented an optical filtering element with wavelength selectivity, so that the external light can reach the image generating element 120 as little as possible while minimizing the adverse effects of the optical filtering element 193 on the image light IML. For example, the transmittance of the above-mentioned optical filtering element with wavelength selectivity to the light in the visible light band is greater than the second predetermined transmittance R0, so as to minimize the adverse effect of the optical filtering element 193 on the image light IML. For example, the second predetermined transmittance R0 is greater than 80%, 90%, 95%, 99.5% or other suitable values.

For example, the optical filtering element 193 is further configured such that at least part of light in a predetermined wavelength band that is from the outside of the encapsulation housing 142 and incident on the optical filtering element 193 can be incident on the image generating element 120, and the light outside the predetermined wavelength band that is from the outside of the encapsulation housing 142 and incident on the optical filtering element 193 can be filtered out. In this case, the optical filtering element 193 can not only reduce the intensity of the light from the outside of the encapsulation housing 142 and incident on the image generating element 120, but also reduce the adverse influence of the optical filtering element 193 on the display effect of the head-up display device 100, thereby improving the early warning accuracy and reliability of the head-up display device 100 provided by at least one embodiment of the present disclosure.

It can be explained that, in some examples, "the optical filtering element 193 is configured to filter out the light outside the predetermined wavelength that is from the outside of the encapsulation housing 142 and incident on the optical filtering element 193" means that the optical filtering element 193 allows the ratio of light from the outside of the encapsulation housing 142 and passing through the optical filtering element 193 that is outside the predetermined wavelength band to the light from the outside of the encapsulation housing 142 and incident on the optical filtering element 193 that is outside the predetermined wavelength band to be smaller than a predetermined ratio. For example, the predetermined ratio is 10%, 5%, 1%, 0.5%, 0.05% or other suitable values. For example, in the case where the optical filtering element 193 is implemented as a transmissive optical filtering element 193b, the transmissivity of the transmissive optical filtering element 193b to the light from the outside of the encapsulation housing 142 and incident on the optical filtering element 193 that is outside the predetermined wavelength band is less than the predetermined ratio. In the case where the optical filtering element 193 is implemented as a reflective optical filtering element 193a, the reflectivity of the reflective optical filtering element 193a to the light from the outside of the encapsulation housing 142 and incident on the optical filtering element 193 that is outside the predetermined wavelength band is less than the predetermined ratio.

In the first example, the predetermined wavelength band is a combined band of the visible light band and the ultraviolet band. For example, in the first example described above, the operating wavelength band of the sensor 141 may be the ultraviolet band (for example, the sensor 141 is implemented as an ultraviolet sensor).

For another example, in the above-mentioned first example, in the case where the optical filtering element 193 allows the intensity of the light that is outside the predetermined wavelength band and incident on the image generating element 120, among the light from the outside of the encapsulation housing 142 and incident on the optical filtering element 193, to satisfy the sensing requirements of the sensor 141, the operating wavelength band of the sensor 141 may be the infrared band (for example, the sensor 141 is implemented as an infrared sensor) or the operating wavelength band of the sensor 141 may be a combination of the infrared band and the ultraviolet band (for example, the sensor 141 is implemented as a combination of an infrared sensor and an ultraviolet sensor). It can be explained that the sensing requirement of the sensor 141 may mean that the electrical signal output by the sensor 141 corresponding to the intensity of light incident on the sensor 141 is larger than the noise signal output by the sensor 141 corresponding to the output of the sensor 141.

For another example, in the first example described above, the operating wavelength of the sensor 141 may be wavelengths outside the first wavelength band, the second wavelength band and the third wavelength band, in the visible light band (for example, 400 nm-780 nm). For example, in the case where the first wavelength band, the second wavelength band and the third wavelength band are 411 nm-480 nm, 500 nm-565 nm and 590 nm-690 nm, respectively, the operating wavelength of the sensor 141 can be at 400 nm-410 nm, 482 nm-499 nm, 566 nm-589 nm and 691 nm-780 nm. For example, a sensor operating in the visible light band (e.g., 400 nm-780 nm) can be adopted, a filter (referring to the arrangement positions of FIGS. 5B and 5C) can be arranged between the sensor 141 and the image generating element 120, and the filter can only transmit light at 400 nm-410 nm, 482 nm-499 nm, 566 nm-589 nm and 691 nm-780 nm in the visible light band. In this case, the sensor 141 can be used to sense the light at wavelength bands of 400 nm-410 nm, 482 nm-499 nm, 566 nm-589 nm and 691 nm-780 nm that passes through the image generating element 120 and is incident on the sensor 141.

For another example, in the above-mentioned first example, the operating wavelength of the sensor 141 can be any combination of wavelength bands outside the first wavelength band, second wavelength band and third wavelength band, in the infrared band, the ultraviolet band, and the visible light band.

For example, in the first example described above, in the case where the optical filtering element 193 is implemented as a transmissive optical filtering element 193b, the optical filtering element 193 can transmit at least part of the light from the outside of the encapsulation housing 142 and incident on the optical filtering element 193 that is in the visible band and the ultraviolet band, and can reflect or absorb the light from the outside of the encapsulation housing 142 and incident on the optical filtering element 193 that is outside the visible band and the ultraviolet band (for example, reflect or absorb the light in the infrared band).

Therefore, the optical filtering element 193 allows at least part of the light in the visible band and the ultraviolet band to be incident on the image generating element 120, filters out the light in the infrared band, and prevents most of the light in the infrared band from being incident on the image generating element 120, thereby reducing the intensity of the light incident on the image generating element 120, and further improving the early warning accuracy and reliability of the head-up display device 100 provided by at least one embodiment of the present disclosure.

For example, the visible light emitted by the image generating element 120 can be almost completely transmitted by the optical filtering element 193 without loss. In the sunlight, the light in the infrared band (for example, most of the light) is reflected or absorbed by the transmissive optical filtering element 193b, but cannot be incident on the image generating element 120. Only light in the visible band and the ultraviolet band in the sunlight passes through the optical filtering element 193 and is incident on the image generating element 120, so that only about 57% of the energy in the sunlight reaches the image generating element 120.

For example, in the first example described above, in the case where the optical filtering element 193 is implemented as a reflective optical filtering element 193a, the optical filtering element 193 can reflect at least part of the light from the outside of the encapsulation housing 142 and incident on the optical filtering element 193 that is in the visible band and the ultraviolet band, and can absorb or transmit the light from the outside of the encapsulation housing 142 and incident on the optical filtering element 193 that is outside the visible band and the ultraviolet band (for example, absorb or transmit the light in the infrared band).

In this way, the optical filtering element 193 reflects at least part of the light in the visible band and the ultraviolet band onto the image generating element 120, filters out the light in the infrared band, and prevents most of the light in the infrared band from being incident on the image generating element 120, thereby reducing the intensity of the light incident on the image generating element 120, and further improving the early warning accuracy and reliability of the head-up display device 100 provided by at least one embodiment of the present disclosure.

For example, the visible light emitted by the image generating element 120 can be almost completely reflected by the optical filtering element 193 without loss. In the sunlight, the light in the infrared band (for example, most of the light) is absorbed or transmitted by the transmissive optical filtering element 193b, but cannot be incident on the image generating element 120. Only light in the visible band and the ultraviolet band in the sunlight is reflected by the optical filtering element 193 and incident on the image generating element 120, so that only about 57% of the energy in the sunlight reaches the image generating element 120.

In the second example, the predetermined wavelength band is the visible wavelength band. In this case, the operating wavelength of the sensor 141 can be any combination of wavelength bands outside the first wavelength band, the second wavelength band and the third wavelength band, in the infrared band, the ultraviolet band and the visible light band. For example, the sensor 141 may be an infrared sensor or an ultraviolet sensor.

For example, in the second example described above, in the case where the optical filtering element 193 is implemented as a transmissive optical filtering element 193b, the optical filtering element 193 can transmit at least part of the light from the outside of the encapsulation housing 142 and incident on the optical filtering element 193 that is in the visible light band, and reflect or absorb the light from the outside of the encapsulation housing 142 and incident on the optical filtering element 193 that is outside the visible light band (for example, to reflect or absorb the light in the infrared band and the ultraviolet band).

In this way, the optical filtering element 193 allows at least part of the light in the visible light band to be incident on the image generating element 120, filters out the light in the infrared band and the ultraviolet band, and prevents most of the light in the infrared band and the ultraviolet band from being incident on the image generating element 120, thereby reducing the intensity of the light incident on the image generating element 120, and further improving the reliability of the head-up display device 100 provided by at least one embodiment of the present disclosure.

For example, the visible light emitted by the image generating element 120 can be almost completely transmitted by the optical filtering element 193 without loss. In the sunlight, the light in the infrared band and the ultraviolet band (for example, most of the light) is reflected or absorbed by the transmissive optical filtering element 193*b*, but cannot be incident on the image generating element 120. Only light in the visible light band of the sunlight passes through the optical filtering element 193 and is incident on the image generating element 120, so that only about 50% of the energy in the sunlight will reach the image generating element 120.

For example, in the second example described above, in the case where the optical filtering element 193 is implemented as a reflective optical filtering element 193*a*, the optical filtering element 193 can reflect at least part of the light from the outside of the encapsulation housing 142 and incident on the optical filtering element 193 that is in the visible light band, and absorb or transmit the light from the outside of the encapsulation housing 142 and incident on the optical filtering element 193 that is outside the visible light band (for example, to absorb or transmit the light in the infrared band and the ultraviolet band).

In this way, the optical filtering element 193 allows at least part of the light in the visible light band to be incident on the image generating element 120, filters out the light in the infrared band and the ultraviolet band, and prevents most of the light in the infrared band and the ultraviolet band from being incident on the image generating element 120, thereby reducing the intensity of the light incident on the image generating element 120, and further improving the reliability of the head-up display device 100 provided by at least one embodiment of the present disclosure.

For example, the visible light emitted by the image generating element 120 can be almost completely reflected by the optical filtering element 193 without loss. In the sunlight, the light in the infrared band and ultraviolet band (for example, most of the light) is absorbed or transmitted by the transmissive optical filtering element 193*b*, but cannot be incident on the image generating element 120. Only light in the visible light band of the sunlight is reflected by the optical filtering element 193 and incident on the image generating element 120, so that only about 50% of the energy in the sunlight reaches the image generating element 120.

The inventor of the present disclosure has found through spectral analysis that although the light emitted by some light source components is white light, because each of the plurality of light sources 111 included in the light source component is configured to emit monochromatic light (e.g., red light, green light or blue light), the wavelength of the light emitted by the above light source components (light in visible light band) lies in a plurality of (e.g., three) wavelength bands in the visible light band which are spaced apart from each other (e.g., the first wavelength band, the second wavelength band and the third wavelength band which are spaced from each other). In combination with the above spectral analysis results and experimental studies, the inventor of the present disclosure has also found that, for some of the above-mentioned light source components, the intensity of the light from the outside of the encapsulation housing 142 and incident on the image generating element 120 can be further reduced by allowing the optical filtering element 193 to filter out the light outside the first wavelength band, the second wavelength band and the third wavelength band in the sunlight.

In the third example, the predetermined wavelength band is a combination of the first wavelength band, the second wavelength band and the third wavelength band. In this case, the operating wavelength of the sensor 141 can be any combination of wavelength bands in the infrared band, ultraviolet band and visible light band which are outside the first wavelength band, the second wavelength band and the third wavelength band.

For example, in the above-mentioned third example, in the case where the optical filtering element 193 is implemented as a transmissive optical filtering element 193*b*, the optical filtering element 193 can transmit at least part of the light in the first wavelength band, the second wavelength band and the third wavelength band among the light from the outside of the encapsulation housing 142 and incident on the optical filtering element 193, and reflects or absorbs the light outside the first wavelength band, the second wavelength band and the third wavelength band among the light from the outside of the encapsulation housing 142 and incident on the optical filtering element 193 (for example, to reflect or absorb the light of wavelength bands outside the first wavelength band, the second wavelength band and the third wavelength band, in the infrared band, the ultraviolet band and the visible light band).

In this way, the optical filtering element 193 allows at least part of the light in the first wavelength band, the second wavelength band and the third wavelength band to be incident on the image generating element 120, filters out the light in the infrared band, the ultraviolet band and the visible light band that is outside the first wavelength band, the second wavelength band and the third wavelength band, and prevents most of the light in the infrared band, the ultraviolet band and the visible light band that is outside the first wavelength band, second wavelength band and third wavelength band from being incident on the image generating element 120, thereby reducing the intensity of the light incident on the image generating element 120, and further improving the reliability of the head-up display device 100 provided by at least one embodiment of the present disclosure.

For example, the visible light emitted by the image generating element 120 can be almost completely transmitted by the optical filtering element 193 without loss. In the sunlight, the light in the infrared band, ultraviolet band and visible light band that is outside the first wavelength band, the second wavelength band and the third wavelength band (for example, most of the light) is reflected or absorbed by the transmissive optical filtering element 193*b*, but cannot be incident on the image generating element 120. Only light in the first wavelength band, the second wavelength band and the third wavelength band of the sunlight passes through the optical filtering element 193 and is incident on the image generating element 120, thereby further reducing the intensity of the light incident on the image generating element 120.

For example, in the third example described above, in the case where the optical filtering element 193 is implemented as the reflective optical filtering element 193*a*, the optical filtering element 193 can reflect at least part of the light in the first wavelength band, the second wavelength band and the third wavelength band among the light from the outside of the encapsulation housing 142 and incident on the optical filtering element 193, and absorbs or transmits light outside the first wavelength band, the second wavelength band and the third wavelength band (for example, to absorb or transmit the light outside the first wavelength band, the second wavelength band and the third wavelength band, in the infrared band, ultraviolet band and visible light band) among the light from the outside of the encapsulation housing 142 and incident on the optical filtering element 193.

In this way, the optical filtering element 193 allows at least part of the light in the first wavelength band, the second wavelength band and the third wavelength band to be incident on the image generating element 120, filters out the light in the infrared band, ultraviolet band and visible light band that is outside the first wavelength band, the second wavelength band and the third wavelength band, and prevents most of the above-mentioned light in the infrared band, the ultraviolet band and the visible light band that is outside the first wavelength band, second wavelength band and third wavelength band from being incident on the image generating element 120, thereby reducing the intensity of the light incident on the image generating element 120, and further improving the reliability of the head-up display device 100 provided by at least one embodiment of the present disclosure.

For example, the visible light emitted by the image generating element 120 can be almost completely reflected by the optical filtering element 193 without loss. The light in the infrared band, ultraviolet band and visible light band that is outside the first wavelength band, the second wavelength band and the third wavelength band (for example, most of the light) of the sunlight is absorbed or transmitted by the reflective optical filtering element 193*a* but cannot be incident on the image generating element 120, and only the light in the first wavelength band, the second wavelength band and the third wavelength band of the sunlight is reflected by the optical filtering element 193 and incident on the image generating element 120, thereby reducing the intensity of the light incident on the image generating element 120.

The inventor of the present disclosure has found in the research that the image light IML output by some image generating elements 120 is light with a predetermined polarization state, for example, the image light IML output by a liquid crystal display panel has a linear polarization characteristic. In this regard, the inventor of the present disclosure found in the research that the optical filtering element 193 can be further configured to filter out the light outside the predetermined polarization state (for example, the polarization state of the image light IML output by the image generating element 120) among the light from the outside of the encapsulation housing 142 and incident on the optical filtering element 193, thereby further reducing the intensity of the light incident on the image generating element 120 without affecting the brightness of the displayed image of the head-up display device. In this case, the optical filtering element 193 provided by at least one embodiment of the present disclosure can be implemented as an optical filtering element 193 with polarization selectivity and wavelength selectivity.

For example, the predetermined polarization state is the same as the polarization state of the image light IML output by the image generating element 120. For example, the polarization state of the image light IML output by the image generating element 120 and the predetermined polarization state may be the first linear polarization state, and the light outside the predetermined polarization state may have the second linear polarization state, and the polarization direction of the first linear polarization state is perpendicular to the polarization direction of the second linear polarization state. For another example, the predetermined polarization state may also be circular polarization or elliptical polarization, which will not be described again. For example, the above-mentioned optical filtering element 193 with polarization selectivity and wavelength selectivity may include a laminated structure of a polarizer (for example, a linear polarizer) and a multilayered dielectric film.

For example, in the case where the optical filtering element 193 is implemented as a transmissive optical filtering element 193*b*, the optical filtering element 193 may transmit at least part of the light with the first linear polarization state (e.g., horizontal polarization state) in the first wavelength band, the second wavelength band and the third wavelength band among the light from the outside of the encapsulation housing 142 and incident on the optical filtering element 193, and reflect or absorb the light outside the first wavelength band, the second wavelength band and the third wavelength band (for example, to reflect or absorb the light outside the first wavelength band, the second wavelength band and the third wavelength band, in the infrared band, ultraviolet band and visible light band) among the light from the outside of the encapsulation housing 142 and incident on the optical filtering element 193 and the light with the second linear polarization in the first wavelength band, the second wavelength band and the third wavelength band among the light from the outside of the encapsulation housing 142 and incident on the optical filtering element 193.

In this way, the optical filtering element 193 allows at least part of the light with the first linear polarization state (e.g., horizontal polarization state) in the first wavelength band, the second wavelength band and the third wavelength band to be incident on the image generating element 120, and filters out the light in the infrared band, ultraviolet band and visible light band that is outside the first wavelength band, the second wavelength band and the third wavelength band and the light with the second linear polarization state in the first wavelength band, the second wavelength band and the third wavelength band. And most of the above-mentioned light in the infrared band, ultraviolet band and visible light band that is outside the first wavelength band, the second wavelength band and the third wavelength band and the light with the second linear polarization state in the first wavelength band, the second wavelength band and the third wavelength band cannot be incident on the image generating element 120. Thereby further reducing the intensity of the light incident on the image generating element 120 and further improving the reliability of the head-up display device 100 provided by at least one embodiment of the present disclosure.

For example, by allowing the optical filtering element 193 to have wavelength selectivity and polarization selectivity, the optical filtering element 193 can filter out most of the light in the sunlight. Therefore, in some examples, the optical filtering element 193 is arranged on the transmission device (for example, the transmission device includes a transmission gear and a power device) and can replace the light shielding element (for example, the light-shielding coverable element 181 illustrated in FIG. 14) in the previous examples, so that in the case where the light shielding element is in the second state, it will not affect the normal display of the head-up display device 100.

For example, the visible light emitted by the image generating element 120 can be almost completely transmitted by the optical filtering element 193 without loss. In the sunlight, most of the light in the infrared band, ultraviolet band and visible light band that is outside the first wavelength band, the second wavelength band and the third wavelength band and most of the light with the second linear polarization state in the first wavelength band, the second wavelength band and the third wavelength band are reflected or absorbed by the transmissive optical filtering element 193b, but cannot be incident on the image generating element 120. In the sunlight, only light with the first linear polarization state in the first wavelength band, the second wavelength band and the third wavelength band passes through the optical filtering element 193 and is incident on the image generating element 120, thereby further reducing the intensity of the light incident on the image generating element 120.

For example, in the case where the optical filtering element 193 is implemented as a reflective optical filtering element 193a, the optical filtering element 193 can reflect at least part of the light with the first linear polarization state (e.g., horizontal polarization state) in the first wavelength band, the second wavelength band and the third wavelength band among the light from the outside of the encapsulation housing 142 and incident on the optical filtering element 193, and absorbs or transmits light outside the first wavelength band, the second wavelength band and the third wavelength band (for example, absorbs or transmits light in the infrared band, ultraviolet band and visible light band that is outside the first wavelength band, the second wavelength band and the third wavelength band) and light with the second linear polarization in the first wavelength band, the second wavelength band and the third wavelength band among the light from the outside of the encapsulation housing 142 and incident on the optical filtering element 193.

In this way, the optical filtering element 193 allows at least part of the light in the visible light band to be incident on the image generating element 120, filters out the light in the infrared band, the ultraviolet band and the visible light band that is outside the first wavelength band, the second wavelength band and the third wavelength band and the light with the second linear polarization state in the first wavelength band, the second wavelength band and the third wavelength band, and prevents most of the above-mentioned light in the infrared band, ultraviolet band and visible light band that is outside the first wavelength band, the second wavelength band and the third wavelength band and the light with the second linear polarization state in the first wavelength band, the second wavelength band and the third wavelength band from being incident on the image generating element 120, thereby reducing the intensity of the light incident on the image generating element 120, and further improving the reliability of the head-up display device 100 provided by at least one embodiment of the present disclosure.

For example, the visible light emitted by the image generating element 120 can be almost completely reflected by the optical filtering element 193 without loss. In the sunlight, most of the light in the infrared band, ultraviolet band and visible light band that is outside the first wavelength band, the second wavelength band and the third wavelength band and most of the light with the second linear polarization state in the first wavelength band, the second wavelength band and the third wavelength band are transmitted or absorbed by the reflective optical filtering element 193a, but cannot be incident on the image generating element 120. In the sunlight, only light with the first linear polarization state in the first wavelength band, the second wavelength band and the third wavelength band is reflected by the optical filtering element 193 and is incident on the image generating element 120, thereby further reducing the intensity of the light incident on the image generating element 120.

For example, the optical filtering element 193 includes a selective transflective film formed by stacking inorganic oxide films or polymer films, and the transflective film is formed by stacking at least two types of film layers with different refractive indices. Here, "different refractive indices" means that the refractive indices of the film layers are different in at least one of three directions of xyz. By selecting the required film layers with different refractive indices in advance and stacking the film layers in a preset order, a transflective film with selective reflectivity and selective transmissivity can be formed. The transflective film can selectively reflect light with a certain characteristic and transmit light with another characteristic.

For example, for a film layer of inorganic oxide material, the composition of the film layer is selected from one or more selected from the group consisting of tantalum pentoxide ($Ta_2O_5$), titanium dioxide, magnesium oxide, zinc oxide, zirconium oxide, silicon dioxide, magnesium fluoride, silicon nitride, silicon oxynitride and aluminum fluoride. The film layer of organic polymer material includes at least two types of thermoplastic organic polymer films; these two types of thermoplastic polymer film layers are alternately arranged to form an optical film, and the refractive indices of these two types of thermoplastic polymer film layers are different. The molecules of organic polymer materials have a chain structure and are arranged towards a certain direction after stretching, resulting in different refractive indices in different directions. For example, the required thin films can be formed by a specific stretching process. The thermoplastic polymer can be, for example, PET (polyethylene terephthalate) with different polymerization degrees and its derivatives, PEN (polyethylene naphthalate) with different polymerization degrees and its derivatives, PBT (polybutylene terephthalate) with different polymerization degrees and its derivatives, etc., which are not limited here.

In some examples, the reflective light guide element 150 in the previous embodiments or examples (for example, the reflective light guide element 150 illustrated in FIG. 6A) can be reused to improve the utilization rate of light emitted by at least one light source 111. The diffusion element 192 in the previous embodiment or example can be reused to improve the display quality of the head-up display device 100. For example, the head-up display device 100 may further include a direction control element 160 (e.g., a lens).

Figure 18:
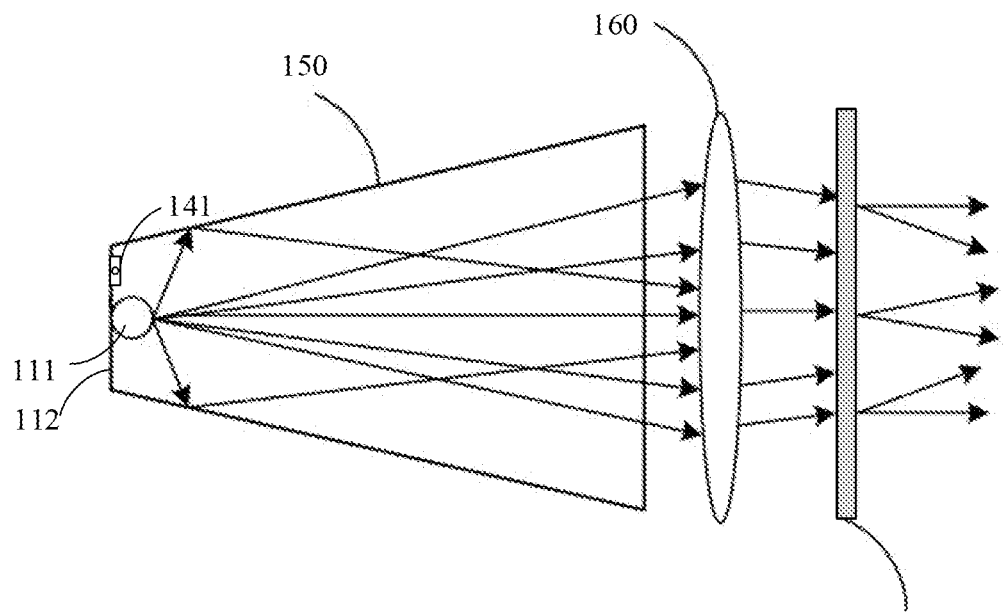
FIG. 18 is a schematic diagram of a partial region of another head-up display device provided by at least one embodiment of the present disclosure.

FIG. 18 is a schematic diagram of a partial region of another head-up display device 100 provided by at least one embodiment of the present disclosure. For example, as illustrated in FIG. 18, the light emitted by at least one light source 111 is sequentially incident onto (passes through) the reflective light guide element 150, the direction control element 160 and the diffusion element 192. The direction control element 160 is configured to converge the light passing through the reflective light guide element 150 and incident on the direction control element 160. The diffusion element 192 is configured to diffuse the light converged by the direction control element 160 and incident on the diffusion element 192.

For example, as illustrated in FIG. 18, the reflective light guide element 150 is arranged in the light emitting direction of the light source 111, and the light emitted by the light source 111 propagates inside the reflective light guide element 150 and exits towards the direction control element 160. The inner surface of the reflective light guide element 150 is provided with a reflecting surface, and the large-angle (the included angle with respect to the center line of the reflective light guide element 150) light emitted by the light source 111 will be reflected by the reflecting surface so as to be gathered, thus improving the utilization rate of the light emitted by the light source 111.

For example, as illustrated in FIG. 18, the direction control element 160 is used to control the direction of the light that is emitted by the at least one light source 111 and reflected by the reflective light guide element 150, so as to gather the light emitted by the at least one light source 111 to a predetermined range, thereby further gathering the light and improving the light utilization rate. The direction control element 160 can be, for example, a lens or a lens combination, such as a convex lens, a fresnel lens or a lens combination.

It can be noted that FIG. 18 schematically illustrates the direction control element 160 as a convex lens. However, it can be understood that the predetermined range can be a point, such as the focus point of a convex lens, or a small region. The purpose of setting the direction control element 160 is to further gather the large-angle light emitted by the light source 111 and improve the light utilization rate.

For example, as illustrated in FIG. 18, the diffusion element 192 can also diffuse at least one emitted light ray into a light beam with a certain distribution angle, and the smaller the diffusion angle, the higher the brightness of the light beam, and vice versa. The diffusion element 192 is also used to diffuse, at a certain angle, the light that is from at least one light source 111 and gathered by the reflective light guide element 150 and the direction control element 160, so as to increase the diffusion degree of the light and allow the light to be evenly distributed in a certain region.

For example, the diffusion element 192 can be a diffractive optical element, such as a beam shaper. After passing through the beam shaper, the light will be diffused and formed into a light beam with a specific cross-sectional shape, including but not limited to linear, circular, elliptical, square or rectangular shapes. For example, by controlling the microstructures of the diffractive optical elements, the diffusion angle and the cross-sectional shape of the light can be accurately controlled, and the diffusion effect can be accurately controlled.

It can be explained that the reflective light guide element 150 can reduce the distribution range of the light beam emitted by at least one light source 111 by gathering the light emitted by the at least one light source 111 (for example, reducing the cross-sectional area of the light beam emitted by at least one light source 111). The direction control element 160 converges the light emitted by the at least one light source 111 to reduce the distribution range of the light beam emitted by the at least one light source 111 (for example, to reduce the cross-sectional area of the light beam emitted by at least one light source 111). By diffusing the light beam incident thereon, the diffusion element 192 allows the light beam emitted by the at least one light source 111 to be more uniform on the reduced cross section of the light beam.

Figure 19:
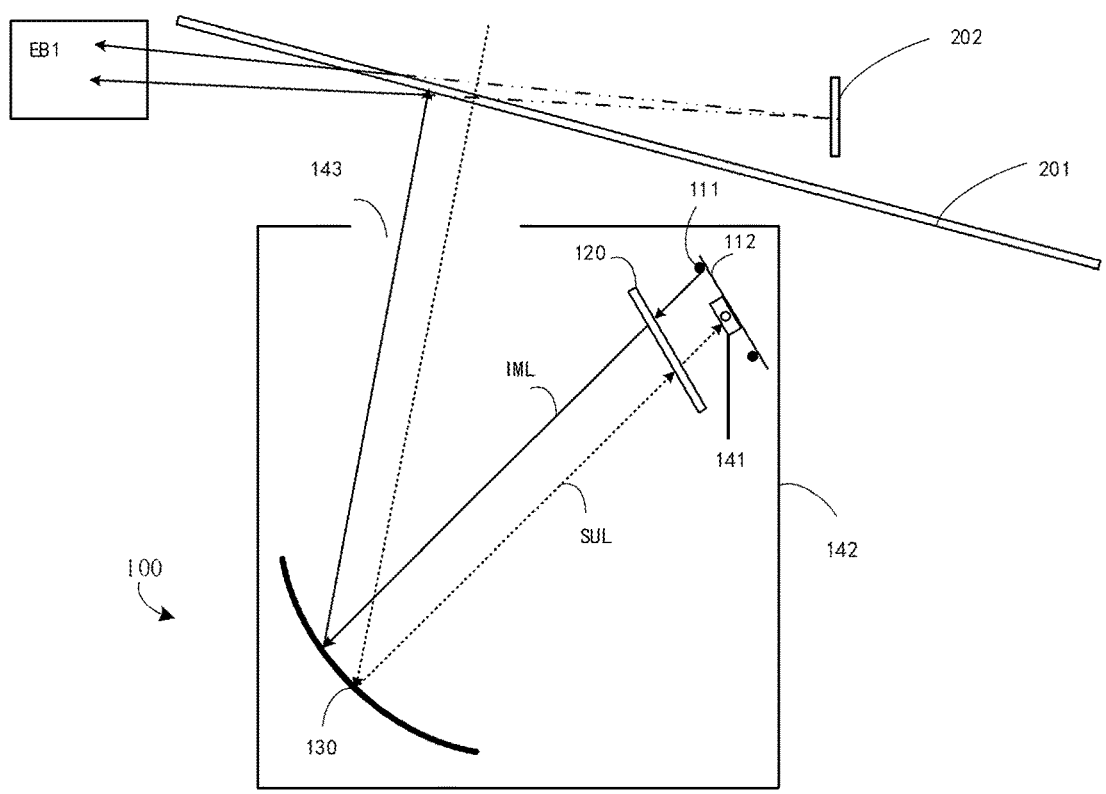
FIG. 19 is a schematic diagram of a head-up display system provided by at least one embodiment of the present disclosure.
Figure 20:
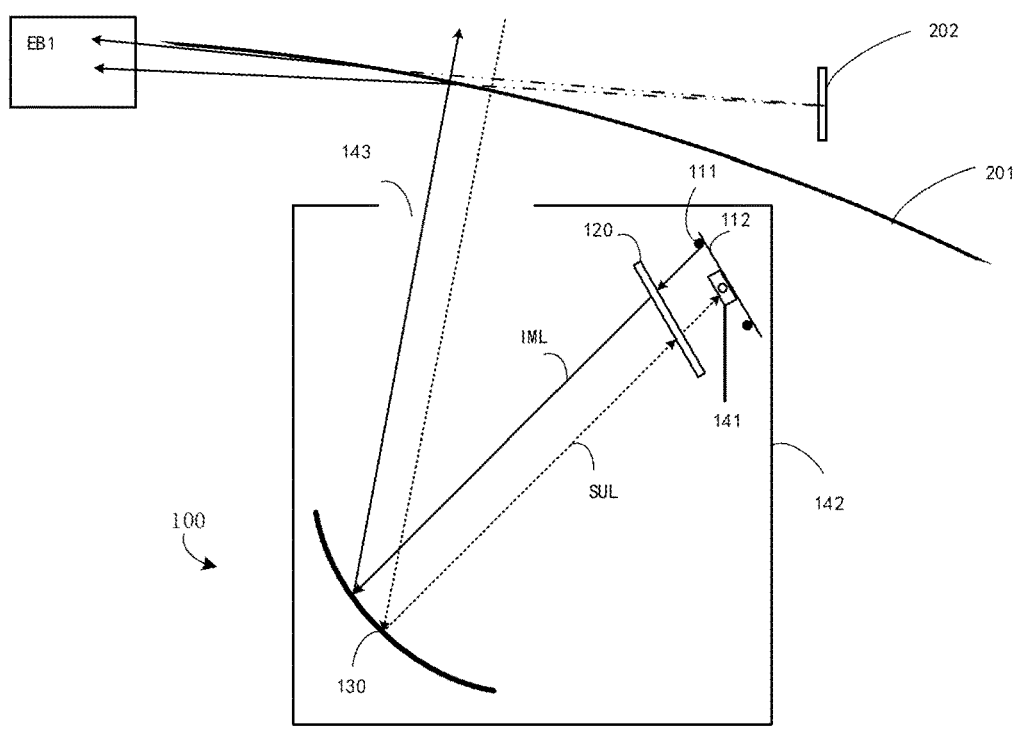
FIG. 20 is a schematic diagram of another head-up display system provided by at least one embodiment of the present disclosure.
Figure 21:
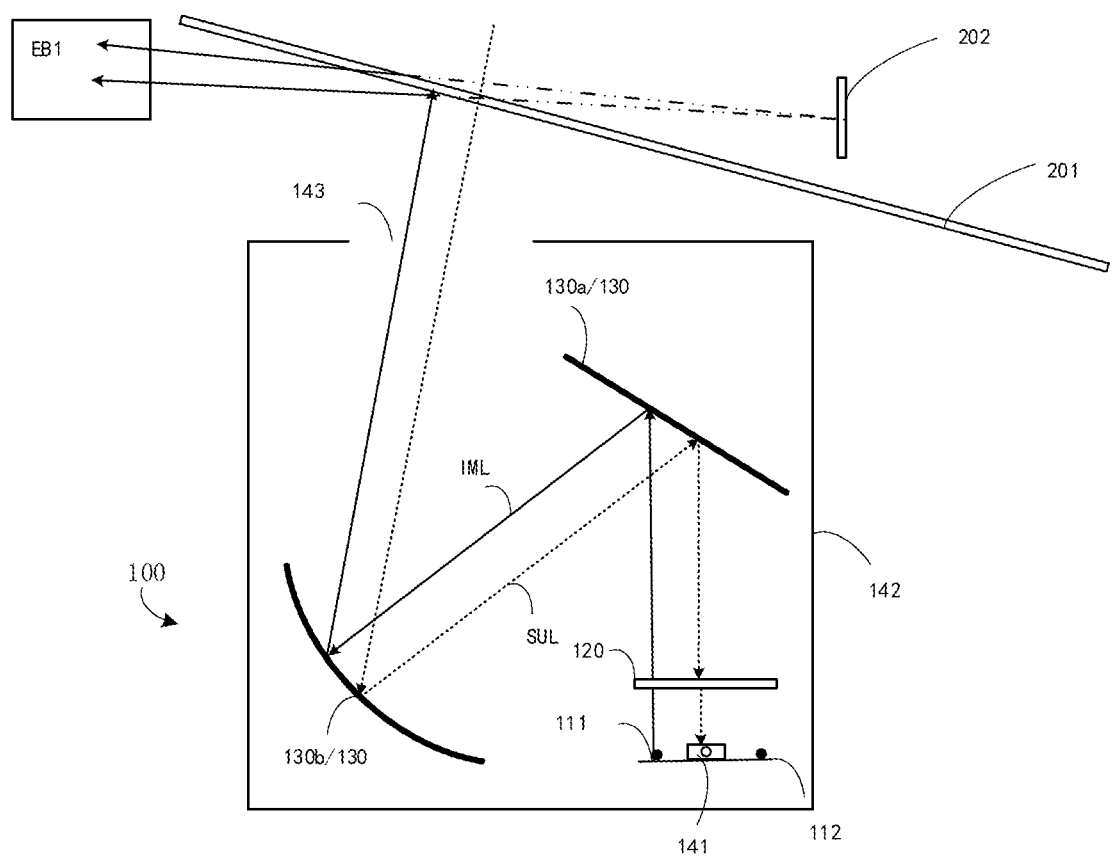
FIG. 21 is a schematic diagram of another head-up display system provided by at least one embodiment of the present disclosure.

At least one embodiment of the present disclosure provides a head-up display system 200. FIG. 19 is a schematic diagram of a head-up display system 200 provided by at least one embodiment of the present disclosure; FIG. 20 is a schematic diagram of another head-up display system 200 provided by at least one embodiment of the present disclosure; FIG. 21 is a schematic diagram of another head-up display system 200 provided by at least one embodiment of the present disclosure.

As illustrated in FIGS. 19-21, the head-up display system 200 includes a partially reflective and partially transmissive element 201 and any head-up display device 100 provided by at least one embodiment of the present disclosure. For example, the partially reflective and partially transmissive element 201 is configured to image a first virtual image (not illustrated in the figure) output by the head-up display device 100 to form a second virtual image 202.

For example, the partially reflective and partially transmissive element 201 can partially reflect and partially transmit light in the visible light band. As illustrated in FIGS. 19-21, the image light IML exits from the second opening 143 of the encapsulation housing 142 of the head-up display device 100 is reflected by the partially reflective and partially transmissive element 201 to the eyebox region EB1. In the case where the driver's eyes are located in the eyebox region, the driver can see the second virtual image formed at a side of the partially reflective and partially transmissive element 201 away from the eyebox region. For example, the partially reflective and partially transmissive element 201 does not affect the driver's observation of the external environment.

In some examples, as illustrated in FIGS. 19 and 21, the partially reflective and partially transmissive element 201 can be implemented as a partially reflective and partially transmissive element with flat shape. In some other examples, as illustrated in FIG. 20, the partially reflective and partially transmissive element 201 may be implemented as a partially reflective and partially transmissive element with curved surface shape. For example, as illustrated in FIG. 20, in the case where the partially reflective and partially transmissive element 201 is implemented as a curved surface-shaped partially reflective and partially transmissive element, the side of the curved surface-shaped partially reflective and partially transmissive element close to the head-up display device 100 is a concave curved surface.

It can be explained that the head-up display system 200 illustrated in FIG. 20 is not limited to adopting the head-up display device 100 illustrated in FIG. 3A, and the head-up display system 200 illustrated in FIG. 20 can also adopt any other head-up display device 100 provided by at least one embodiment of the present disclosure (for example, the head-up display device 100 illustrated in FIG. 3B).

For example, the partially reflective and partially transmissive element 201 may be a front window of a transport device (e.g., a front windshield), an emission film layer or an imaging window arranged on the surface of the front window of the transport device close to the head-up display device. The head-up display device imaged through the windshield may be a W-HUD (windshield-HUD), and the head-up display device imaged through the imaging window may be a C-HUD (Combiner-HUD). For example, the imaging window is generally an imaging plate made of transparent material (transparent to visible light) with a certain curvature.

For example, the first virtual image output by the head-up display device 100 may be located at the focal plane of the partially reflective and partially transmissive element 201, thereby increasing the distance between the second virtual image displayed by the head-up display system 200 and the eyebox region. For example, by locating the second virtual image displayed by the head-up display system 200 at a long distance (e.g., greater than 30 meters or 50 meters) or at infinity, it allows the head-up display system 200 to be suitable for augmented reality (AR) applications.

For example, in the case where the partially reflective and partially transmissive element 201 is a front windshield, the position of the first virtual image formed by reflecting the image source by the curved mirror is located at or close to the focal plane of the front windshield. In this case, according to the law of curved surface imaging, the image light output by the image generating element 120 sequentially passes through the curved mirror and the front windshield, and then is formed into a second virtual image at a relatively long distance or even at infinity, which is suitable for AR-HUD.

It can be explained that the relatively long distance means that the distance between the second virtual image displayed by the head-up display system 200 and the eyebox region is greater than a predetermined distance threshold. For example, the predetermined distance threshold may be 20 meters, 30 meters, 50 meters or other suitable distances.

For example, for the head-up display system 200 including the head-up display device 100 adopting the reflective light guide element 150, the direction control element 160 and the diffusion element, the light emitted by the light source 111 passes through the reflective light guide element 150 and the direction control element 160, then is reflected by the reflective element 130, and finally is reflected by the partially reflective and partially transmissive element 201; afterwards, the reflected light will converge and fall into the eyebox (for example, the center of the eyebox). Further, the light is accurately diffused by the diffusion element, and the diffused light beam can cover the eyebox region (for example, just cover the eyebox region), thus achieving high light efficiency without affecting normal observation.

It can be understood that the diffused light beam can be larger than the eyebox region, e.g., completely covering the eyebox. For example, after disposing the diffusion element, the diffused light beam just covers the eyebox region, and the light efficiency of the system is the highest at this time.

The inventor of the present disclosure has also found in the research that the head-up display system illustrated in FIGS. 1 and 2 may have the ghost problem, which is caused by the incomplete coincidence of, the image corresponding to the light reflected by the surface of the partially reflective and partially transmissive element close to the encapsulation housing, and, the image corresponding to the light reflected by the surface of the partially reflective and partially transmissive element away from the encapsulation housing.

Referring to FIGS. 22-25, several examples of head-up display system 200 with ghost suppression (e.g., ghost elimination) provided by at least one embodiment of the present disclosure will be described below.

Figure 22:
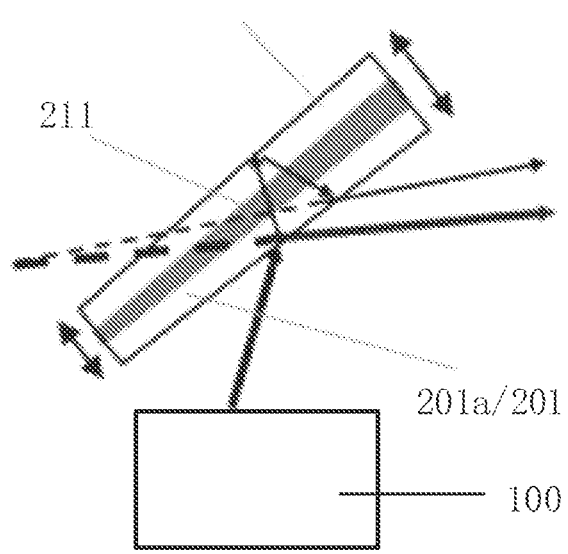
FIG. 22 is a schematic diagram of another head-up display system provided by at least one embodiment of the present disclosure.

FIG. 22 is a schematic diagram of another head-up display system 200 provided by at least one embodiment of the present disclosure. Compared with the head-up display system 200 illustrated in FIGS. 19-21, the head-up display system 200 illustrated in FIG. 22 further includes a wedge-shaped film 211. The partially reflective and partially transmissive element 201 of the head-up display system 200 includes a first layer 201a, a second layer 201b, and a gap (hereinafter referred to as an interlayer) between the first layer 201a and the second layer 201b. The wedge-shaped film 211 is located in the interlayer of the partially reflective and partially transmissive element 201 (for example, the gap between the first layer 201a and the second layer 201b).

In the following, the partially reflective and partially transmissive element 201 provided with the wedge-shaped film 211 and the head-up display system 200 illustrated in FIG. 22 having ghost elimination function will be explained by way of example with reference to the case where the partially reflective and partially transmissive element 201 of the head-up display system 200 is implemented as a windshield (for example, a front windshield) of a transport device.

For example, the windshield adopts a double-layered glass structure, and a wedge-shaped polyvinyl butyral (PVB) layer is embedded between the two layers of glass by a special process. By implementing the partially reflective and partially transmissive element 201a as a windshield provided with a wedge-shaped film 211, the images reflected by the inner and outer surfaces of the glass (for example, the image reflected by the first layer 201a and the image reflected by the second layer 201b) can be overlapped and formed into one image, so that the head-up display system 200 has function of ghost suppression (e.g., ghost elimination). For example, the wedge-shaped film 211 has a thin end and a thick end, and also has a certain angle. The angle of the wedge-shaped film 211 can be set according to the requirements of the head-up display system 200.

Figure 23:
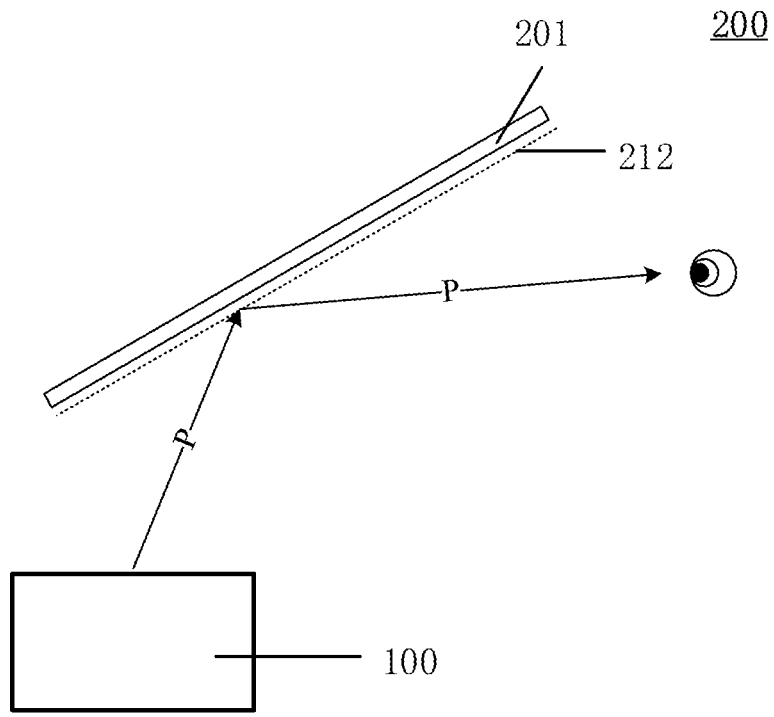
FIG. 23 is a schematic diagram of another head-up display system provided by at least one embodiment of the present disclosure.

FIG. 23 is a schematic diagram of another head-up display system 200 provided by at least one embodiment of the present disclosure. Compared with the head-up display system 200 illustrated in FIGS. 19-21, the head-up display system 200 illustrated in FIG. 23 further includes a first reflective film 212 located on the surface of the partially reflective and partially transmissive element 201 close to the head-up display device 100. The polarization direction of the image light IML output by the image generating element 120 of the head-up display device 100 is the second direction. The reflectivity of the partially reflective and partially transmissive element 201 to the light with the first polarization direction is the first reflectivity; the reflectivity of the partially reflective and partially transmissive element 201 to the light with the second polarization direction is the second reflectivity; the reflectivity of the first reflective film 212 to the light with the second polarization direction is the third reflectivity; the first direction is perpendicular to the second direction; the first reflectivity and the third reflectivity are both larger than the second reflectivity.

For example, the light with the first polarization direction can be S-polarized light, and the light with the second polarization direction can be P-polarized light. The reflectivity of the partially reflective and partially transmissive element 201 for S-polarized light is greater than that of the partially reflective and partially transmissive element 201 for P-polarized light. The reflectivity of the first reflective film 212 (e.g., a P-polarized reflective film) for P-polarized light is greater than that of the partially reflective and partially transmissive element 201 for P-polarized light. For example, in some examples, in the case where the partially reflective and partially transmissive element 201 is a windshield, based on Brewster's angle, the reflectivity of the windshield for S-polarized light is greater than that for P-polarized light, and S-polarized light will be largely reflected by the windshield and P-polarized light will be largely transmitted by the windshield.

For example, the energy utilization efficiency of the head-up display system 200 can be improved by setting the image light IML output by the image generating element 120 of the head-up display device 100 to be P-polarized light, and by providing the first reflective film 212 (e.g., the P-polarized light reflective film) to increase the reflectivity for P-polarized light. For example, because the glass has higher transmittance for P-polarized light, the P-polarized light transmitted through the first reflective film 212 will also be transmitted through the partially reflective and partially transmissive element 201 for the inner surface of the second layer 201b (see FIG. 22) of the partially reflective and partially transmissive element 201 having a low reflectivity to P-polarized light. In this case, the brightness of the image reflected by the second layer 201b of the partially reflective and partially transmissive element 201 is poor (for example, negligible). For example, in this case, the user can only observe the image reflected by the first reflective film 212.

Figure 24:
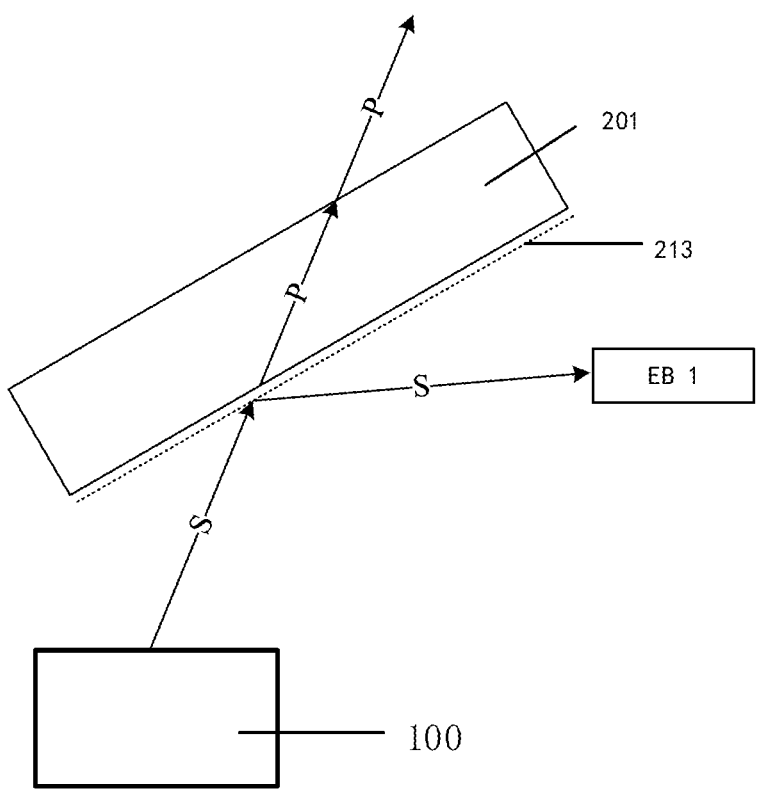
FIG. 24 is a schematic diagram of another head-up display system provided by at least one embodiment of the present disclosure.

FIG. 24 is a schematic diagram of another head-up display system 200 provided by at least one embodiment of the present disclosure. Compared with the head-up display system 200 illustrated in FIGS. 19-21, the head-up display system 200 illustrated in FIG. 24 further includes a first phase delay element 213 located on the surface of the partially reflective and partially transmissive element 201 close to the head-up display device 100. The polarization direction of the image light IML output by the image generating element 120 of the head-up display device 100 is the first direction. For example, the light with the first polarization direction is S-polarized light, and the light with the second polarization direction is P-polarized light. The reflectivity of the partially reflective and partially transmissive element 201 for S-polarized light is greater than that of the partially reflective and partially transmissive element 201 for P-polarized light.

In an example, the first phase delay element 213 is a half-wave plate. In this case, the light transmitted through the first phase delay element 213 is converted into P-polarized light by the half-wave plate, and because the inner surface of the second layer 201b (see FIG. 22) of the partially reflective and partially transmissive element 201 has a low reflectivity for the P-polarized light, the reflected light transmitted through the half-wave plate will also be transmitted through the partially reflective and partially transmissive element 201, and the brightness of the image reflected by the second layer 201b of the partially reflective and partially transmissive element 201 is poor (for example, negligible), so that the head-up display system 200 has a ghost suppression (for example, ghost elimination) function. For example, the head-up display system 200 may further include a third reflective film located at the side of the first phase delay element 213 close to the head-up display device 100, so that the third reflective film reflects more light output by the head-up display system 200 to the eyebox region.

In another example, the first phase delay element 213 may also be a quarter-wave plate. In this case, the light transmitted through the first phase delay element 213 is converted into circularly polarized light by the quarter-wave plate, and the inner surface of the second layer 201b (see FIG. 22) of the partially reflective and partially transmissive element 201 has relatively low reflectivity for the circularly polarized light, and the brightness of the image reflected by the second layer 201b of the partially reflective and partially transmissive element 201 is poor (for example, negligible), so that the head-up display system 200 has ghost suppression (for example, ghost elimination) function.

It can be explained that there is a gap between the first phase delay element 213 and the partially reflective and partially transmissive element 201 for convenience of explanation, but in practical application, the surface of the first phase delay element 213 is closely attached onto the surface of the partially reflective and partially transmissive element 201. The windshield is also enlarged in FIG. 24. For example, the thickness of the windshield is enlarged.

Figure 25:
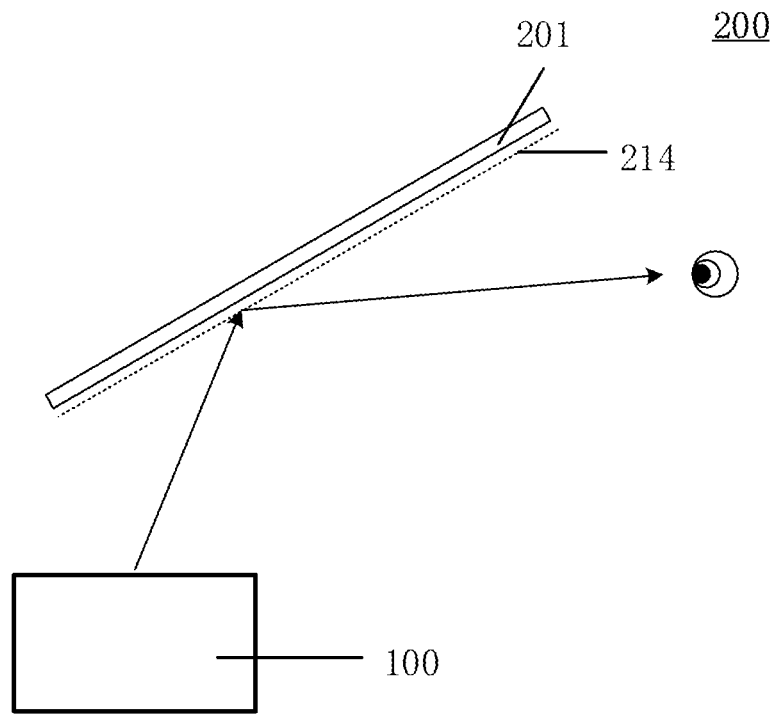
FIG. 25 is a schematic diagram of another head-up display system provided by at least one embodiment of the present disclosure.

FIG. 25 is a schematic diagram of another head-up display system 200 provided by at least one embodiment of the present disclosure. Compared with the head-up display system 200 illustrated in FIGS. 19-21, the head-up display system 200 illustrated in FIG. 25 further includes a second reflective film 214 located on the surface of the partially reflective and partially transmissive element 201 close to the head-up display device 100. The image light IML output by the image generating element 120 includes any one or any combination of the light of the first wavelength band, the light of the second wavelength band and the light of the third wavelength band. For example, the colors of light of the first wavelength band, light of the second wavelength band and light of the third wavelength band are different from each other. For example, any two wavelength bands in the first wavelength band, the second wavelength band and the third wavelength band are spaced apart from each other.

For example, the reflectivity of the second reflective film 214 to the light that is incident thereon and in a predetermined wavelength band is the fourth reflectivity, the reflectivity of the second reflective film 214 to the visible light that is incident thereon and outside the predetermined wavelength band is the fifth reflectivity; the fourth reflectivity is greater than the fifth reflectivity. The predetermined wavelength band includes a combination of the first wavelength band, the second wavelength band and the third wavelength band.

For example, the fifth reflectivity is a low reflectivity (for example, less than 30%, 20%, 10%, 5%, 1%, 0.5% or other suitable values), and correspondingly, the second reflective film 214 has a high transmissivity for visible light outside the predetermined wavelength band. In this case, the fourth reflectivity can be set to a high reflectivity (for example, the fourth reflectivity is greater than 80%, 90%, 95%, 99.5% or other suitable values). Furthermore, the image light IML output by the image generating element 120 is basically reflected by the second reflective film 214 without being incident on the second layer 201b of the partially reflective and partially transmissive element 201 (see FIG. 22). The brightness of the image reflected by the second layer 201b of the partially reflective and partially transmissive element 201 is negligible, so that the head-up display system 200 has a ghost suppression (e.g., ghost elimination) function.

For example, because the second reflective film 214 has high transmissivity for visible light outside the predetermined wavelength band, the visible light outside the predetermined wavelength band that is incident on the imaging device and the second reflective film 214 can be transmitted through the imaging device and the second reflective film 214, and can be observed by the user of the head-up display system 200; and thus the second reflective film 214 has less adverse effect on the user of the head-up display system 200 observing the external environment through the imaging device.

For example, in the case where the partially reflective and partially transmissive element 201 is a windshield, a selectively reflective film may be added on the inner surface of the windshield, and the selectively reflective film only reflects the image light IML emitted by the image generating element 120. If the image light IML includes RGB light of three wavelength bands, the selectively reflective film only reflects the RGB light and transmits other light (for example, other wavelength bands in the visible light band that are outside the wavelength band of the image light IML emitted by the image generating element), so that the image light IML will not be subject to a secondary refection at the inner surface of the outer side of the windshield.

The inventor of the present disclosure has also found in the research that when the user wears polarized glasses 221 (polarized sunglasses), some images output by the HUD system 200 may not be visible. This is because the image display light output by the image source of the abovementioned head-up display system 200 is S-polarized light, and the polarized glasses 221 are configured to filter out the S-polarized light and only transmit the P-polarized light.

The head-up display system 200 provided by at least one embodiment of the present disclosure that enables a user to observe a displayed image while wearing polarized glasses 221 will be explained below with reference to FIG. 26 and FIG. 27.

Figure 26:
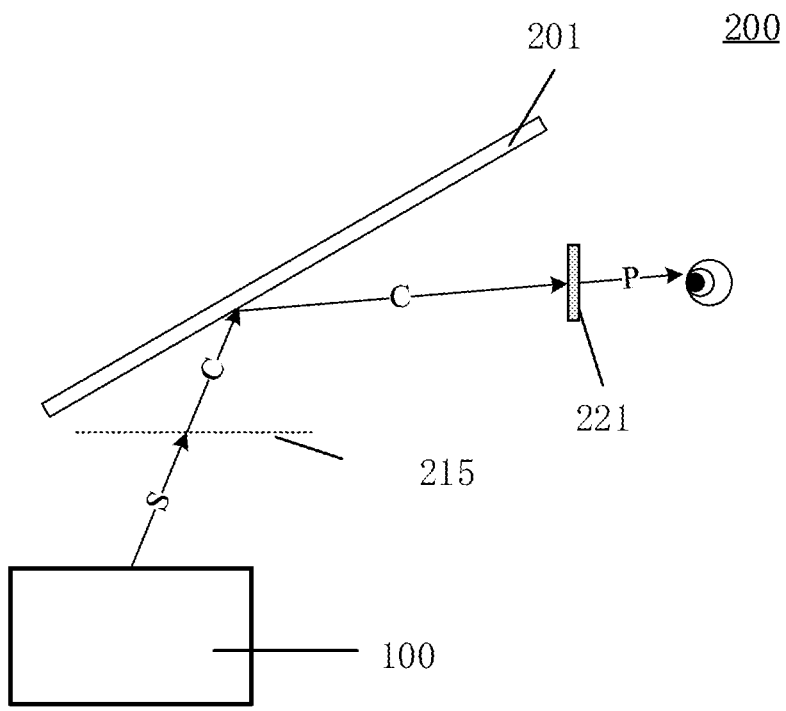
FIG. 26 is a schematic diagram of another head-up display system provided by at least one embodiment of the present disclosure.

FIG. 26 is a schematic diagram of another head-up display system 200 provided by at least one embodiment of the present disclosure. Compared with the head-up display system 200 illustrated in FIGS. 19-21, the head-up display system 200 illustrated in FIG. 26 further includes a second phase delay element 215, which is located at the second opening 143 of the encapsulation housing 142 of the head-up display device 100 or on the optical path from the second opening 143 to the partially reflective and partially transmissive element 201. For example, the phase delay element is a quarter-wave plate or a half-wave plate.

For example, in the case where the phase delay element is a quarter-wave plate, the S-polarized light can be converted into circularly polarized light. Because the circularly polarized light C has a P-polarized light component, the user of the head-up display system 200 can observe the image displayed by the head-up display system 200 when wearing polarized glasses 221.

Figure 27:
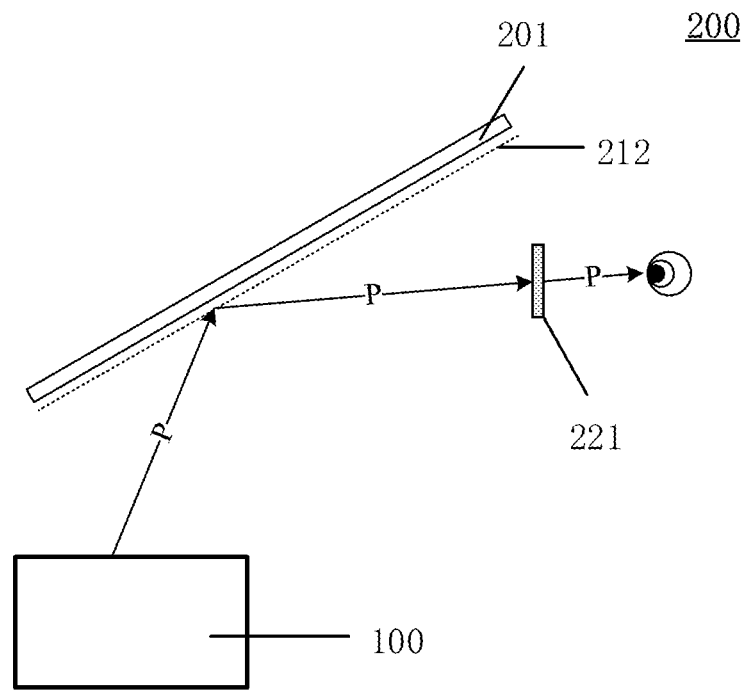
FIG. 27 is another schematic diagram of the head-up display system illustrated in FIG. 23.

FIG. 27 is another schematic diagram of the head-up display system 200 illustrated in FIG. 23.

For example, as illustrated in FIGS. 23 and 27, the image light IML output by the image generating element 120 of the head-up display device 100 is P-polarized light, and the first reflective film 212 (e.g., P-polarized reflective film) can reflect the image light IML implemented as P-polarized light. Therefore, the user of the head-up display system 200 can observe the image light IML passing through the polarized glasses 221 when wearing the polarized glasses 221. In this way, the head-up display system 200 illustrated in FIG. 23 and FIG. 27 enables the user to observe the displayed image when wearing the polarized glasses 221.

Figure 28:
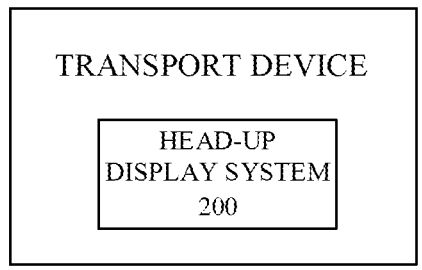
FIG. 28 is an exemplary block diagram of a transport device provided by at least one embodiment of the present disclosure.

At least one embodiment of the present disclosure provides a transport device. FIG. 28 is an exemplary block diagram of a transport device provided by at least one embodiment of the present disclosure. As illustrated in FIG. 28, the transport device includes the head-up display system 200 provided by at least one embodiment of the present disclosure. In some examples, the front window (e.g., front windshield) of the transport device is reused as the partially reflective and partially transmissive element 201 of the head-up display system 200.

For example, the transport device can be various suitable transport devices, such as land transport device including various types of cars, or water transport device such as boats. For example, the driving position of the transport device is provided with a front window, and the image is transmitted to the front window through an on-board display system.

It can be explained that, for the sake of clarity, in the drawings used to describe the embodiments of the present disclosure, the thickness of layers or regions is enlarged or reduced, that is, these drawings are not drawn to actual scale.

Although the disclosure has been described in detail with general description and specific embodiments, it is obvious to those skilled in the art that some modifications or improvements can be made based on the embodiments of the disclosure. Therefore, these modifications or improvements made without departing from the spirit of this disclosure are all within the scope of this disclosure.

The above is only exemplary embodiments of the present disclosure and is not intended to limit the scope of protection of the present disclosure, which is determined by the appended claims.

The invention claimed is:

1. A head-up display device, comprising a light source component, an image generating element, a reflective element, at least one sensor and an encapsulation housing with a second opening, wherein the light source component, the image generating element, the reflective element and the at least one sensor are all located in the encapsulation housing,
    wherein the light source component comprises at least one light source configured to emit light;
    the image generating element is configured to convert the light emitted by the at least one light source into image light and output the image light;
    the reflective element is configured to receive the image light, and reflect and converge the image light so that the reflected and converged image light exits the head-up display device through the second opening, and the reflective element is further configured such that light from an outside of the head-up display device and entering the encapsulation housing through the second opening is incident onto the reflective element and reflected to the image generating element by the reflective element;
    the at least one sensor is located at a side of the image generating element close to the light source component; and
    the image generating element and the at least one sensor are jointly configured such that at least part of the light from the outside of the head-up display device and passing through at least partial region of the image generating element is incident on the at least one sensor.

2. The head-up display device according to claim 1, wherein the light emitted by the at least one light source is incident into the image generating element from a first surface of the image generating element, and the image light exits the image generating element from a second surface of the image generating element opposite to the first surface; and
    an orthographic projection of the at least one sensor on a plane where the first surface of the image generating element is located partially overlaps with the image generating element.

3. The head-up display device according to claim 1, wherein the light source component further comprises a light-emitting driving substrate;
    the at least one light source is located at a side of the light-emitting driving substrate close to the image generating element;
    the light-emitting driving substrate is electrically connected with the at least one light source and configured to drive the at least one light source to emit light; and
    an orthographic projection of the at least one sensor on a plane where a first surface of the image generating element is located has no overlap with an orthographic projection of the at least one light source on the plane where the first surface of the image generating element is located.

4. The head-up display device according to claim 3, wherein the at least one light source comprises a plurality of light sources, and the at least one sensor comprises a plurality of sensors, and an orthographic projection of each of at least some of the plurality of sensors on the plane where the first surface of the image generating element is located is in a gap of orthographic projections of adjacent light sources of the plurality of light sources on the plane where the first surface of the image generating element is located; and/or the light-emitting driving substrate has a first opening, and the at least one sensor is located at a side of the light-emitting driving substrate away from the image generating element, and a light collecting surface of the at least one sensor faces the light-emitting driving substrate, and the orthographic projection of the at least one sensor on the plane where the first surface of the image generating element is located at least partially overlaps with an orthographic projection of the first opening on the plane where the first surface of the image generating element is located.

5. The head-up display device according to claim 1, further comprising at least one selected from the group consisting of a diffusion element, a reflective light guide element, an optical filtering element and a controller, wherein the diffusion element is located between the image generating element and the at least one sensor, and is configured to diffuse light from the outside of the encapsulation housing, entering the encapsulation housing from the second opening and passing through the image generating element;

the reflective light guide element is configured to gather at least part of the light from the outside of the encapsulation housing, entering the encapsulation housing from the second opening and passing through the image generating element towards a center line of the reflective light guide element by reflection;

the optical filtering element is disposed on an optical path from the second opening to the image generating element, and is configured to reduce an intensity of the light from the outside of the encapsulation housing and passing through the image generating element;

the at least one sensor is configured to communicate with the controller, and the controller is configured to issue an alarm instruction in response to an intensity of the light from the outside of the encapsulation housing, passing through the image generating element and incident on the at least one sensor being greater than or equal to a predetermined light intensity threshold.

6. The head-up display device according to claim 5, wherein an orthographic projection of the reflective light guide element on a plane where a first surface of the image generating element is located at least partially overlaps with the image generating element, and the reflective light guide element is located at a side of the image generating element close to the light source component.

7. The head-up display device according to claim 5, wherein the reflective light guide element is a hollow housing;

the hollow housing has a third opening and a fourth opening which are opposite to each other;

the light from the outside of the encapsulation housing, entering the encapsulation housing from the second opening and passing through the image generating element enters the hollow housing from the fourth opening, and can be reflected by a reflective layer on an inner surface of the hollow housing to the at least one sensor;

the first surface comprises a first region;

an orthographic projection of a boundary of the third opening on a plane where the first surface of the image generating element is located coincides with a boundary of the first region; and an orthographic projection of the at least one sensor on the plane where the first surface of the image generating element is located is in the first region.

8. The head-up display device according to claim 7, wherein an orthographic projection of the at least one light source on the plane where the first surface of the image generating element is located is in the first region;

the first surface comprises a second region;

an orthographic projection of a boundary of the fourth opening on the plane where the first surface of the image generating element is located coincides with a boundary of the second region of the first surface; and the second region at least partially overlaps with the first region.

9. The head-up display device according to claim 5, further comprising a direction control element, wherein the light emitted by the at least one light source sequentially passes through the reflective light guide element, the direction control element and the diffusion element;

the direction control element is configured to converge light passing through the reflective light guide element and incident on the direction control element; and the diffusion element is further configured to diffuse light converged by the direction control element and incident on the diffusion element.

10. The head-up display device according to claim 5, wherein the optical filtering element is further configured such that at least part of light in a predetermined wavelength band among light from the outside of the encapsulation housing and incident on the optical filtering element is incident on the image generating element, and light outside the predetermined wavelength band among the light from the outside of the encapsulation housing and incident on the optical filtering element is filtered out; and/or the optical filtering element is configured to filter out light outside a predetermined polarization state among the light from the outside of the encapsulation housing and incident on the optical filtering element; and/or the optical filtering element is configured such that a first proportion of the light from the outside of the encapsulation housing and incident on the optical filtering element is incident on the image generating element, and a spectral distribution of the light from the outside of the encapsulation housing and incident on the optical filtering element is substantially the same as that of the first proportion of the light incident on the image generating element.

11. The head-up display device according to claim 10, wherein the predetermined polarization state is the same as a polarization state of the image light output by the image generating element.

12. The head-up display device according to claim 5, wherein the optical filtering element is a reflective optical filtering element and is located on a light reflecting surface of the reflective element; or the optical filtering element is a transmissive optical filtering element and is located on an optical path from the image generating element to the second opening.

13. The head-up display device according to claim 5, further comprising a light shielding element, wherein the controller is further configured to drive the light shielding element to switch from a first state to a second state in response to the intensity of the light from the outside of the encapsulation housing, passing through the image generating element and incident on the at least one sensor being greater than or equal to the predetermined light intensity threshold;

the light shielding element is configured to allow the light from the outside of the encapsulation housing to be incident on the image generating element, in the first state; and the light shielding element is configured to prevent the light from the outside of the encapsulation housing from being incident on the image generating element, in the second state.

14. The head-up display device according to claim 13, further comprising a feedback device,
wherein the controller is further configured to allow the light shielding element to switch from the second state to the first state in response to a recovery instruction output by the feedback device, and
wherein the feedback device is configured to output the recovery instruction in response to an orientation of the second opening of the encapsulation housing being not matched with a current position of the sun.

15. The head-up display device according to claim 14, further comprising a locator and an angular motion detector,
wherein the locator is configured to acquire a latitude and longitude of a current geographic position of the head-up display device;
the angular motion detector is configured to collect a current angular motion parameter of the head-up display device; and
the feedback device is further configured to determine whether the orientation of the second opening of the encapsulation housing is matched with the current position of the sun based on the latitude and longitude of the current geographical position of the head-up display device and the current position of the sun.

16. A head-up display system, comprising a partially reflective and partially transmissive element and the head-up display device according to claim 1,
wherein the partially reflective and partially transmissive element is configured to image a first virtual image output by the head-up display device to form a second virtual image.

17. The head-up display system according to claim 16, further comprising at least one selected from the group consisting of a first reflective film, a phase delay element and a second reflective film,
wherein the first reflective film is located on a surface of the partially reflective and partially transmissive element close to the head-up display device;

the partially reflective and partially transmissive element has a first reflectivity to light with a polarization direction which is a first direction;

the partially reflective and partially transmissive element has a second reflectivity to light with a polarization direction which is a second direction;

the first reflective film has a third reflectivity to light with a polarization direction which is the second direction;

the first direction is perpendicular to the second direction; and the first reflectivity and the third reflectivity are both greater than the second reflectivity;

wherein the phase delay element is located at the second opening of the encapsulation housing of the head-up display device, or on an optical path from the second opening to the partially reflective and partially transmissive element;

wherein the second reflective film is located on a surface of the partially reflective and partially transmissive element close to the head-up display device;

the second reflective film has a fourth reflectivity to light which is incident on the second reflective film and in a predetermined wavelength band;

the second reflective film has a fifth reflectivity to visible light which is incident on the second reflective film and outside the predetermined wavelength band;

the fourth reflectivity is greater than the fifth reflectivity;

the image light output by the image generating element comprises any one or any combination selected from the group consisting of light of a first wavelength band, light of a second wavelength band and light of a third wavelength band;

colors of the light of the first wavelength band, the light of the second wavelength band and the light of the third wavelength band are different from each other;

any two wavelength bands selected from the group consisting of the first wavelength band, the second wavelength band and the third wavelength band are spaced from each other; and the predetermined wavelength band comprises a combination of the first wavelength band, the second wavelength band and the third wavelength band.

18. The head-up display system according to claim 17, wherein a polarization direction of the image light output by the image generating element of the head-up display device is the second direction.

19. A transport device, comprising the head-up display device according to claim 1.

* * * * *